(12) United States Patent
Schwerin et al.

(10) Patent No.: US 12,517,864 B2
(45) Date of Patent: Jan. 6, 2026

(54) SYSTEMS AND METHODS FOR SCALABLE DATABASE HOSTING DATA OF MULTIPLE DATABASE TENANTS

(71) Applicant: MongoDB, Inc., New York, NY (US)

(72) Inventors: Andrew Michalski Schwerin, Brooklyn, NY (US); Therese Avitabile, New York, NY (US); Mark Porter, Seattle, WA (US); Tomer Yakir, Kochav Yair (IL); Gregory Banks, Santa Rosa, CA (US); Louisa Berger, Brooklyn, NY (US); Jack Wearden, Altrincham (GB); Judah Schvimer, New York, NY (US); Matthew Russotto, West Orange, NJ (US); Michael Cahill, Stanmore (AU); Esha Maharishi, Ashburn, VA (US); Siyuan Zhou, Weehawken, NJ (US); Eric Andrew Milkie, Stamford, CT (US); A. Jesse Jiryu Davis, New York, NY (US); Misha Tyulenev, Brooklyn, NY (US); Keith Smith, Cambridge, MA (US); Susan LoVerso, Southborough, MA (US); Donald Anderson, Northampton, MA (US)

(73) Assignee: MongoDB, Inc., New York, NY (US)

( * ) Notice: Subject to any disclaimer, the term of this patent is extended or adjusted under 35 U.S.C. 154(b) by 357 days.

(21) Appl. No.: 17/856,339

(22) Filed: Jul. 1, 2022

(65) Prior Publication Data
US 2023/0020330 A1 Jan. 19, 2023

Related U.S. Application Data

(60) Provisional application No. 63/220,242, filed on Jul. 9, 2021.

(51) Int. Cl.
*G06F 16/11* (2019.01)
*G06F 16/182* (2019.01)

(52) U.S. Cl.
CPC .......... *G06F 16/119* (2019.01); *G06F 16/182* (2019.01)

(58) Field of Classification Search
CPC .... G06F 16/119; G06F 16/182; G06F 16/256; G06F 16/273
See application file for complete search history.

(56) References Cited

U.S. PATENT DOCUMENTS 9,740,762 B2 8/2017 Horowitz et al.
11,232,000 B1 * 1/2022 Bhatia ................. G06F 11/1464
(Continued)

*Primary Examiner* — Khanh B Pham
*Assistant Examiner* — Samuel C Sharpless, III
(74) *Attorney, Agent, or Firm* — Wolf, Greenfield & Sacks, P.C.

(57) ABSTRACT

According to aspects of the disclosure, there is provided a scalable cloud distributed database system for hosting data of multiple database tenants. In some embodiments, the database may be serverless. The serverless database may be configured to automatically and dynamically match resources to workload demands for tenants of the database. Databases described herein may include replica sets hosting multiple tenants. Tenants may be migrated from one replica set to another replica set based on usage. Usage of tenants may be throttled during migration between replica sets. Tenants with lower usage may be selected for migration between replica sets. During migration, files containing both a document and a history of updates to the document may be migrated. Databases described herein may include multiple storage tiers having different read/or write speeds.

20 Claims, 22 Drawing Sheets

(56) References Cited

U.S. PATENT DOCUMENTS

| | | |
|---|---|---|
| 2012/0254175 A1 | 10/2012 | Horowitz et al. |
| 2015/0269239 A1* | 9/2015 | Swift ...................... G06F 16/27 707/610 |
| 2017/0286517 A1* | 10/2017 | Horowitz ............ G06F 11/0754 |
| 2021/0141770 A1* | 5/2021 | Wang ................... G06F 16/185 |

* cited by examiner

| Resource | Range - lower | Range - upper | Confidence |
|---|---|---|---|
| Number of tenants (idle+active) | | 200,000 | High |
| like free tier | | 187,975 | |
| like shared tier | | 1,967 | |
| like dedicated tier | | 10,058 | |
| Number of replica sets | | 9,975 | Low |
| This number assumes the distribution of tenants is the same as Atlas deployment. Many factors may contribute to a change in number of replica sets (tiered storage might decrease the number, reducing max slice size might increase the number), additionally this estimate ignores differences in hardware used for different replica sets, so we consider this a low confidence estimate. | | | |
| Number of mongoqs | | 998 | Low |
| This number assumes a distribution of tenant sizes similar to today's Atlas deployment and a 1:10 mongoq/slice ratio. | | | |
| Number of front-end processes | 155 | 497 | Medium |
| with c5.2xlarge | 20 | 63 | |
| with c5.9xlarge | 5 | 14 | |
| The lower range is the number of 1vCPU/8GB instances we support a pod with an active/idle tenant breakdown similar to Atlas deployment. The upper range assumes all tenants in the pod are active. | | | |

FIG. 3A

| different AWS instance sizes are also included. | | | | |
|---|---|---|---|---|
| Number of client connections | | 1,160,209 | 3,731,038 | Medium |
| | like free tier | 57,450 | 184,748 | |
| | like shared tier | 247,800 | 796,082 | |
| | like dedicated tier | 854,960 | 2,749,407 | |

The lower range estimates the number of ingress connections to a pod with an active/idle tenant breakdown similar to ▮ Atlas deployment. The upper range assumes all tenants in the pod are active.

Connection counts will be reduced once drivers implement ▮ since there will no longer be a monitoring connection for every connected MongoClient. We are aware of some customers (such as Wish and Ubisoft) who can have 250k - 500k connections, but these are considered outliers

| Requests/sec | | 337,989 | 490,106 | Medium |
|---|---|---|---|---|
| | like free tier | 16,731 | 24,268 | |
| | like shared tier | 72,167 | 104,679 | |
| | like dedicated tier | 248,991 | 361,160 | |

The lower range estimates the number of requests/sec to a pod with an active/idle tenant breakdown similar to ▮ Atlas deployment. The upper range assumes all tenants in the pod are active.

FIG. 3B

SYSTEMS AND METHODS FOR SCALABLE DATABASE HOSTING DATA OF MULTIPLE DATABASE TENANTS

RELATED APPLICATIONS

This application claims the benefit under 35 U.S.C. § 119(e) of U.S. Application Ser. No. 63/220,242, filed Jul. 9, 2021, and entitled "SYSTEMS AND METHODS FOR SCALABLE DATABASE HOSTING DATA OF MULTIPLE DATABASE TENANTS," which is hereby incorporated herein by reference in its entirety.

COPYRIGHT NOTICE

At least a portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Some conventional database systems may store data associated with a single database tenant and may provide a fixed performance and volume for that database tenant. Some conventional database systems may host data of multiple database tenants with strict caps placed on data volume and operation measures.

SUMMARY

According to aspects of the disclosure, there is provided a scalable cloud distributed database system for hosting data of multiple database tenants. The system comprises at least one cloud based resource, the at least one cloud based resource including processor and memory and a database subsystem executing on the at least one cloud based resource. The database subsystem comprises a first replica set configured to store first data associated with a first tenant and second data associated with a second tenant, the first replica set including a primary node hosting a primary database instance of a database and two secondary nodes hosting copies of data of the primary database instance. The primary node is configured to accept, from client systems, database write operations associated with the first database tenant and the second database tenant and responsive to accepting the database write operations from client systems, propagate the database write operations to two secondary nodes. The two secondary nodes are configured to replicate operations from the primary node, accept, from client systems, database read operations associated with the first database tenant and the second database tenant, and responsive to accepting the database read operations, provide results to client systems from the copies of the data of the primary database instance hosted by the two secondary nodes. The database subsystem is configured to migrate the first data associated with the first tenant or the second data associated with the second tenant from the first replica set to a second replica set.

In some embodiments, wherein the database subsystem is further configured to, while migrating the first data associated with the first tenant from the first replica set to the second replica set, throttle at least one of database write operations or database read operations associated with at least one of the first tenant or the second tenant.

In some embodiments, migrating the first data associated with the first tenant or the second data associated with the second tenant from the first replica set to a second replica set comprises migrating the first data associated with the first tenant from the first replica set to the second replica set and the database subsystem is further configured to, while migrating the first data associated with the first tenant from the first replica set to the second replica set, throttle at least one of database write operations or database read operations associated with the second tenant.

In some embodiments, the database subsystem is further configured to measure at least one of database write operations or database read operations associated with the first tenant to obtain first usage information, measure at least one of database write operations or database read operations associated with the second tenant to obtain second usage information, compare the first usage information to the second usage information to obtain a comparison result indicating that the second usage information indicates higher usage than the first usage information, and based on the comparison result, select the first data associated with the first tenant or the second data associated with the second tenant to migrate from the first replica set to the second replica set.

In some embodiments, selecting the first data associated with the first tenant or the second data associated with the second tenant to migrate from the first replica set to a second replica set comprises selecting the first data associated with the first tenant to migrate from the first replica set to a second replica set.

In some embodiments, storing the first data associated with the first database tenant comprises storing a first portion the first data associated with the first tenant in a first storage tier and storing a second portion of the first data associated with the first tenant in a second storage tier, and the first storage tier has a faster read and/or write speed than the second storage tier.

In some embodiments, migrating the first data associated with the first tenant or the second data associated with the second tenant from the first replica set to a second replica set comprises copying to the second replica set, the first portion the first data associated with the first tenant stored in the first storage tier and pointing the second replica set to the second portion of the first data associated with the first tenant stored in the second storage tier.

In some embodiments, migrating the first data associated with the first tenant or the second data associated with the second tenant from the first replica set to a second replica set comprises copying to the second replica set, a plurality of files, each file of the plurality of files containing a document and a history of updates associated with the document.

In some embodiments, the database subsystem is further configured to trigger generation of a bill for the first database tenant based usage by the first database tenant, and the usage by the first database tenant comprises at least one of a volume of the first data of the first database tenant or a measure of write operations and read operations associated with the first database tenant.

In some embodiments, the database subsystem is further configured to measure at least one of database write operations or database read operations accepted by the first replica set to obtain usage information, compare the usage information with a usage threshold to obtain a comparison result indicating that the usage information is greater than the usage threshold, and based on the comparison result, split the first data associated with the first tenant between two replica sets. The splitting comprises retaining a first portion of the first data associated with the first tenant at the first replica set and transferring a second portion of the first data associated with the first tenant from the first replica set to a third replica set.

In some embodiments, the database subsystem is further configured to measure at least one of database write operations or database read operations accepted by the first replica set to obtain usage information, compare the usage information with a usage threshold to obtain a comparison result indicating that the usage information is lower than the usage threshold, and based on the comparison result, merge the first data associated with the first tenant with third data associated with a third database tenant. The merging comprises retaining the first data associated with the first tenant at the first replica set and transferring the third data associated with the third tenant from a third replica set to the first replica set.

According to aspects of the disclosure, there is provided a computer implemented method for providing a scalable cloud distributed database system for hosting data of multiple database tenants. The method comprises executing a database subsystem on at least one cloud based resource, the at least one cloud based resource including a processor and memory, the database subsystem comprising a first replica set configured to store first data associated with a first tenant and second data associated with a second tenant, the first replica set including a primary node hosting a primary database instance of a database and two secondary nodes hosting copies of data of the primary database instance, accepting, by the primary node, from client systems, database write operations associated with the first database tenant and the second database tenant, responsive to accepting the database write operations from client systems, propagating, by the primary node, the database write operations to two secondary nodes, replicating, by the two secondary nodes, operations from the primary node, accepting, by the two secondary nodes, from client systems, database read operations associated with the first database tenant and the second database tenant, responsive to accepting the database read operations, providing, by the two secondary nodes, results to client systems from the copies of the data of the primary database instance hosted by the two secondary nodes, and migrating the first data associated with the first tenant or the second data associated with the second tenant from the first replica set to a second replica set.

In some embodiments, the method further comprises, while migrating the first data associated with the first tenant from the first replica set to the second replica set, throttling at least one of database write operations or database read operations associated with at least one of the first tenant or the second tenant.

In some embodiments, migrating the first data associated with the first tenant or the second data associated with the second tenant from the first replica set to a second replica set comprises migrating the first data associated with the first tenant from the first replica set to the second replica set and the method further comprises, while migrating the first data associated with the first tenant from the first replica set to the second replica set, throttling at least one of database write operations or database read operations associated with the second tenant.

In some embodiments, the method further comprises measuring at least one of database write operations or database read operations associated with the first tenant to obtain first usage information, measuring at least one of database write operations or database read operations associated with the second tenant to obtain second usage information, comparing the first usage information to the second usage information to obtain a comparison result indicating that the second usage information indicates higher usage than the first usage information, based on the comparison result, selecting the first data associated with the first tenant or the second data associated with the second tenant to migrate from the first replica set to the second replica set.

In some embodiments, selecting the first data associated with the first tenant or the second data associated with the second tenant to migrate from the first replica set to a second replica set comprises selecting the first data associated with the first tenant to migrate from the first replica set to a second replica set.

In some embodiments, storing the first data associated with the first database tenant comprises storing a first portion the first data associated with the first tenant in a first storage tier and storing a second portion of the first data associated with the first tenant in a second storage tier, and the first storage tier has a faster read and/or write speed than the second storage tier.

In some embodiments, migrating the first data associated with the first tenant or the second data associated with the second tenant from the first replica set to a second replica set comprises copying to the second replica set, the first portion the first data associated with the first tenant stored in the first storage tier and pointing the second replica set to the second portion of the first data associated with the first tenant stored in the second storage tier.

In some embodiments, migrating the first data associated with the first tenant or the second data associated with the second tenant from the first replica set to a second replica set comprises copying to the second replica set, a plurality of files, each file of the plurality of files containing a document and a history of updates associated with the document.

In some embodiments, the method further comprises triggering generation of a bill for the first database tenant based usage by the first database tenant, wherein the usage by the first database tenant comprises at least one of a volume of the first data of the first database tenant or a measure of write operations and read operations associated with the first database tenant.

In some embodiments, the method further comprises measuring at least one of database write operations or database read operations accepted by the first replica set to obtain usage information, comparing the usage information with a usage threshold to obtain a comparison result indicating that the usage information is greater than the usage threshold, and based on the comparison result, splitting the first data associated with the first tenant between two replica sets. The splitting comprises retaining a first portion of the first data associated with the first tenant at the first replica set and transferring a second portion of the first data associated with the first tenant from the first replica set to a third replica set.

In some embodiments, the method further comprise measuring at least one of database write operations or database read operations accepted by the first replica set to obtain usage information, comparing the usage information with a usage threshold to obtain a comparison result indicating that the usage information is lower than the usage threshold, and based on the comparison result, merging the first data associated with the first tenant with third data associated with a third database tenant. The merging comprises retaining the first data associated with the first tenant at the first replica set and transferring the third data associated with the third tenant from a third replica set to the first replica set.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

FIGS. 3A and 3B are a table related to size of a pod;

DETAILED DESCRIPTION

Figure 1A:
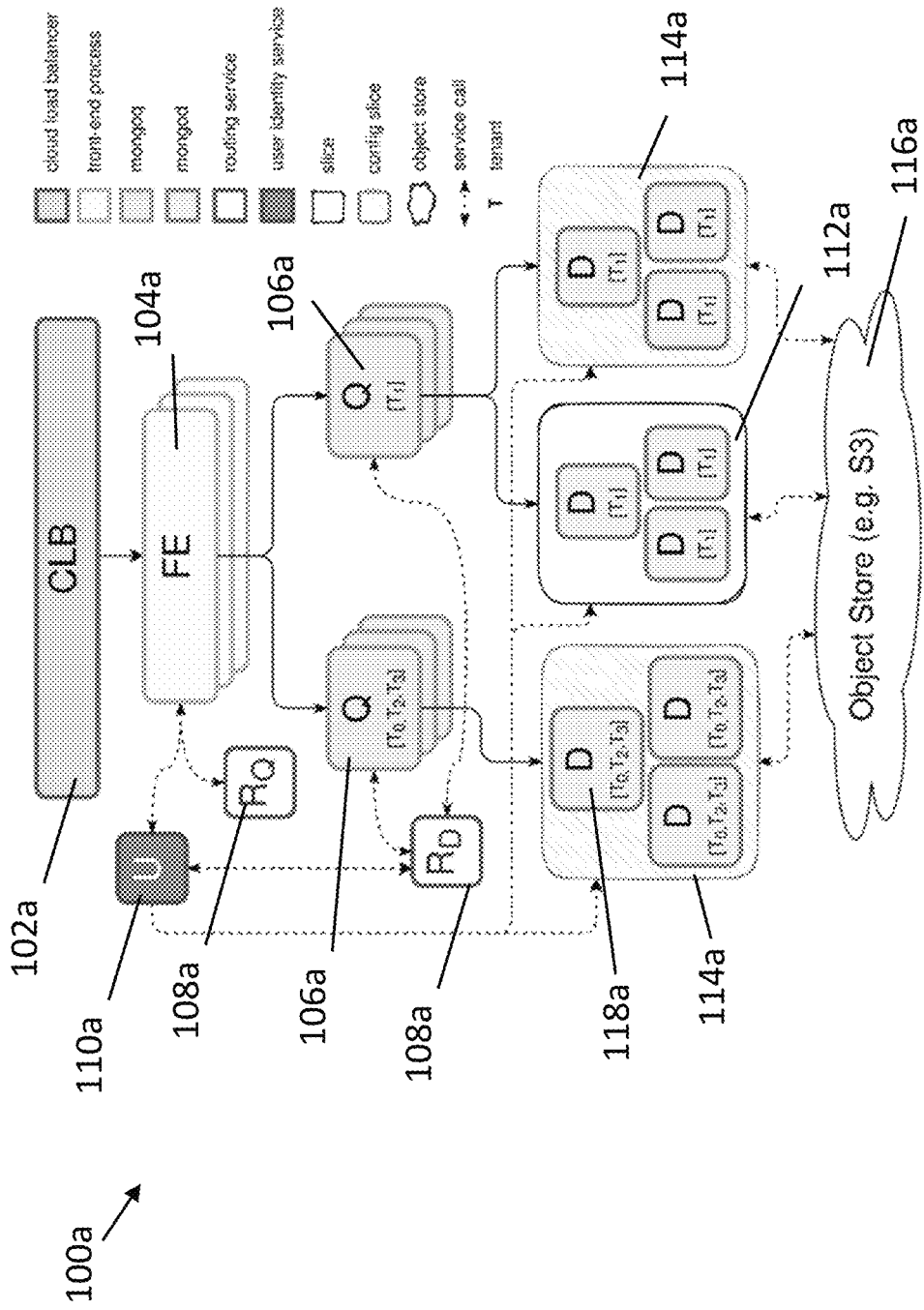
FIG. 1A is a block diagram of an example distributed database system.

According to aspects of the disclosure, there is provided a scalable cloud distributed database system for hosting data of multiple database tenants. In some embodiments, the database may be serverless. The serverless database may be configured to automatically and dynamically match resources to workload demands for tenants of the database.

Databases described herein may include replica sets hosting multiple tenants. Tenants may be migrated from one replica set to another replica set based on usage. Usage of tenants may be throttled during migration between replica sets. Tenants with lower usage may be selected for migration between replica sets. During migration, files containing both a document and a history of updates to the document may be migrated. Databases described herein may include multiple storage tiers having different read and/or write speeds.

A database system may be scalable such that a database tenant may pay for the amount of usage actually incurred, which may fluctuate over time, rather than paying for a set amount of hardware. Accordingly, the database system may provide the database tenant with performance and volume that scales with the database tenant's usage. In some embodiments, the database system may elastically scale, automatically scaling up and down based on workload, which may in some embodiments include scaling down to negligible or zero resources when there is no workload. In some embodiments, the resources may be set above zero to avoid causing a large number of tenants placed on a single system. A serverless database may have both a compute layer and a storage layer which are configured to scale elastically.

For example, as a data set grows, storage may scale with the volume of the data set. In some embodiments, storage may include a combination of block storage (for example, EBS), local SSD storage, and object storage (for example, S3). In addition, computing may scale as CPU and memory resources required to service client operations change. In some embodiments, computing may be scaled vertically and/or horizontally.

To reduce costs of a provider of a serverless database, workloads may be deployed together in multi-tenant environments. Providing a multi-tenant environment may reduce the unused resources in the underlying infrastructure.

The database system may host data of multiple database tenants by storing data associated with each of the multiple tenants on a single replica set and routing read and write requests for each of the multiple tenants with a single process for the single replica set. Accordingly, the database system may allow database tenants with usage below that of a single replica set to use the database system without requiring a full replica set. By employing a multiple tenant environment, the database system may efficiently share resources across database tenants.

A serverless database may provide various benefits. For example, a serverless database may provide a lower cognitive load for users. A database tenant may not be required to think about scaling up to meet increasing workloads, because the serverless database automatically and dynamically scales to the workload. For example, a user may not be required to actively think about the backend infrastructure requirements for their database workload, and the system just works, allowing them to focus on their business logic. In addition, a database tenant may not need to worry about paying for resources they are not using, because the serverless database charges based on workload, not based on set hardware resources. Also, a serverless database may better integrate with other serverless applications.

A serverless database system may service a larger portion of users. Sparse workloads that may not be economic with conventional databases may be serviced. Serverless databases may offer reduced cost for sparse, simple workloads. User-facing provisioning and scaling complexity may be reduced, lowering the barrier of entry of less sophisticated users. The serverless database may integrate well with serverless application architectures, such as AWS Lambda.

Customers of a serverless database may only pay for the operations they perform. Pricing may be consumption-based, customers pay for only the operations that they perform, or resources used to perform them. For example, a serverless database may meter on read and write operations, data storage, and/or data transfer.

A serverless database may have various pricing models. In some embodiments, a serverless database may have an on-demand pricing model where a database tenant only pays for what they consume. In some embodiments, a serverless database may have a provisioned-capacity pricing model where a database tenant pays to provision a guaranteed set of resources or capacity. These pricing models provide benefits. In some embodiments, an on-demand pricing model may provide an improved cost to a database tenant, for example, a database tenant with a sparse workload which may be inappropriate for traditional server-based pricing. In some embodiments, a provisioned-capacity pricing model may provide improved performance to the database tenant, because the database tenants may be more directly tied to read units and write units, rather than to CPU and/or RAM.

In some embodiments, a serverless database may include features for better integrating with other serverless applications. Serverless application models may involve ephemeral compute environments that cannot effectively make use of connection pools to conventional databases. For example, a Function-as-a-Service (FaaS) platform, a function invocation may create connection pool to a database cluster, only to let it close as the function completes, and the environment is subsequently destroyed. This may result in reduced performance, for example, increased latency when accessing a database from FaaS platforms. Accordingly, in some embodiments, in order to better integrate with serverless applications, a serverless databases may handle ephemeral connections efficiently, for example, by providing a fast connect and authentication sequence. In addition, the serverless database may handle large numbers of connections that can change rapidly. These features may provide better integration of the serverless database with other serverless applications.

One exemplary embodiment of a serverless database is Serverless Atlas. Atlas is a cloud database service. In some embodiments, a database system may comprise Serverless Atlas, which may provide a cloud database service with a serverless environment instances that is configured to scale responsive to tenant usage demands and is configured to charge tenants only for the resources used. In some embodiments, a database may comprise a version of Atlas that is not serverless, where tenants may not have the ability to scale usage beyond fixed limits.

For example, a database system may include at least one cloud based resource including at least one processor and memory. The at least one cloud based resource may execute a database subsystem comprising a replica set. As noted above, the replica may be configured to store first data associated with each of the multiple database tenants.

A replica set may include a primary node and a secondary node. The primary node may host a primary database instance of a database. At least two secondary nodes may host copies of data of the primary database instance.

The primary node may be configured to accept database write operations from client systems. For example, such database write operations may be associated with data of each of the multiple database tenants. Responsive to accepting the database write operations from the client systems, the primary node may propagate the database write operations to the at least two secondary nodes.

The at least two secondary nodes may be configured to replicate operations from the primary node. Further, the at least two secondary nodes may be configured to accept database read operations from client systems. The database read operations may be associated with each of the multiple database tenants. Responsive to accepting the database read operations, the at least two secondary nodes may provide results to client systems from the copies of the data of the primary database instance hosted by the two secondary nodes. In this manner, the replica set may make multiple copies of the data available for request from client systems, improving performance of the database system.

In some embodiments, the database subsystem may be configured to migrate first data associated with a first tenant initially hosted on a first replica from the first replica set to a second replica set. While the database subsystem migrates the first data associated with the first tenant from the first replica set to a second replica set, second data associated with a second database tenant may remain hosted on the first replica set.

Database systems described herein may accommodate removal or fluctuation of caps on data volume of operation count. When the usage of data associated with a database tenant shrinks or grows, the database system may react to that change in usage. For example, a replica set may host first data associated with a first database tenant and second data associated with a second database tenant. When the replica set is close to overutilization, data of one of the first database tenant or the second database tenant may be migrated away from the replica set to another replica set.

By migrating the first data associated with the first tenant away from the first replica set, greater usage of the second data associated with the second database tenant may be achieved. For example, when it is determined that the usage of the second data associated with the second database tenant is increasing to a threshold amount, the database subsystem may determine that data associated with database tenants other than the second database tenant is to be migrated from the first replica set. Accordingly, the usage of the data associated with the second database tenant may fluctuate up to the usage accommodated by a single replica set.

A database tenant may be billed for their actual usage in terms of data volume or operation count rather than being billed based on hardware, for example, a single replica set. In some embodiments, a database tenant may set a billing cap on data volume and/or operation count and the database system may throttle or halt usage of data associated with that database tenant when the billing cap is reached. In some embodiments, the database system may provide free service having a free cap on data volume and/or operation count, where usage below the free cap is free. When data associated with a database tenant has usage in excess of the free cap, the database tenant may automatically be moved to a paid service which is billed based on data volume and/or operation count.

In some embodiments, the system may migrate tenants between a free tier implementation to a shared tier implementation in Serverless Atlas. For example, the system may migrate a tenant from a free tier on versions of databases that are not serverless (e.g., versions of Atlas, a cloud database service, that are not serverless) or a on shared tier (e.g., a lower end fixed capacity setting) to Serverless Atlas. As such, the system may provide migration between two different environments, such as a free tier to the Serverless environment, rather than simply moving clients between tiers within a Serverless environment. For example, a database system may provide an amount of usage that is free in Serverless before a tenant is moved into a paid tier on Serverless. In some embodiments, such a migration may allow tenants to be moved from a legacy free environment to a Serverless environment.

When the system migrates a tenant from a free or shared environment to a Serverless environment, the migration may be performed as an offline migration. An offline migration may cause a user to restart their application servers.

In some embodiments, a migration process may be executed as a modified version of an initial synchronization process. In some embodiments, in an initial synchronization process, when a node is added, queries are started to request documents and insert those documents into collections. The initial synchronization process collects an operations log associated with the documents, and applies the operations log once built. Operations are applied until consistency is achieved. The migration process may differ from the initial synchronization process. For example, in the migration process, only collections for the data associated with the database tenant to be migrated are requested, rather than all collections hosted on a replica set. In addition, the migration process may be performed on a live replica set currently hosting other data, rather than a replica set not yet live.

In some embodiments, a replica set may include an operations log of database write operations. If a replica set hosts data of multiple database tenants, the operation log of the replica set may include write operations associated with each of the database tenants. During a migration process, a database system may filter write operations in the operations log associated with a tenant being migrated and tenants that are not being migrated.

In some embodiments, the database system may execute a decision engine to select data of a particular database tenant to migrate. In some embodiments, the decision engine may be select data in response to a determination that usage of a replica set is approaching overutilization.

In some embodiments, the decision engine may select, among the database tenants hosted by a replica set, a database tenant that has a lower usage than the other database tenants hosted by the replica set. The database system may then migrate that selected database tenant to another replica set. By selecting and migrating a database tenant with a lower usage, the database system may provide lower disruption of operations.

In some embodiments, all database tenants other than a single database tenant may be migrated from a replica set. Accordingly, as the utilization of the single database tenant approaches the capacity of the replica set, the single database tenant may take advantage of the full capacity of that replica set.

In some embodiments, while data associated with a database tenant is being migrated from a first replica set to a second replica set, operations at the first replica set and/or the second replica set may be throttled. Migration of data associated with a database tenant from a first replica set to a second replica set may not be instant, and may take a period of time, and throttling may occur during this time period. For example, the migration process itself may increase utilization of the first and second replica sets, and therefore throttling of usage may be used to prevent overutilization of the first and second replica sets.

In some embodiments, the database system may throttle a user with growth in usage. As noted above, a tenant with growth in usage may cause other tenants hosted on the same replica set to be migrated away. The migrated tenants are not the reason for this migration (for example, these tenants may have substantially no growth in usage), and accordingly, the database system may not throttle their usage. Because the user with the growth in usage caused the migration, their usage may be throttled to accommodate any overutilization and/or decrease in available performance from usage due to the migration itself. When multiple tenants have a growth in usage, the tenants with growth in usage may be throttled in proportion to their respective grown rates.

In some embodiments, a throttling algorithm may be configured to be more lenient to tenants who are onboarding. When tenants are onboarding, this may cause a larger spike of usage. Accordingly, the algorithm may be tuned such that tenants who have been tenants for a longer period of time are prevented from making large spikes of usage, while still allowing tenants with large loads who are onboarding to establish their initial usage. Once the system has determined, during onboarding, what a tenant's baseline usage is, the algorithm may treat the tenant similarly to other tenants, preventing large spikes of usage.

Additionally, a throttling algorithm may determine a new baseline usage of one or more tenants. For example, the algorithm may slowly reduce throttling when the system notices that the system is not suffering from increased usage. Accordingly, when the system is under hard usage, the algorithm may allow the system to be run with hard usage, so long as the multi-tenant system is below a predefined level of stress. The algorithm may dampen workload as it increases, but may avoid permanently throttling heavy workloads that are constant. As such, the system may be configured to detect a change in a long-term persistent workload, allowing more operations to be performed by tenants until workload reaches a threshold level.

In some embodiments, a database system may provide multiple tiers of storage. For example, in some embodiments, data that is infrequently accessed or has not been accessed for a threshold period of time may automatically be stored in a storage tier comprising colder storage, for example S3. Colder storage may provide lower performance for storing and retrieving data but may be provided at a lower cost. By storing infrequently used data in colder storage, the cost of storing a large amount data may be reduced without substantially impacting performance.

In some embodiments, storing at least a portion of a tenant's data in colder storage may increase the speed of a tenant migration from one replica set to another replica set. For example, while data stored in a hotter storage tier may be copied from the replica set to the other replica set, the transfer of data stored in a colder storage tier may not need to be copied. Instead, the other replica set may be pointed to the colder storage, giving the other replica set substantially instant access to the data stored in the colder storage.

In some embodiments, data associated with multiple tenants from two replica sets may be merged to one replica set. A merge may be performed in response to decreased workload, or to balance tenants on replica sets. During a merge, a donor replica set may give all of the data stored by the donor to a recipient replica set before the donor is terminated. A recipient may merge history from a donor, for example, an operations log with the recipient's history.

In some embodiments, data associated with a single tenant or data associated with multiple tenants may be split from one replica set to two replica sets. For example, a split may occur in response to increased workload associated with that tenant. In some embodiments, tiered storage may be used as described above to reduce the volume of data that is copied in a split, reducing split time.

In some embodiments, to process a split, the size of a replica set may be similar to shard mitosis. The size of the replica set may be doubled. Then, the new members of the replica set may complete an initial sync. Next, the replica set may be split into two replica sets. Last, each replica set may be instructed to delete half of the data. In some embodiments, the initial sync may be processed by copying files. In some embodiments, a shard may be processed for a replica set hosting data of multiple tenants. For a multi-tenant shard, the shard may split on tenant boundaries, and the data for the new replica set's tenants is to be copied. The split process may be repeated to split into more than two replica sets.

In some embodiments, a split may be similar to a merge process. First, a new recipient replica set with no data may be created. All data from a donor replica set may be merged to the recipient replica set. After the recipient replica set is ready, the system may block writes on the donor replica set, commit the merge on both replica sets, and update routing tables. After committing, each replica set may permit reads and writes on the half of the data associated with that replica set, and each replica set may execute orphan cleanup in the background. In some embodiments this split process may use a donate all and cleanup half process instead of a donate half process such as a multi-tenant migration, because the donate all and cleanup half process can use file copy and other optimizations that are faster and simpler than a multi-tenant migration.

FIG. 1A illustrates an exemplary embodiment a database system. In some embodiments, the database system illustrated in FIG. 1A may comprise a serverless database system. Such a Serverless system may comprise the following components. Database system 100a includes cloud load balancer 102a, front-end process 104a, mongoqs 106a, routing services 108a, user identity service 110a, slice 112a, config slices 114a, and object store 116a. Slice 112a and config slices 114a each include mongods 118a. Mongoqs 106a and mongods 118a may be associated with respective tenants Tn (e.g., T0, T2, T2, T3).

Figure 1B:
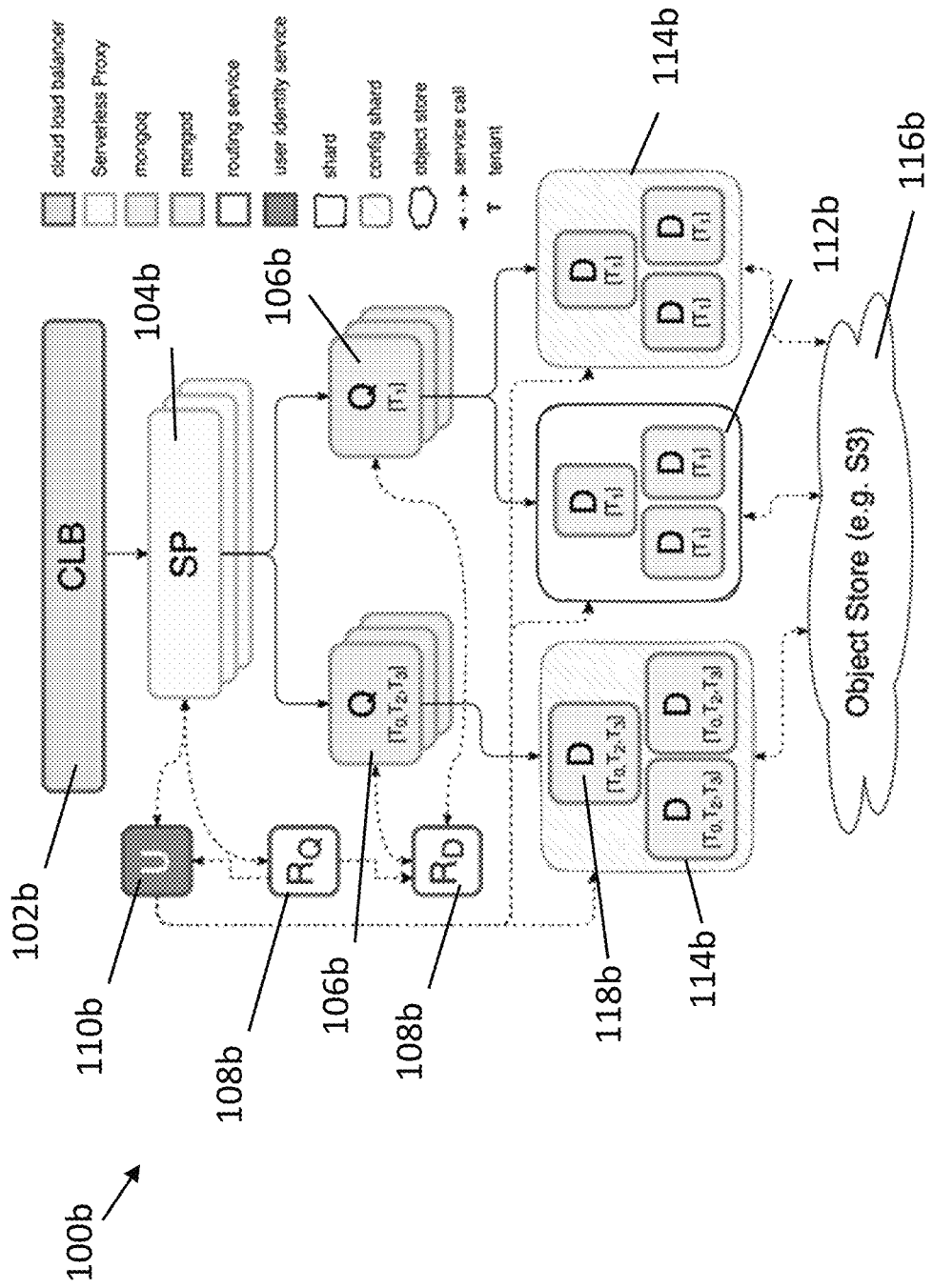
FIG. 1B is a block diagram of another example distributed database system.

FIG. 1B illustrates an exemplary embodiment a database system. In some embodiments, the database system illustrated in FIG. 1B may comprise a serverless database system. Such a Serverless system may comprise the following components. Database system 100b includes cloud load balancer 102b, Serverless Proxy 104b, mongoqs 106b, routing services 108b, user identity service 110b, shard 112b, config shards 114b, and object store 116b. Shard 112b and config shards 114b each include mongods 118b. Mongoqs 106b and mongods 118b may be associated with respective tenants Tn (e.g., T0, T2, T2, T3).

A cloud provider load balancer (CLB). The CLB is the gateway through which all applications communicate via drivers.

Multiple Serverless Proxies. The Serverless Proxies serve as a termination point for incoming TLS connections from client drivers through the cloud provider load balancer and may route requests to mongoqs.

Multiple query processing and routing (Q) processes. The Q processes are responsible for query planning, optimization, and execution. Data to satisfy client read queries and write operations are routed by a mongoq process to an appropriate mongod process. A mongoq serves some tenants, determined by the requests which are routed to it by the Serverless Proxies.

A mongoq routing service (RQ). The RQ component is an endpoint discovery service (EDS) which maintains a tenant routing map that it communicates to the Serverless Proxies. Tenants may be mapped to mongoqs on the same lines that they are partitioned into mongods.

Multiple storage management and data retrieval (D) processes called mongods. In some embodiments, a shard may be a replica set of mongod processes responsible for a partition of a pod's data. The data managed by a shard may contain multiple collections, multiple databases, and even multiple tenants. There may be multiple shards for a single tenant which are responsible for ranges of that tenant's data (similar to shards in sharding). A shard provides fault tolerance and durability for recently written data. In addition to accessing and returning data for mongoq processes, the mongod process executes parts of complex query plans, and may communicate with other mongods directly to do so. These processes manage durable data on locally attached storage as well as colder, slower to access, durable data on cloud-based storage such as Amazon S3.

A mongod routing service (RD). Tenant data routing information is stored on one of the tenant's shards, called the config shard. A multi-tenant shard is the config shard for its tenants. RD stores the list of config shards for each tenant, and a seed list of replica set members for each shard.

A user identity service (U), which may provide signed user identity tokens in order to authenticate new connections, and may additionally perform revocations of those tokens. Since a mongod is the ultimate authority for user authorization, the user identity service may communicate with the mongod routing service to find all mongods for a tenant, and communicate with those processes when performing token revocation.

Queries

A query enters the load balancing layer and is directed toward a Serverless Proxy based on the client's location.

The Serverless Proxy identifies the tenant for a request through server name indication (SNI), and authenticates the client with the user identity service (if not already authenticated), caching a user identity token for that connection upon success. The Serverless Proxy then finds a mongoq that serves the tenant using the mongoq routing service (unless it has this information in cache), and forwards the authenticated request (the original request with the user identity token attached) to the selected mongoq. For a sufficiently active tenant this mongoq may only be serving requests for one tenant.

The mongoq uses the mongod routing service to find the config shards for the tenant, which in turn are used to find the mongods responsible for the data being queried (unless it has either of these mappings in cache). For a sufficiently active tenant, these may be single-tenant shards. If the request does not require communication with a mongod, the mongoq may still perform authorization of the request against some mongod responsible for the tenant. Otherwise, an authenticated request is sent to each relevant mongod, which authorizes the request and then locates the data for the query. If necessary the mongod may copy data from a cold (remote) tier, such as S3, into a warm (local) tier.

Responses are aggregated by the mongoq and returned to the Serverless Proxy, which returns the response back to the application.

Server-Related Components

Multi-Tenancy Resource Management

Mongog

In some embodiments, a mongoq serves a subset of tenants. One mongoq process may be run per host, and these processes may be scaled horizontally across a pool of homogeneous hosts. In some embodiments, there may not be throttling in mongoq, since the mongoq layer may scale quickly in response to increased workload.

Mongod

In some embodiments, tenants who are rarely active and idle tenants may share a same shard, and thus a same mongod processes and a same oplog. Active tenants, may be hosted in a shared processes. In some embodiments, active tenants may be hosted in their own processes with cgroups for better quality of service (QoS). In some embodiments, for active tenants, resources may be overcommitted resources for better utilization.

Quality of service and resource utilization are factors in resource sharing. For example, when tenants within a same process share resources (such as a WiredTiger cache), their QoS may be decreased. In some embodiments, a database system may provide throttling and autoscaling to provide similar QoS guarantees, but weaker QoS than a tenant-per-process solution. In some embodiments, active tenants may be hosted in their own processes. To reduce costs for data storage volume and operation volume, shared processes may provide improved utilization. For a tenant-per-process solution, cost may be reduced so that active tenants are migrated to separate processes proactively before their usage is too noisy and affect other tenants.

Resource Throttling Among Multiple Mongod Processes

For a host running many mongod processes, cgroups may be used for resource isolation. Resource capping may be avoided, to support oversubscription. Swap may be enabled to avoid OOM kills.

Request Throttling for Tenants Managed by the Same Process

A request throttling algorithm may be used by the Atlas Proxy. In some embodiments, the algorithm may not be implemented directly in mongoq, since it may generally be used with a fixed number of Atlas Proxies, whereas the mongoq layer may be elastically scalable. In some embodiments, cooperative queuing is used for request throttling.

Connection Throttling

In some embodiments, connection storms may occur in Serverless. Because MongoDB processes may run on an untrusted network and/or untrusted hosts, intracluster traffic may be protected using TLS encryption and SCRAM/x.509 authentication, which may result in connection establishment being expensive. Expensive connection establishment combined with a server stall for any reason may lead to a connection storm, characterized by CPU/memory contention, a slow rate of connection establishment, and slow queries. In some embodiments, there is provided a connection management solution. For example, there may be cooperative queuing for request throttling, which may be extended to connection throttling. In some embodiments, multiplexing protocols may be used to have a single connection between each mongoq/mongod pair, which may remove a need for a connection management. In some embodiments, capacity may be guaranteed for priority classes of work.

Provisioned Capacity

A provisioned capacity design may have the following features:

A pricing structure for provisioned capacity may be understandable on its own and comparable to an on-demand pricing structure.

Metrics may be recorded to support the pricing structure.

Depending on pricing structure, a throttling mechanism may be provided to prevent tenants from consuming resources without paying for them.

In some embodiments, provisioned capacity may not be provided as a minimum level of service (for example, latency guarantees). In some embodiments, provisioned capacity may be provided as a bulk rate of throughput, expressed by either a rate of operations or in time units of a virtual set of computer resources.

In some embodiments, a rate-of-operation provisioned capacity may be provided that uses the same metrics that on-demand pricing uses. Metrics may be collected on both mongod and mongoq (for example, cursor read operations on mongod and/or sorted document count on mongoq). The throttling used to impose a maximum provisioned capacity rate may be implemented in both mongod and mongoq in kind. In addition, provisioned capacity tenants may not be treated differently from on-demand tenants in either mongoq or mongod, and the same low-latency, elastic service may be provided to all tenants. A tenant may be sequestered into a mongoq or mongod process by themselves, due to balancing decisions based on their workload, irrespective of their billing status as on-demand or provisioned-capacity.

Data Partitioning (Shards and Chunks)

Data stored in the Serverless system may be partitioned to facilitate horizontal scaling. Using a partitioning scheme, data may be distributed among many hosts. Choice of partitioning scheme may affect a data balancing algorithm between hosts as well as a routing algorithm for read and write operations to find data.

In Serverless, shards may replace shards in a routing hierarchy, and upper-bound constraints may be placed on performance of shard manipulation (data responsibility reassignment) operations (for example, split or merge). In some embodiments, a chunk, which may comprise a contiguous partition of a collection in a shard key domain or a function of the shard key domain (for example hashed sharding). A chunk may remain as in MongoDB sharded clusters, with some changes. As a first change, a shard key may be replaced with a primary key. A primary key may be chosen by a user, and the user may do so at collection creation. A primary key may be unique. A default primary key may be _id. Changing the primary key pattern of a collection may be a resharding operation. As a second change, chunk migration may be replaced with shard split, and/or merge operations to change the shards owning chunks, and replica set membership changes to change the hosts responsible for shards. Chunk splitting and merging may only happen when selecting data to use in shard split and merge operations. Shard manipulation operations may themselves be implemented in terms of primitive replica set operations and protocols for updating a chunk map in MongoDB Sharding.

In some embodiments, users may not be allowed to choose their primary key, and changing of primary keys may not be supported. For example, _id may be used as the primary key. The primary key may be different from the shard key. Users may be allowed to choose their shard key and changing of shard keys may be supported.

In some embodiments, global indexes may be represented in routing tables and in the storage subsystem analogously to collections. Local secondary indexes may be supported and may function as in MongoDB sharded clusters. Data may be clustered by a primary key. This may contrast to classic MongoDB, in which documents may be stored in a record store indexed by a record id, and all other indexes contain references to those record ids. Such clustering may provide faster collection lookup, fast orphan filtering for covered queries, and fast shard split and merge followed by background index rebuild or orphan cleanup. Global indexes may be clustered by index keys which may eliminate the background index rebuilding and/or orphan cleanup steps. Secondary index storage space may increase due to keeping the collection's primary key in the index.

Routing Tables

As in classic MongoDB Sharding, there may be two routing tables for a given tenant. One, the chunk map in classic MongoDB, may encodes a function that maps from (collection, primary key)->shard id. The other, corresponding to the classic MongoDB shards collection, maps from shard id to a set of mongod processes.

Because each shard's data is to be represented by its own storage objects in the storage layer underneath MongoDB (e.g., its own files in a file system), the shard manipulation operations deal with copying data between storage objects in addition to updating routing tables.

Shard Sizing

The smallest size of a shard may be near 0, to allow tenants interested in isolation to have their own shards, and because some tenants may have small data sizes. Shards may be split to increase write capacity, and accordingly, at least some shards may have a smaller storage size in order to achieve a desired write load.

In some embodiments, without horizontal scaling for individual tenants, a maximum shard size may be 4 TB, the same as it is throughout Atlas. In some embodiments, with horizontal scaling, a maximum size for a single-tenant shard may be 100 GB. The 100 GB size may allow performance of fast horizontal scale-out, while ensuring that most tenants occupy a single shard, which may help avoid distributed transactions. In some embodiments, with tiered storage, a maximum shard size may represent an upper-bound on the working set size, rather than the total data size.

Shard Manipulation Operations

Replica Set Membership Changes

Replica set membership may be changed to balance mongods across hosts, as well as to perform maintenance operations. Replica set member change may be performed as in MongoDB Sharding, by using replica set reconfiguration and updating the mapping from shard to mongods.

Shard Merge

Shards may be merged in response to decreased workload, or as part of balancing tenants between multi-tenant mongods. The Serverless control plane may choose a Donor that gives all its data to a Recipient before being terminated.

Before the merge begins, the Donor primary coordinates with the Recipient primary to ensure the merge does not violate the Recipient primary's WT oldest timestamp. The Recipient primary coordinates with the Recipient secondaries to ensure the same.

The Recipient may copy the Donor's data files, and merge them with its own using a WiredTiger mechanism. To support snapshot reads across the merge, the Recipient may merge the Donor's history, also using a WiredTiger mechanism. The Recipient may copy the Donor's oplog but keep it in a separate collection. A virtual oplog on the Recipient may present the oplogs as if they were merged.

The Donor primary drives the merge by calling commands on the Recipient primary. A Donor failover may abort the merge. The Recipient primary, in turn, calls commands on its secondaries, telling them to execute the same steps as itself. All Recipient secondaries may be available throughout the merge or it may abort.

Causal consistency may be achieved throughout the merge using the mongoq routing table, and by using a shard versioning mechanism. TenantMigrationAccessBlocker from Multitenant Migrations may also be used.

After the merge, the Donor may live on for a short period in a quiesce mode while client reads finish.

Local indexes may increase merge time because they may be copied and merged.

Merging local indexes may not benefit from clustering by primary key.

Clustering by primary key may reduce merge time if WiredTiger's merging algorithm benefits from clustering.

Tiered storage may reduce merge time, since the Recipient may need to copy only the Donor's working set and its recent oplog entries.

Shard Split

A shard may be split in response to increased workload. A shard may be split using multiple methods.

Split 1 is similar to shard mitosis: double the size of the replica set, wait for the new members to complete initial sync, then split the replica set in two and instruct each replica set to delete half of the data. Initial syncs may be done by copying files or using tiered storage to avoid copying all of the data. In the case of a multi-tenant shard, the shard may be split on tenant boundaries, so only the data for the new replica set's tenants may to be copied. The procedure may be generalized to splitting into many replica sets.

Split 2 is an extension to the merge algorithm above: create a new recipient replica set with no data, and merge all data from the donor replica set to the recipient. Once the recipient is ready, block writes on the donor, commit the merge on both replica sets, and update the routing tables. After committing, each side permits reads and writes on its half of the data, and each side executes orphan cleanup in the background. Split 2 may be implemented as donate all and cleanup half, instead of donate half like Multitenant Migrations, because the former can use file copy and other optimizations that may make it faster and simpler than Multitenant Migrations.

For both split algorithms, local indexes may increase shard split time because local index data may be copied and cleaned as part of orphan cleanup.

Clustering by primary key may reduce split time because orphan cleanup may be done through collection truncation, rather than individual delete operations.

Tiered storage may reduce split time, since only the working set may be copied or only the working set may be copied.

Global Indexes

In Sharding, all secondary indexes are local. Global indexes are partitioned on the index key, which is independent from the collection's primary key, and hence a global index partition may be on a different shard from the collection it indexes. For Serverless global indexes, local indexes, or both may be offered, and may be selected based on these considerations:

Global indexes may enforce uniqueness constraints. Write latency of global indexes (for example, for same region cross-AZ replica sets) may be 19 ms with std dev 4.9 ms. This may be reduced to 15 ms by implementing optimizations that reduce mandatory majority writes. Non-covered index queries may use an additional network hop with global indexes. Broadcast queries may be used by local indexes. In MongoDB Sharding according to some embodiments, broadcast queries may consume increased resources when there are 100+ shards. With respect to shard split time, local indexes may be copied as part of shard split, and they may be cleaned as part of orphan cleanup. With respect to shard merge time, the engineering cost of utilizing only global indexes in the query system Serverless may have global and local indexes because global indexes may be used to enforce uniqueness constraints for multi shard collections and offer better ability to scale in and out. Local indexes may be offered, since global indexes may have higher write latency for multi shard tenants. Global indexes in query planning and execution may not be fully supported. Global indexes may be supported by the query system in mongoq and mongod. Local indexes may not be offered in Serverless if they limit the ability to scale in and out. To decrease maintenance and development complexity, the local index code may be confined to some parts of the system.

Scaling Metrics

In order to scale quickly, the system may timely access metrics collected in near real-time. The basic metrics measured for each process (Serverless Proxy, mongoq, and mongod) may be CPU usage, physical memory usage, IO rate, and network usage. For mongoq and mongod processes that are supporting multiple tenants, per-tenant resource consumption metrics may be extracted to make decisions on how to split or merge shards and how to change replica set membership in order to balance active workloads across hosts and processes. A server resource metric collection feature may be used to periodically collect per-database statistics in order to bill users and also scale clusters.

Routing

A general stack for Serverless may be: client->load balancer->Serverless Proxy->mongoq->mongod Finding a Mongoq that Serves a Tenant A mongoq may serve a subset of tenants. Tenants may be mapped to mongoqs on the same lines that they are partitioned into mongostores. An endpoint discovery service (EDS) called the mongoq routing service may maintain a map from tenants to mongoqs and monitor the mongoqs. The Serverless Proxies may communicate with the mongoq routing service.

The Serverless Proxies may serve all tenants, and therefore, there may be excess idle connections between the Serverless Proxies and the mongoqs. Accordingly, idle connections may be mitigated by setting the Serverless Proxy's ConnectionPoolOptions (maxPoolSize, minPoolSize, maxIdleTimeMS), or using changes to mongoq to support a multiplexing transport protocol, to change the thread-per-connection model, or to use the new tcmalloc that uses per-CPU caches.

Finding a Document within a Tenant's Data

Tenant data routing information may be stored on one of the tenant's shards, called the config shard. A multi-tenant shard may be the config shard for its tenants. A mongod routing service may store a list of config shards for each tenant, and a seed list of replica set members for each shard. Mongoq may cache routing information, but it may store its cache in WiredTiger, in order to support spilling to disk. Mongoq may use a ReplicaSetMonitor to monitor the topology of each shard replica set.

Tiered Storage

Serverless may use multiple layers of on-disk (durable) storage, for the following two reasons:

First, in order to economize idle tenants, their data may be moved into cheaper, cold storage and busy tenant data may be kept more easily accessible in more expensive but more performant storage options, such as locally attached SSDs or Elastic Block Storage devices.

Second, migration and backup of tenant data may be improved when cloud object stores such as Amazon S3 are utilized, which may reduce the number of full copies of data that are kept for a particular replica set to one copy.

A tiered storage model for Serverless may include top tier and bottom tier storage. Top tier may include in-memory cache locally-attached storage or EBS. Bottom tier may include cold storage such as S3.

The storage engine internally manages the movement of data between these tiers. The data stored in S3 for a shard may only be written to by one node (mongod) in a replica set (for example, the primary node of the group may perform the writing, or the primary may choose a viable secondary to perform the writing). The writes may be performed as a periodically running checkpoint.

For example, in a WiredTiger storage engine, a checkpoint may be started every 60 seconds. This checkpoint writes data from dirty in-memory pages into new pages on disk. As the checkpoint completes, these dirty cache pages are marked clean and can be erased from memory as used (for example, to make room for other pages). Similarly for tiered storage, a new periodic checkpoint may run that may write all newly changed data to an S3 object store. Afterwards, on-local-disk (middle tier) database pages and in-memory cache pages (top-tier) that were transferred into S3 may then be deleted. In this manner, an idle tenant may eventually transfer all data into S3, and thus may reduce its in-memory and on-local-disk database data consumption to virtually zero or zero.

While only one node may be used to write checkpoint data into S3, all nodes may be reading from S3 in order to service reads of cold data. This paging mechanism may function similarly to how WiredTiger pages data into cache from disk. Non-primary nodes may be notified of what data is available for them to read and where to find it, which may inform what data can be evicted from local storage. S3 object stores may write and delete whole objects, and accordingly an algorithm may be used to efficiently store groups of database pages in S3 as objects instead of using random-access files.

By using a shared storage tier, avoid copying all the data as part of initial sync may be avoided. Checkpoints in S3 may also be used for backup.

Consistency Guarantees

In MongoDB, a client that performs majority writes and majority reads with readPreference primary may fail to read their own writes after an election, for two reasons.

First, after an unplanned election, the old primary continues to serve reads until it learns of the new primary and steps down (or until all clients have learned of the new primary). This issue may only affects clients that access the database through multiple routers, so it affects sharded clusters, Serverless, and applications where end-users access the database through multiple app servers.

Second, after a planned or unplanned election, the new primary's majority commit point may be stale until it majority commits the first write of its term. In some embodiments, a primary failing to read its own writes due to stale commit points may be prevented by having a new primary avoid serving majority reads until it has committed the first write of its term.

In Serverless, clients may interact with a database through multiple mongoqs, and accordingly, the above points may be relevant. Additionally, Serverless may use planned elections, since these may occur as part of shard manipulation operations. Users of Serverless may not be able to choose maintenance windows in order to avoid anomalies due to elections.

Logical Session Management

Memory usage of logical sessions from FaaS clients may not be controlled. Although FaaS environments that are reaped due to idleness may not send endSessions, the idleness timeout for AWS Lambda may be longer than the server-side session timeout, so Lambda may not increase the total number of sessions on the server. Additionally, a single logical session cached in memory may use at most 3 KB of RAM, so an application may not make the RAM usage from sessions large without opening a large number of FaaS environments, which may encounter other limits before sessions' RAM becomes a problem.

Change Streams

Database systems described herein may implement change streams. Change streams may be configured to allow applications to access real-time data changes without tailing the oplog, which may be more complex and riskier.

Change streams may be consumed by internal products such as Realm Sync and the Atlas Search module as well as by external users. The current change stream implementation may have reduced performance from a difficulty in isolating resources and charging users for usage since the oplog resources it consumes on the server may be affected by adjacent tenants in a shared-tenant model.

Requirements

Serverless' support of change streams may be affected by the following factors: Maintenance operation may not affect the ability to resume a changestream (for example, rolling resyncs). It may be guaranteed that a change stream event may be preserved up to a user-configurable maximum time within a threshold range. A resource cost of executing change streams for a given tenant may not grow linearly with the number of concurrent operations from other tenants. Change streams may scale to a substantially infinite number of concurrent streams if users are willing to pay more. The concurrent resumption of all change streams on a cluster with a resume token 30 minutes in the past may not noticeably impact other workloads running against the cluster. Resource consumption of a change stream may be measured in a multi-tenant environment (or using a mechanism that may be rolled up to usage by a tenant). Ability to keep up with high churn for consumers like Atlas Search when data is sharded may be provided. Change Streams may require pre-registration. Global clusters may be supported. Global causal consistency for tenants may continue to be supported. Per-document causal ordering for internal services that prefer lower latency and scalability than global causal consistency at the cost of handling data movements explicitly may be allowed.

Design

Change streams are offloaded from the oplog collection to separate change collections in multi-tenant mongods. Each tenant in a given multi-tenant shard is mapped to a unique change collection hosted in the same shard. Single-tenant mongods may maintain the change collections across split and merge or may keep using the oplog collection to serve change streams and support the transition between change collection and oplog. Oplog entries may be inserted to change collections in the same WiredTiger transaction as the oplog writes. Change collections are replicated as derived data (for example, config.transactions) during oplog application and are cloned in initial sync.

Split and merge may happen on tenant boundaries in multi-tenant mongods. For change collections on single-tenant shards, split and merge may be supported as for the oplog. Change streams may filter out the events that do not belong to the shard, including events in the oplog and inactive change collections, if any. Retargeting may be used on split and merge to avoid missing or duplicated events. Special oplog entries are inserted on both the donor and recipient to mark their causal dependence. These special entries can be used to reestablish the causal ordering for documents in the affected shard. Mongoq can reorder events from multiple shards by cluster time to provide global causal consistency, similar to mongos.

Infinite scalability and performance isolation are provided by adding secondaries, including adding non-voting members, and leveraging secondary reads.

Since change collections introduce extra costs, users may opt in to change streams support.

Cloud-Related Components

Deployment

Pods

The Serverless system may be deployed in units called pods. Each pod may contain its own load balancer, Serverless Proxies, mongoqs, and mongods. Pods manage around 200,000 tenants. Pods are useful for fault isolation, as well as limiting the number of processes that may communicate with each other.

Size of a Pod

FIGS. 3A-3B illustrate a table related to size of a pod.

Load Balancing

There may be a load balancer provided by the cloud provider (for example, AWS Elastic Load Balancer) in front of the Serverless Proxy layer. The presence of a load balancer may allow dynamic adjustment the set of Serverless Proxies without participation of the drivers, and without depending on DNS propagation. AWS may use one of their load balancers in order to support PrivateLink.

Maintenance

The deployment system may be responsible for performing maintenance on all the processes in the Serverless system. Just as the Atlas system performs maintenance on clusters to ensure stability and uptime, so too may a Serverless system.

Since the Serverless system may support multi-tenant clusters, users may not be able to specify maintenance windows, so maintenance may be as non-impacting as possible.

Additionally, Serverless may proactively improve customers' cluster performance through auto-indexing and automatic storage format updates, which customers may conventionally have had to initiate manually.

Serverless Proxy Security

Serverless Proxies may serve as the termination point for incoming TLS connections from client drivers through the load balancer. The Serverless Proxies may perform authentication and can be used to mitigate connection storms, thus protecting the lower level components. Connection establishment from the client/load balancer to the Serverless Proxies, including handshaking necessary for encryption, may be as rapid and inexpensive as possible by using features such as TCP FastOpen.

Support for Private Networking

Support for private networking options such as AWS PrivateLink for privately connecting in Amazon Virtual Private Cloud, or Azure Private Link, may be designed into Serverless' Serverless Proxies.

In some embodiments, the system may provide private and public networking to tenants so that tenants may transition between public and private networking as desired. Accordingly, the system may lock down network access. For example, tenants with larger needs and/or more sophisticated needs may use private networking, while tenants with smaller needs may use public networking, and the system may allow tenants to transition to using those private networking with reduced or without downtime, and tenants may also transition back and forth as desired. In general, some tenants may start with public networking and then transition to private networking over time. To allow both public and private networking, the system may ensure that connections from outside the system's network has to come in through a cloud provider load balancer, and can not connect directly to any of the internal processes in the system. For example, with AWS this may be implemented using firewall rules, and on Azure and other options, this may be implemented by giving some processes private IPs.

Internal Process Authentication

Internal processes may authenticate with mongoq and mongod using x.509 authentication. There may be one or more Certificate Authority (CA) per pod. Mongoq and mongod may only accept connections from entities with certificates signed by their pod's CA(s).

Any Serverless Proxy may be permitted to talk to any mongoq, and any mongoq may be permitted to talk to any mongod, but they may include signed user identity tokens in their requests to read user data (other than routing table data).

Mongods may authenticate with other mongods using 3 types of identities: replica set, tenant (may only be used for multi-shard tenants), and split/merge operation id (ephemeral). These identities may be encoded in the certificate.

Mongoq and mongod may only permit writes from a MongoDB agent on the same host, but they may permit reads from any MongoDB agent. Mongoq may use a mechanism for authorizing MongoDB Agent operations, since it delegates authorization checking for user requests to mongod. This mechanism may be extensible to other internal system processes that connect to mongoq for purposes unrelated to user requests.

User Authentication and Authorization

Authentication for Serverless Phase 0 is performed by the Atlas Proxy. Each proxy maintains a full user list in memory, and it updates its list via a 30 second periodic request to an Atlas API endpoint. After authenticating a user, the proxy implements all user authorization checks for the lifetime of the connection. Any connections from the proxy to a mongod server use a common database user with all privileges used for any Atlas user. Thus, the server's authorization mechanisms are bypassed. In particular, this prevents auditing from identifying individual users or originating connections. User-aggregated server metrics for billing or problem diagnosis may not be provided because they may only be aggregated by database.

User Identity Service

In Serverless MongoDB, user authentication may not be performed by the Serverless Proxy itself. Instead, it may be done by a well-named, highly available user identity service for which the Serverless Proxy acts as a transparent proxy. This architecture may support SCRAM, X.509, and AWS-IAM, and may be extensible to support other protocols. Information about user identities, credentials and roles may be stored in the user identity service. The mongoq and/or mongod nodes for a tenant may be used as an implementation of this service, but a separate service may be used to achieve minimal authentication latency in large, globally distributed pods.

Instead of pushing user credential and privilege changes to Serverless Proxies, the cloud control plane and automation machinery may push them to the user identity service. Making changes to credentials, roles and privileges may occur through the Atlas API or UI, as happens in other Atlas deployments.

Successful authentication conversations may end with the user identity service transmitting a signed user identity token that encodes the tenant id, user id, and expiration information back to the Serverless Proxy. The Serverless Proxy may then attach that token to client operations destined for mongoq or other services. Mongoq and other services may use that token to make authorization decisions about specific operations.

To allow for fast revocation of user privileges, services using these tokens to authorize requests may communicate with a revocation service.

For authentication and communication protocols, a stock user identity management service may be used, and a user identity service may support use of third-party services.

User Authorization

Mongod may accept requests from mongoq containing a signed user identity token, and it may perform a user authorization check for requests from mongoq. Mongoq may contact mongod to perform an authorization check if it does not otherwise need to contact a mongod for an operation. Checking authorization on mongod guards against a compromised mongoq, or an attacker that obtains a direct connection to a mongod. It may allow the revocation service to only contact the mongods for the tenant when revoking a user's privileges, which is important because a mongoq can theoretically serve a request from any tenant.

Mongod may not require a signed user identity token or check user authorization for requests from other mongods. To achieve this, mongoq and mongod may use independently categorizable credentials to authenticate with mongod.

If user authorization is not checked on mongoq, there is a risk that a weakly privileged user may generate a large amount of traffic by sending unauthorized scatter-gather queries that may ultimately be rejected. In some embodiments, a system may detect this behavior and revoke access.

New Highly Available Services

A user identity service may perform user authentication and return a signed user identity token. It may be easily found by the Serverless Proxies. It may also contact mongods to revoke user privileges.

A mongoq routing service may comprise an endpoint discovery service (EDS) that maintains a map from tenants to mongoqs and monitors the mongoqs. It may be easily found by the Serverless Proxies. It may be similar to the service that routes Envoy processes to Atlas Proxies.

A mongod routing service may store the list of config shards for each tenant and a seed list of replica set members for each shard. It may be easily found by the mongoqs.

Service discovery for these three services may be unified and/or these services may speak common protocols.

Scaling

Through a combination of shard splitting, shard merging, and replica set membership changes, the Serverless system may balance between the number of cloud host systems running and consuming resources, and users' perceived performance (latency and throughput) of their databases. In general, the system may provide a steady throughput for user workloads, while at the same time reducing resources consumed by idle tenants. Scaling adjustments made to the system for changes in workloads may be made relatively rapidly when workloads increase, because scaling up too slowly can affect tenant workload performance, but can be slower for adjustments made when workloads decrease, because scaling down too slowly may affect cost to run the system.

Scaling decisions may be made and executed by the Atlas Planner. Data used by the planner to make scaling decisions (such as data required for scaling policies) may be collected by the Atlas Control Plane and the planner may be invoked when a decision may be made.

The Atlas Planner may be adapted to fit the Serverless MongoDB use case in a number of ways, including performance improvements and decreasing its fault domain. The Planner infrastructure may be made resilient to cloud provider regional outages, and multiple Planners may be run, reducing the impact of any given planner becoming unavailable.

The mongod layer of an Serverless MongoDB pod may consist of a pool of homogeneous hosts. The hosts may be spread across the availability zones that may be used by the system, and may be sized to at least support the largest size that a single mongod process may be allowed to vertically scale to.

Mongod processes can be assigned to any host that meets the criteria for the mongod (e.g. has enough available resources, is in the availability zone the member may be in, etc).

If a mongod is to vertically scale but there are not enough unallocated resources on the host it is currently on, that mongod may be moved to another host or other mongods on the current host may be moved off of the host.

In some embodiments, the planner may be parallelized, and hosts and tenants may not be partitioned into disjoint groups for planning.

Atlas Search Integration

Text Search may consist of a separate mongot process running Apache Lucene with some Java front end to drive it.

Tenant Backup and Restore

As tenant data slices are stored in Amazon S3 or similar cloud data store, backup and restore services can be serviced by the S3 buckets themselves, since data preservation that S3 provides may be utilized.

Auditing

In Atlas Dedicated, audit logs are kept for each mongod and mongos process individually for 30 days and are subsequently purged. Users may set up some scheduled recurring process to pull these logs via the API before they get deleted. Cloud team has a backlog work item to push these logs automatically into a user-owned S3 bucket.

For Serverless, this mechanism may be similar, and may differ in that tenant audit log files may be generated by mongoq and mongod processes. There may be automated push-logs, since Serverless users may not be able to identify individual servers from which to manually download logs. Tenants may change audit settings without restarting mongod and mongoq processes.

Logging

Log files may be managed by the Atlas infrastructure, where they are collected and securely stored for 30 days before being purged. There may be a mechanism where employees of the database system owner may request copies of these logs for debugging purposes, and the log data itself is scrubbed of PI and aggregated into a database for use by engineering and product.

Protection Against Crash Exploits

A malicious user could discover a way to crash a Serverless Proxy, mongoq, or mongod, such as with a crafted input. They may seek to disrupt another user's clusters, or to harm MongoDB's reputation. There are four aspects of defense:

Prevention: crashy assertions (invariant, fassert, . . . ) may be removed from code, Javascript may be banned, complexity of aggregation pipelines and other command inputs limited, and various kinds of fuzz-testing may be used to discover crash bugs before they are exploited.

Containment: bots may be prevented from creating accounts. Crashed process may be auto-restarted and internal operations may be auto-retried. Decisions about cluster placement may be hidden so that an attacker from the outside cannot determine whether they are co-located with a specific user they wish to disrupt.

Detection: tenant and command associated with each crash may be logged, and patterns that are associated with crashes may be watched for.

Reaction: crashy clusters may be isolated to their own processes while a human investigates. Very disruptive accounts may be automatically disabled, or requests from suspicious IPs may be denied.

Upgrading Through Serverless Phases

Customers may be moved seamlessly through each phase of Serverless. This may be done through upgrading the binaries, without a live migration. If live migration is necessary, a mechanism for tenant migration may be used to migrate tenants to nodes of the next version. This involves coordination with the Atlas Proxies, the logic of which may be incorporated into Serverless nodes to hand off the migration successfully Migration from Serverless to Atlas Dedicated Serverless may support migration to Atlas Dedicated, and this support may be extended.

Migration to a dedicated tier (for example, the architecture known as Atlas Dedicated, not some single-tenant-isolated Serverless architecture) may be seamless for users in order to make using Serverless more appealing. Three major use cases for migrating to the dedicated tier are: First, users whose Serverless workload changes to the point where running on the dedicated tier may be less expensive. Second, users who desire to use Atlas Dedicated features that are not available on Serverless. Third, users currently on Dedicated contemplating running on Serverless instead, but need assurances they can switch back to Dedicated easily in case of problems.

Migration from Serverless to Dedicated Atlas consists of using MongoMirror. In some embodiments, the MongoMirror migration may be replaced with a migration process that uses Change Streams at its core. In some embodiments, migrations from Serverless to Dedicated Atlas may use Change Streams and not use MongoMirror.

Such a migration process may cover most migration requirements, leverage other work to support tenant migrations and cross-cluster replication, may be relatively easy to secure, and may be extended to cover tiered storage.

Specifically, the following requirements are expected to be easily met by this solution: Migrations may be from Serverless version to equivalent Atlas Dedicated server version. Data locality zones may be enforced throughout a migration. There may be no operation errors observed by users as a result of migration mechanics, other than required application restarts at the moment of transition to Dedicated as the live site. There may not be a substantial increase in operation latency during a migration. There may be an unavailability window during application restarts at the moment of transition to Dedicated as the live site. There may be an ability to migrate into a sharded Dedicated system.

Some migration aspects may not be achieved using this solution: Connection string changes: Forcing users to change their connection strings in order to complete a migration has some benefits, including greatly simplifying the logic required to ensure retryable writes do not silently do the wrong thing and corrupt data. This process has excellent overlap with the Cluster to Cluster Replication Initiative; it satisfies most if not all of the aspects and could also overlap well with one of the projects contained in that Initiative, Enable Seamless and Reliable Atlas Migrations.

The change-streams process may provide an architecture that may not be too expensive (in resource consumption or performance degradation) while the migration was active, and thus a migration mirror may be maintained for a relatively long period of time, if desired.

Live Import

Live Import is a feature that allows a user to transition their existing on-prem or Atlas Dedicated system into Serverless MongoDB. Serverless may not have any live import mechanism for Atlas Dedicated customers. Live import may allow customers to be able to import directly from on-prem into Serverless without passing through Dedicated.

Global Clusters

Serverless may support multi-region offerings for disaster recovery and local reads and writes.

In some embodiments, a Serverless Proxy may comprise one of a set of processes that serve as a termination point for incoming TLS connections from client drivers through the cloud provider load balancer and that routes requests to mongoqs.

In some embodiments, a mongoq may comprise one of a set of query processing and routing processes. A mongoq processes may be responsible for query planning, optimization, and execution. Data to satisfy client read queries and write operations may be routed by a mongoq process to an appropriate mongod process. A mongoq may serve some tenants, which may be determined by the requests which are routed to it by the Serverless Proxies.

In some embodiments, a mongoq routing service may comprise an endpoint discovery service (EDS) which maintains a tenant routing map that it communicates to the Serverless Proxies. In some embodiments, tenants are mapped to mongoqs on the same lines that they are partitioned into mongods.

In some embodiments, a mongod may comprise one of a set of storage management and data retrieval processes. A shard may comprise a replica set of mongod processes responsible for a partition of a pod's data. The data managed by a shard may contain multiple collections, multiple databases, and even multiple tenants. There may be multiple shards for a single tenant which are responsible for ranges of that tenant's data (similar to shards in sharding). A shard may provide fault tolerance and durability for recently written data. In addition to accessing and returning data for mongoq processes, the mongod process may execute parts of complex query plans, and may communicate with other mongods directly to do so. In some embodiments, a mongod may manage durable data on locally attached storage as well as colder, slower to access, durable data on cloud-based storage such as Amazon S3.

In some embodiments, a mongod routing service may manage tenant data routing information. The tenant data routing information may be stored on one of the tenant's shards, as a config shard. A multi-tenant shard may comprise a config shard for its tenants. Rs may store a list of config shards for each tenant, and a seed list of replica set members for each shard.

In some embodiments, a pod may comprise a unit of Serverless deployment containing its own load balancer, Serverless Proxies, mongoqs, and mongods. In some embodiments, tenants may not move between or span pods.

In some embodiments, a shard may comprise a replica set of mongod processes responsible for a partition of a pod's data.

In some embodiments, a working set may comprise a set of storage engine pages containing data referenced (paged into memory) for a particular workload for a particular period of time. These pages may be considered warm either in memory or local disks/EBS. When tiered storage is available, the portion of the working set not yet durable in the bottom S3 tier may dominates the cost of shard migration.

In some embodiments, a node catalog may comprise a mapping of shard id to mongod host address.

In some embodiments, a data catalog may comprise a list of databases, collections, indexes, and chunk mapping.

It should be appreciated that various examples above each describe functions that can be and have been incorporated in different system embodiments together. The examples and described functions are not exclusive and can be used together.

Features of database systems described herein may include the following. Customer provisions a serverless cluster and receives a connection string. Customer uses that connection string and the backend seamlessly accommodates changes in workload thereafter without customer input, including scaling up and down. As customer workloads ramp up, requiring backend scaling, customers are aware that they are paying more. Serverless clusters start free. Serverless clusters' storage size can scale up to 1 TB, up to 4 TB, or up to larger data sizes using sharding and/or tiered storage, and may be able to transition to dedicated clusters. Serverless clusters' latency/throughput may be within single digit percentage margin of dedicated cluster. Customer feels they pay less when their workload decreases. In some embodiments, there may be a time to reaction to a workload decrease (at least from a billing perspective), which may be in the range of minutes, which may depend on finer grained billing with granularity better than per hour. In some embodiments, customers may only be charged for the operations they perform, regardless of variation in workload. Customer economics reflect the perception that data can be moved to cheaper storage options (eg: HDD, disk snapshot, or object storage) after a certain amount of time of inactivity to reduce cost, then rehydrated when used. Customer's database performance may be unaffected by other customers. Backend scaling operations are minimally apparent or disruptive to user. Customer has a simple billing model, or the appearance thereof. Customer may only pay for a small number of simple SKUs that obfuscates any underlying backend implementation. Customer has the ability to seamlessly transition to regular Atlas at any point For non sharded clusters, customer has the ability to seamlessly transition from regular Atlas to serverless Atlas. Cluster monitoring may intelligently show metrics relevant to the customer while obfuscating backend infrastructure. In some embodiments, Performance Advisor, Query Profiler, Schema Antipattern Advisor may provide support for a serverless cluster. Serverless clusters' MongoDB features are equal to features of the shared tier. FTS may be implemented with serverless Atlas.

Additional features may include the following. A cost-effective way to get private networking for serverless clusters. Backend scaling operations may aim to preempt peak workloads to minimize disruption. Preemption may take the forms of predicting peak loads based on rate of growth, or predicting cyclical time-based workloads A database system may support migrating a set of databases from one replica set to another. To provide a serverless database experience, users may pay by usage and not machine and are agnostic to the hardware behind the scenes. Serverless may be implemented using a fleet of multi-tenant replica sets filtering and routing user requests. Each user may be able to have multiple databases, which may be internally prefixed with the tenant ID and database name.

A fleet of replica sets between which data can be migrated may closely resemble a sharded cluster.

In some embodiments, there is implemented an API of server-side commands that Cloud can use to orchestrate the migration of a set of databases from one replica set to another. Multiple migrations can happen to the same recipient and from the same donor concurrently. A replica set can concurrently be the recipient of one tenant and the donor for another tenant.

Consistency and isolation guarantees may be maintained across a migration. Multi-document transactions on the donor that are aborted due to migrations may be retryable (and transparently retried by the driver without driver changes) on the recipient. Migrations may be robust against the side effects of elections on the donor and the recipient replica sets. Retryable writes initiated on the donor are retryable on the recipient without driver changes. Preserve writes confirmed by the donor with write concern w:1 or greater.

Change streams started on the donor are resumable (and transparently resumed by the driver or proxy) on the recipient, if the recipient has sufficient oplog history. Full text search indexes are consistent on the recipient upon finishing a migration.

Supports filtered replication outside of the specific Serverless Atlas use case. Supports migrations where either donor or recipient is sharded. Supports migrations between Server versions. Both the donor and recipient may be on the same Server version in the fully upgraded FCV. Use serverless migration machinery for chunk migration. Use serverless migration machinery for "movePrimary." Maintain any routing information. Ensure change stream resumability for arbitrarily lagged change streams. Resumability of change streams may be no worse than after an initial sync of a new node. In some embodiments, a minimum oplog window may be maintained across a serverless migration.

The set of databases in any given migration may be logically a distinct DBMS from all other databases and there may be no reads or transactions affecting data that may be migrated and data that may not be migrated. Migrations may be as disruptive as failovers.

Some reads and writes to the migrated databases on the donor after the migration and on the recipient during the migration may be rejected.

In some embodiments, the system may share snapshots among tenants. For example, using tiered storage the system map provide different snapshot retention schedules for different tenants, without storing additional tenant data for longer time periods. The system may use portions of backups of different tenants and store them for different amounts of time.

Using different backup retention schedules with tiered storage may allow the system to reuse data files that are stored in the object store for backups. This may allow the system to avoid duplicating storage between the database and the backup. With tiered storage, some objects may be written to Cloud Object Storage. Once objects have been written to object storage, they may not be modified, in some embodiments. These objects may then be reused for a backup system. Where the database system may be ready to garbage collect some of these objects in the object store that are no longer being used, when they are used as part of a backup, the objects may be retained to later be used to restore as part of a backup restore, in contrast with a conventional backup system, where the storage in the database and the storage of the backup is separate and can include duplication, reducing efficiency.

Example: Serverless Auto-Scaling Engine

Exemplary fields and other aspects that may be embodied in an exemplary database system configured to host a plurality of tenants are described below.
Models
path prefix—com.xgen.svc.nds.serverless.model.autoScaling
ServerlessMTMAutoScalingContext
Add Fields
lastClusterTierScaleinitiated: Date
lastDiskSizeincreaseinitiated: Date
lastCapacityincreaseRequestinitiated:Date
Remove Fields
migrations: List<ServerlessMTMMigration>
Migrations
add/remove fields
path prefix—com.xgen.svc.nds.serverless.model.autoScaling.pool
ServerlessMTMPool
Add Fields
nextRebalanceDate: Date
lastRebalanceDate: Date
autoScalingEnabled: boolean o This may default to true
Migrations
add new fields
ServerlessAutoScalingV2Pool
Mirra ServerlessAutoScalingV1Pool using ServerlessAutoScalingStrategyV2Pool
path prefix—com.xgen.svc.nds.serverless.model.autoScaling.strategy
ServerlessAutoScalingStrategyMetricThresholds
target utilization
This is the utilization that may return an MTM to after scaling
migration recipient candidate utilization
This is the utilization that may not push a recipient MTM above when it is the target of one or more migrations
max utilization
This is the utilization that may trigger auto-scaling on an MTM
Fields
targetUtilization:
_migrationRecipientCandidateUtilization:
_maxUtilization:
ServerlessAutoScalingStrategyV2
extends ServerlessAutoScalingStrategyV1
float float float
Extend ServerlessAutoScalingStrategyV1 with the new metrics listed below. The thresholds listed here may be adjusted.
Add Fields
connectionsUtilization:
ServerlessAutoScalingStrategyMetricThresholds o _targetUtilization
default 0.6
_migrationRecipientCandidateUtilization
default 0.7
maxUtilization:
default 0.8
_cpuUtilization: ServerlessAutoScalingStrategyMetricThresholds
_targetUtilization
default 0.6
_migrationRecipientCandidateUtilization
default 0.7
maxUtilization:
default 0.8
_memoryUtilization: ServerlessAutoScalingStrategyMetricThresholds
targetUtilization
default 0.6
_migrationRecipientCandidateUtilization
default 0.7
maxUtilization:

default 0.8
readIOPSUtilization:
ServerlessAutoScalingStrategyMetricThresholds
targetUtilization
default 0.6
_migrationRecipientCandidateUtilization
default 0.7
maxUtilization:
default 0.8
writeIOPSUtilization
targetUtilization
default 0.6
_migrationRecipientCandidateUtilization
default 0.7
maxUtilization:
default 0.8
Update Methods
Methods may use new metrics
path prefix—com.xgen.svc.nds.serverless.model
ServerlessInstanceSize
Add Fields
SERVERLESS_V2
path prefix—com.xgen.svc.nds.serverless.model.load
ServerlessTenantload
Add Fields
busynessScore: double
See Busyness Score
connections: ServerlessTenantConnectionLoad
_cpu: ServerlessTenantCPULoad
bytesIO: ServerlessTenantBytesIOLoad
Migrations
Add new fields
ServerlessMTMLoad
Add Fields
connections: ServerlessMTMConnectionLoad
_cpu: ServerlessMTMCPULoad
_memory: ServerlessMTMMemoryLoad
_iops: ServerlessMTMIOPSLoad
Migrations
Add new fields
Add discriminator
ServerlessMTMConnectionLoad Aspects of the disclosure relate to Multi Tenant MongoDB (MTM). A MTM may comprise a replica configured to host multiple tenants. In various embodiments, an MTM may be a participant in a migration. Exemplary fields and other aspects that may be embodied in a database system comprising an MTM are described herein.

Track connection load of the MTM as a whole. As the system may run with "proxy as a mongos", the 500 connection limit per tenant may result on all mongoses focusing the 500 connections back to a single member of the backing MTM, resulting in an upper limit of 1500 connections per tenant to a given MTM cluster member. In some embodiments, the upper limit may not be used due to the way incoming connections are distributed amongst the proxies.

Fields
currentFreeConnections: int
totalConnections: int
utilization: float
historicalAverages: List<ServerlessLoadMetric>
Historical averages of connections used over 1, 6 and 24 hours
ServerlessMTMCPULoad
Fields
currentidleCPU: float
TOTAL—(USR+SYS)
totalCPU: float
the non-normalized CPU max
utilization: float
historicalAverages: List<ServerlessLoadMetric>
Historical averages of CPU used over 1, 6 and 24 hours
USR+SYS
historicalidleAverages: List<ServerlessLoadMetric>
Historical "idle" CPU or headroom averages over 1, 6, and 24 hours
ServerlessMTMMemoryload
Fields
currentFreeMB: float
TOTAL—(IDLE+CACHE+BUFFERS)
totalMB:
Total memory available
float
utilization: float
_historicalAverages: List<ServerlessLoadMetric>
Historical averages memory used over 1, 6 and 24 hours
_historicalFreeAverages: List<ServerlessLoadMetric>
Historical free memory or headroom averages over 1, 6, and 24 hours
ServerlessMTMIOPSLoad
Fields
currentFreeRead: int
TOTAL_READ_MAX−USED READ
currentFreeWrite: int
TOTAL_WRITE_MAX−USED_WRITE
totalRead: int
Total read IOPS available
totalWrite: int
Total write IOPS available
utilization: float
(USED_READ+USED_WRITE)/(TOTAL_READ+TOTAL_WRITE)
readUtilization:
USED_READ/TOTAL_READ
writeUtilization:
USED_WRITE/TOTAL_WRITE
float float
_historicalReadAverages: List<ServerlessLoadMetric>
Historical read IOPS used over 1, 6 and 24 hours
_historicalWriteAverages:
List<ServerlessLoadMetric>
Historical write IOPS used over 1, 6 and 24 hours
ServerlessTenantDiskMBLoad
Add Fields
totalMB: double
Total disk available to the tenant
utilization: float
ServerlessTenantConnectionload
currentUsedConnections: int
totalConnections: int
utilization: float
_historicalAverages: List<ServerlessLoadMetric>
Historical averages of connections used over 1, 6 and 24 hours
ServerlessTenantCPULoad
CPU may be used to gauge the relative impact of a tenant on the parent MTM's CPU usage. Additionally, CPU may be used in combination with bytes read/written as a proxy to gauge relative "busyness" of a tenant as a proxy for its impact on the parent MTM's memory usage.
Fields
currentUsedCPU:
totalCPU:

float float
the non-normalized CPU max for the MTM
utilization: float
_historicalAverages: List<ServerlessLoadMetric>
Historical averages of CPU used over 1, 6 and 24 hours USR+SYS
ServerlessTenantBytesIOLoad
Bytes read/written may be used in combination with CPU as a proxy to gauge relative "busyness" of a tenant as a proxy for its impact on the parent MTM's memory usage.
Fields
currentRead: long
currentWrite: long
_historicalReadAverages: List<ServerlessLoadMetric>
Historical read IOPS used over 1, 6 and 24 hours
_historicalWriteAverages: List<ServerlessLoadMetric>
Historical write IOPS used over 1, 6 and 24 hours
path prefix—com.xgen.svc.nds.serverless.model.metrics
ServerlessMetricName
Add Values
DISK_MB_FREE
CONNECTIONS
CPU
CPU_IDLE
MEMORY_MB
MEMORY_MB_FREE
IOPS_READ
IOPS_WRITE
BYTES_READ
BYTES_WRITE
ServerlessMTMMetrics
Add members for all new MTM metrics gathered:
DISK_MB_FREE
CONNECTIONS
CPU
CPU_IDLE
MEMORY_MB
MEMORY_MB_FREE
IOPS_READ
IOPS_WRITE
ServerlessTenantMetrics
Add members for all new Tenant metrics gathered (recipient and donor):
CONNECTIONS
CPU
BYTES_READ
BYTES_WRITE
Views
path prefix—com.xgen.svc.nds.serverless.model.ui.autoScaling.pool
ServerlessAutoScalingStrategyMetricThresholdsView
See ServerlessAutoScalingStrategyMetricThresholds.
ServerlessAutoScalingStrategyV2View
Mirror ServerlessAutoScalingStrategyV1View.
ServerlessAutoScalingStrategyView
Update subtypes to include ServerlessAutoScalingStrategyV2View.
ServerlessMTMPool
Add autoScalingEnabled.
path prefix—com.xgen.svc.nds.serverless.model.ui.load
ServerlessTenantConnectionLoadView
See ServerlessTenantConnectionLoad
ServerlessTenantCPULoadView
See ServerlessTenantCPULoad
ServerlessTenantBytesIOLoadView
See ServerlessTenantBytesiOLoad
ServerlessTenantLoadView
See ServerlessTenantLoad
Add Fields
busynessScore: float
connections: ServerlessTenantConnectionLoadView
cpu: ServerlessTenantCPULoadView
bytesiO: ServerlessTenantBytesiOLoadView
ServerlessMTMConnectionLoadView
See ServerlessMTMConnectionLoad
ServerlessMTMCPULoadView
See ServerlessMTMCPULoad
ServerlessMTMMemoryloadView
See ServerlessMTMMemoryLoad
ServerlessMTMIOPSLoadView
See ServerlessMTMIOPSLoad
ServerlessMTMLoadView
See ServerlessMTMIOPSLoad
Add Fields
connections:
_cpu:
_memory:
_iops:
ServerlessMTMConnectionLoadView ServerlessMTMCPULoadView ServerlessMTMMemoryLoadView ServerlessMTMIOPSLoadView
path prefix—com.xgen.svc.nds.model.ui
ProxyAccountsView
Update Methods
getLimitsFromServerlessClusterDescription o Set limitsdefined
Add the appropriate fields to ServerlessinstanceSize and ServerlessHardwareSpec
DAOs
path prefix—com.xgen.svc.nds.serverless.dao
Mirror ServerlessMTMLoadDao
ServerlessMTMPoolDao
Add Methods
public List<ServerlessMTMPool>findPoolsScheduledForRebalancing(final int plimit)
public void setNextRebalancingDate(final Objectid pPoolid, final Date pNextRebalancingDate)
public void setLastRebalancingDate(final Objectid pPoolid, final Date pLastRebalancingDate)
Services
path prefix—com.xgen.svc.mms.svc.ping
NDSServerlessAutoScalingIngestionSvc
Add additional metrics that the system has access to during ingestion:
CPU
memory
path prefix—com.xgen.svc.nds.serverless.svc
NDSAutoScaleServerlessMTMCapacitySvc
Update the capacity service to add new pools/groups when capacity appears to be low. Additionally, the system may provide multithreaded/mimic planner behavior (add nextCapacityCheckDate to the pool, run more frequently, and query for pools using a capacity check, see how NDSServerlessLoadSvc for an example).
NDSServerlessAutoScaleSvc
Add Fields
DEFAULT_MTM_ROLLiNG_RESTART_COOL_DOWN_PERiOD_SECONDS:
Duration
default to 20 minutes
see nds.serverless.mtm.autoscale.rollingRestartCoolDownPeriodSec onds DEFAULT MTM MiGRATiON COOL DOWN PERiOD SECONDS: Duration
default to 10 minutes
see
nds.serverless.mtm.autoscale.migrationCoolDownPeriodSeconds
Update Methods
public void checkServerlessMTMAutoScale( . . . )
Verify whether an MTM has undergone a rolling restart of any sort and avoid any scaling actions in favor of migrations for
DEFAULT MTM COOL DOWN PERIOD SECONDS from the start of that action since load may be artificially high as a result of cluster changes (instance size increase, disk size increase, etc.).
  ClusterDescription
  instanceHardware
  rebootRequestedDate
  externalRebootRequestedDate
  needsCriticalReboot
  _configLastUpdatedDate
  rotateSslAfter
  rotateSslCritical
  _lastinstanceSizeModifyDate
  _lastDiskModifyDate
  createDate
  NDSServerlessloadSvc
The load service is used to generate and cache documents that give a holistic view of the current and historical resource utilization for MTMs and tenants.
  Add Methods
  public void updateServerlessTenantLoadDocument(final Objectid pGroupid, final String pTenantName)
  Generate and save tenant load document using ServerlessTenantLoadDao
  Called during planner run, no cron involved
  public Optional<ServerlessTenantLoad>getCachedTenantLoad(final ObjectId pGroupid, final String pTenantName)
  public List<ServerlessTenantLoad>getCachedTenantLoadsForMTM(final ObjectId pGroupid, final String pClusterName)
  public List<ServerlessTenantLoad>getTopCachedTenantLoadsForMTM(final ObjectId pGroupid, final String pClusterName, final int plimit)
Use "busyness" score since the busier tenants may be deprioritized for migration
  public static float getBusynessScore(final ServerlessTenantLoad pload)
  See Busyness Score
  Update Methods
  public static float getUtilizationScore(final ServerlessMTMLoad pload)
  Revisit for multiple metrics
  public static float getPackingEfficiencyScore(final ServerlessMTMLoad pload)
  Revisit for multiple metrics
  NDSServerlessMetricsSvc
  NDSServerlessMetricssvc may handle additional metrics for MTMs and tenants. Additionally, it may incorporate the backing metrics service from Intel to retrieve live tenant metrics.
  NDSPlanningSvc
  doPlanning For groups with serverless tenants, generate tenant load document and cache using NDSServerlessLoadSvc::updateServerlessTenantLoadDocument
  NDSServerlessloadRebalancingSvc
This service may run as a cron, and attempt to proactively rebalance the load for each pool on a daily basis. The system may follow the same pattern as in the serverless load service, adding two new fields to the pool model to track the next rebalance date and the last rebalance date. A more stable environment and reduce the need for reactive scaling events overall.
This may be the mechanism to create a more stratified packing of tenants based on usage patterns as informed by data science's workload analysis and, when supporting cross pool migrations, allow sorting of tenants into IDLE, LOW, GENERAL, and HIGH usage pools, with the aspect of further reducing the need for reactive auto-scaling events.
Enabling/disabling this service via the conf parameter nds.serverless.pool.rebalancer.enabled.
  Run every hour and may rebalance only those pools that are scheduled for rebalancing.
  Static Fields
  DEFAULT_REBALANCING_INTERVAL:int
  Seends.serverless.pool.rebalancer.intervalSeconds
  NUM_POOLS_PER_ROUND: int
  Methods
  public void rebalancePools( ) o Entry point for the cron
  Query for NUM_POOLS_PER_ROUND pools whose next rebalancing date has passed
  public void rebalancePool(final ServerlessMTMPool pPool)
  See Rebalancing V1
  System Properties
  nds.serverless.mtm.autoscale.rollingRestartCoolDownPeriodSeconds
  set to 20 minutes
  nds.serverless.mtm.autoscale.migrationCoolDownPeriodSeconds
  set to 10 minutes
  Algorithm(s)
  Busyness Score Calculation
  Used as a proxy for relative memory usage
  Sum bytes in/out and use this as the score to sort tenants by suspected memory usage and busyness
  Packing Efficiency Score
  A heuristic for how well an MTM has been packed for stability
  Serverless V2 Auto-Scaling
  V1 algorithm may be extended to incorporate additional metrics (no core changes to the algorithm)
  Rebalancing V1
  Sort MTMs in the pool by utilization score
  For the top quartile of MTMs by utilization score
  Check the individual load values that exceed the recipient candidate thresholds
  Attempt to find MTM candidates in the bottom quartile that can accept tenants in an attempt to return the donor MTMs load values to the recipient candidate thresholds and build up a set of planned migrations to do this
  Tenants selected may be the least impactful (i.e., "busy") tenants, mimicking the strategy used during reactive auto-scaling
  Initiate the planned migrations
  UI
  UI for MTM/tenant load
  Button to existing pool UI and inspect as JSON
  Separate UI to display load in nested/table format Button to see current tenant load JSON alongside button to view auto-scaling context
Pool UI creation/update modal to include enabling/disabling auto-scaling for a pool
Column to the table to indicate if auto-scaling is enabled/disabled
Metrics
Splunk Alerts
Failed to add capacity (horizontal scaling)
No migration path for high activity tenant
Audits
May be hidden and only visible to administrators.
MTM
Serverless Donor migration initiated
Serverless Donor migration failed
Serverless Donor migration completed
Serverless Recipient migration initiated
Serverless Recipient migration failed
Serverless Recipient migration completed
Serverless auto-scaling triggered
Serverless auto-scaling initiated
Serverless auto-scaling skipped
Serverless vertical scaling initiated
Serverless horizontal scaling initiated
Tenant
Serverless migration initiated
Serverless migration failed
Serverless migration completed
SRE Dependencies
Production Considerations
System may not have access to the new tenant metrics API, so may have this integrated, which may change the initial behavior because there is access to more data (24 hours vs. 1 hour) in addition to data for donor tenants.
Tickets
System reports updated serverless instance limits to proxy
Update ProxyAccountsView::getLimitsFromServerlessClusterDescription
System can track cluster tier, disk size, and last capacity increase
Update ServerlessMTMAutoScalingContext for new fields
Remove _migrations field
Add migration
System can track serverless pool rebalancing rounds and enable/disable auto-scaling
Add new fields to ServerlessMTMPool
Add migration
System can create V2 strategies
Add ServerlessAutoScalingStrategyType.V2
Add ServerlessAutoScalingStrategyV2
See ServerlessAutoScalingStrategyV1 and add stubs for all base class methods
System can name new MTM and tenant metric types
Add new values to ServerlessMetricName
System can manage new MTM metrics
Add members to ServerlessMTMMetrics to track new metrics
This may be a larger PR, but may be completed in one go
System can manage new Tenant metrics
Add members to ServerlessTenantMetrics to track new metrics
This may be a larger PR, but may be completed in one go
System separates DISK_MB mocked metrics getters for MTM, PING, and Tenant into separate methods
E.g., create a separate method, getMockedDiskMBPingMetricsForMTM and call that from getMockedPingMetricsForMTM and stitch together the return value there
Provides groundwork for adding additional metrics
System can query for MTM free disk space
Add NDSServerlessMetricsSvc::getMTMDiskFreeMetrics
See NDSServerlessMetricsSvc::getMTMDiskMetrics for an example
System can query for MTM connections
Add NDSServerlessMetricsSvc::getMTMConnectionsMetrics
See NDSServerlessMetricsSvc::getMTMDiskMetrics for an example
System can query for MTM CPU
Aggregate SYS and USR (see NDSAutoScaleSvc)
Add NDSServerlessMetricsSvc::getMTMCPUMetrics
See NDSServerlessMetricsSvc::getMTMDiskMetrics for an example
System can query for MTM idle CPU
Aggregate IDLE and IOWAIT (see NDSAutoScaleSvc)
Add NDSServerlessMetricsSvc::getMTMCPUidleMetrics
See NDSServerlessMetricsSvc::getMTMDiskMetrics for an example
System can query for MTM memory
Use RESIDENT (check on this)
Add NDSServerlessMetricsSvc::getMTMMemoryMetrics
See NDSServerlessMetricsSvc::getMTMDiskMetrics for an example
System can query for MTM free memory
Aggregate FREE, CACHE, and BUFFERS
Add NDSServerlessMetricsSvc::getMTMMemoryFreeMetrics
See NDSServerlessMetricsSvc::getMTMDiskMetrics for an example
User can enable/disable auto-scaling for a pool through the UI
Add another field for "_autoScalingEnabled" to the create/update form
Add something to the pool header to indicate that auto-scaling is enabled/disabled
System can use new system properties
System can query for MTM read IOPS
Add NDSServerlessMetricsSvc::getMTMiOPSReadMetrics
See NDSServerlessMetricsSvc::getMTMDiskMetrics for an example
System can query for MTM write IOPS
Add NDSServerlessMetricsSvc::getMTMiOPSWriteMetrics
See NDSServerlessMetricsSvc::getMTMDiskMetrics for an example
System can get mocked tenant metrics for new metric types
See getMockedDiskMBPingMetricsForMTM
Types
CONNECTIONS
CPU
BYTES_READ
BYTES_WRITE
System can track MTM connection load
Add ServerlessMTMConnectionLoad
System can track MTM CPU load
Add ServerlessMTMCPULoad System can track MTM memory load
Add ServerlessMTMMemoryLoad
System can track MTM IOPS load
Add ServerlessMTMiOPSLoad
Double check cloud provider specific behavior here
System can track total disk available to a tenant and utilization
Add new fields
Add migration
System can track tenant connection load
Add ServerlessTenantConnectionLoad
System can track tenant CPU load
Add ServerlessTenantCPULoad
System can track tenant bytes IO load
Add ServerlessTenantBytesiOLoad
System can model tenant load incorporating new metrics
Update ServerlessTenantLoad
Add migration
System may break this out into multiple updates and migrations since the one migration
may get unwieldy
System can model MTM load incorporating new metrics
Update ServerlessMTMLoad
System may break this out into multiple updates and migrations since the one migration may get unwieldy
System can update and manage ServerlessTenantLoad in the database
See ServerlessTenantLoadDao
System can update and manage cached ServerlessTenantLoad
See NDSServerlessLoadSvc
System can update cached tenant loads on a schedule
See NDSPlanningSvc
System can disable auto-scaling for a pool
System can render view for ServerlessMTMLoad
System can calculate busyness score and record on tenant load
System can render ServerlessAutoScalingStrategyMetricThresholdsView
System can render ServerlessAutoScalingStrategyV2View
Add subtype to ServerlessAutoScalingStrategyView
User can manage V2 strategies in the admin UI
System can render serverless tenant connection load view
Add ServerlessTenantConnectionLoadView
System can render serverless tenant CPU load
Add ServerlessTenantCPULoadView
System can render serverless tenant bytes IO load view
Add ServerlessTenantBytesiOLoadView
System can render serverless tenant load view with new fields
See ServerlessTenantLoadView
System can render serverless MTM connection load view
Add ServerlessMTMConnectionLoadView
System can render serverless MTM CPU load view
Add ServerlessMTMCPULoadView
System can render serverless MTM IOPS load view
Add ServerlessMTMiOPSLoadView
System can render serverless MTM load view with new fields
See ServerlessMTMLoadView
User can see MTM load document in the admin UI
User can see Tenant load document in the admin UI
System can log audits for serverless auto-scaling actions
System can verify MTM metrics queries issued by NDS-ServerlessMetricssvc in E2E
Spin up a serverless MTM, sleep for some amount of time, and verify metrics look reasonable
No strict matching here unless there is a good way to do that
System can verify tenant metrics queries issued by NDS-ServerlessMetricssvc in E2E
Do after lnel serverless tenant metrics svc is integrated
Spin up a serverless MTM and tenant, sleep for some amount of time, and verify metrics look reasonable
There may not be strict matching here
System can generate scores for multiple metrics
See NDSServerlessLoadSvc
See scoring methods
System can check CPU and memory usage in the ingestion service
System adheres to cool down periods when checking a serverless MTM
See NDSServerlessAutoScaleSvc
System can evaluate MTM and tenant state relative to ServerlessAutoScalingStrategyV2
Implement stub methods
Add cool down periods (see NDSServerlessAutoScaleSvc)
System can query live tenant metrics
Integrate Intel's serverless metrics service
System can add new pools when capacity appears to be low
SeeNDSAutoScaleServerlessMTMCapacitySvc
Flag MTM clusters for auto-scaling in the load service as the system processes serverless MTM load documents
Give a more accurate attempt history (i.e., flagging "needsCheck" may be more likely to result in an auto-scaling event) given greater insight into the current and historical metrics.
Metrics
Add new metrics
Integrate live tenant metrics retrieval by Intel (Metrics Ingestion to Support Serverless Auto-Scaling Engine)
Removing "units" read/written. Example considerations for some embodiments: For writes, there is some relation between how many bytes you write into the database and the (eventual) number of IOs you see, since all new data needs to be made durable on the disk eventually. For reads, the relation is a lot less obvious, since a workload that fits in memory cache may not do any disk reads. Very generally, the more operations that occur, the more disk activity there may be, and tenants doing more operations may be triggering more disk activity than less busy tenants.
Add load monitoring to capacity service
Proactively create capacity based on load
Add ability to flag clusters for check in load svc
Bin packing on multiple dimensions
Add validations to/update admin API to disable traditional disk/compute auto-scaling
Update utilization score and packing efficiency score for multiple metrics (consult with data science on packing efficiency score)
Connections
Proxy as a mongos makes the effective limit to a single mongod 1500 connections per tenant give the 500 connection limit per proxy. The system may not reach that effective limit due to the way incoming connections are distributed between the proxies.

The connections are indeed pooled, but there may be a 1:1 relationship between client->proxy connection and proxy->mongod connection. The proxy->mongo connection pool size is unlimited.

Tenant Selection for Migration

Various embodiments are configured to move idle tenants, and further to evaluate tenants to determine activity level so that idle (or less used) tenants are selected for movement before active (or more used) tenants. For example, moving active tenants is quite disruptive to the active tenant and can require significant increase in computation on the nodes involved in the migration where the target is active (e.g., updating data, accessing data, etc.) relative to migrating less active or inactive tenants.

Example: Serverless: QoS in Proxy

The proxy may throttle tenants that have increased their resource usage so that the system may not allow "hockey-stick jumps" (tenant suddenly increases their resource usage by a significant amount).

The QoS engine may work in the scale of seconds.

Tenants allowed resource usage % may be a function of system-wide load.

QoS may not provide any guarantees towards the actual level of performance (latency, opcounter throughput) the tenants may get. It may only make best-effort towards the resources they may get.

Use Case Summary

Client workload-related use cases

The following table represents the desired QoS throttling behavior for various use cases.

The use cases are ordered by priority. The engine may favor use cases at the top by not throttling them as much as lower-priority use cases.

Y-axis represents an arbitrary resource unit (say, documents bytes read) X-axis represents a time unit.

Work is conserved, so throttled area under the curve (AUC) as t->inf may be the same as unthrottled (assuming no clients "give up").

Use Case, Resource Usage Profile

Figure 4A:
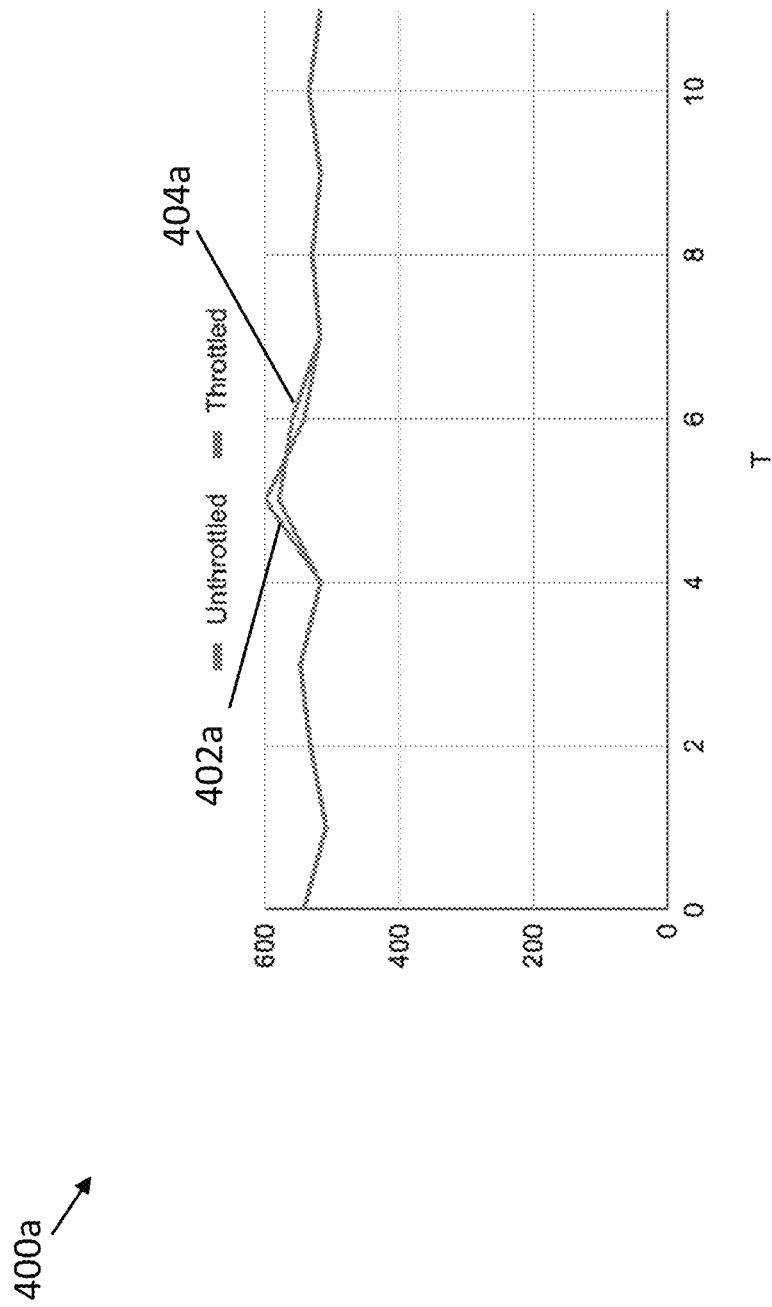
FIGS. 4A-4H show exemplary throttle charts.

Flat-line, minor bumps. See FIG. 4A. In plot 400a of FIG. 4A, curve 402a shows unthrottled and curve 404a shows throttled. This type of tenant may generally not be subjected to any kind of throttling. Depending on system-wide load, minor bumps may cause minor throttling. If the system is under light load, minor bumps may not be throttled. Work is conserved, so the throttled line at T=6 is higher than the unthrottled one due to spillover.

Figure 4B:
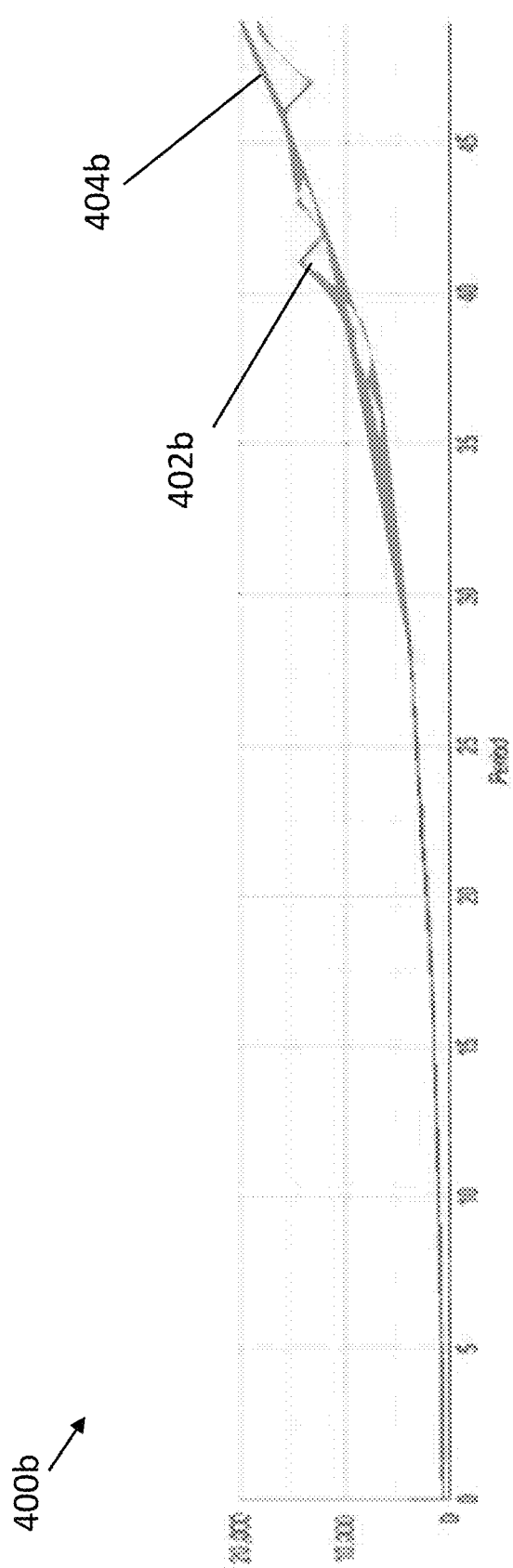

Gradual increase. See FIG. 4B. In plot 400b of FIG. 4B, curve 402b shows unthrottled and curve 404b shows throttled. Under normal load, no throttling is expected. As system-wide thresholds are crossed AND usage increase is large enough, throttling may kick in. Other QoS mechanisms may kick in before the system gets overloaded and significant oscillations occur.

Figure 4C:
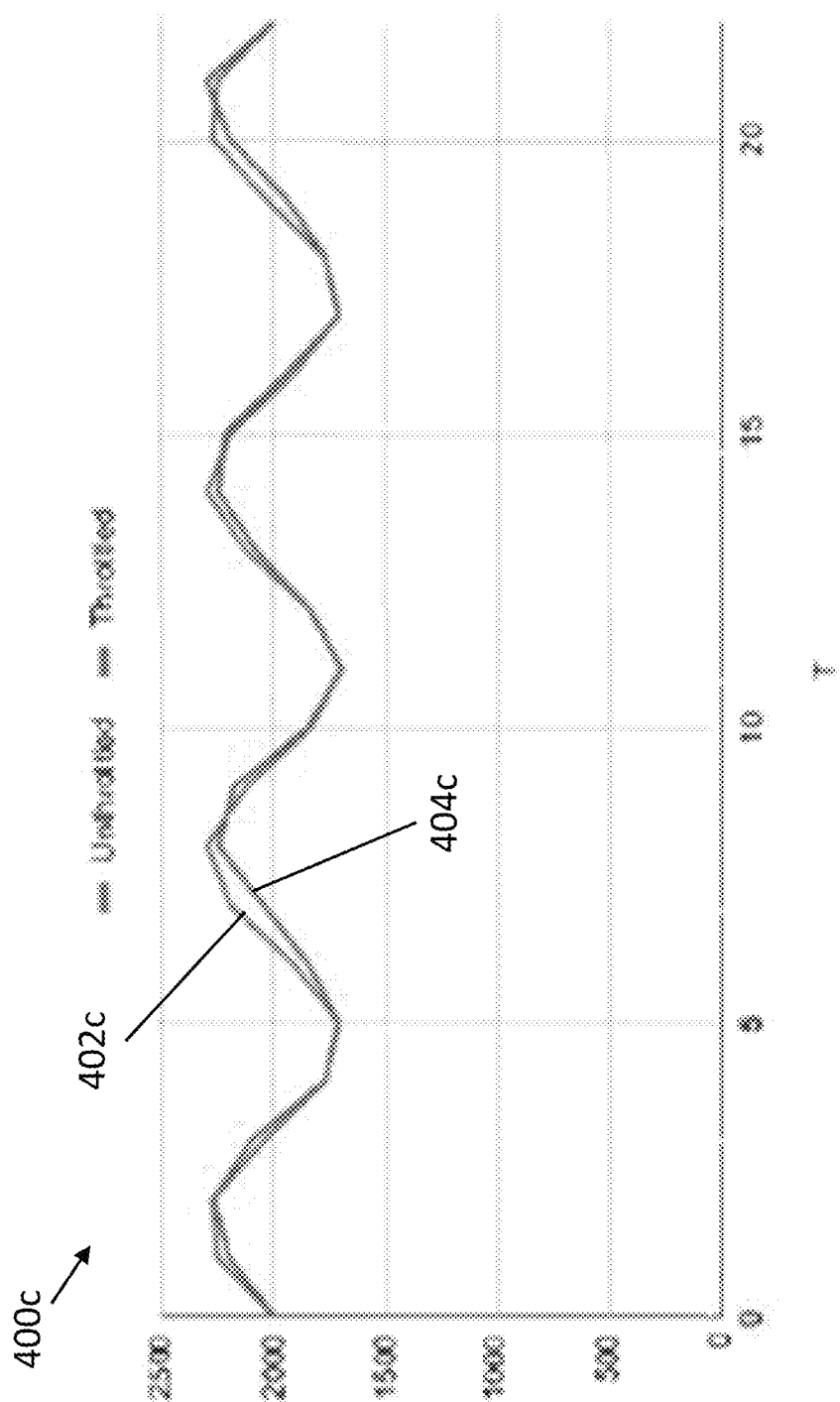

Periodic gradual increase/decrease. See FIG. 4C. In plot 400c of FIG. 4C, curve 402c shows unthrottled and curve 404c shows throttled. Under normal load, during workload increase, little throttling is expected. During workload decrease, the throttled line may be a bit higher than the unthrottled one due to spillover.

Figure 4D:
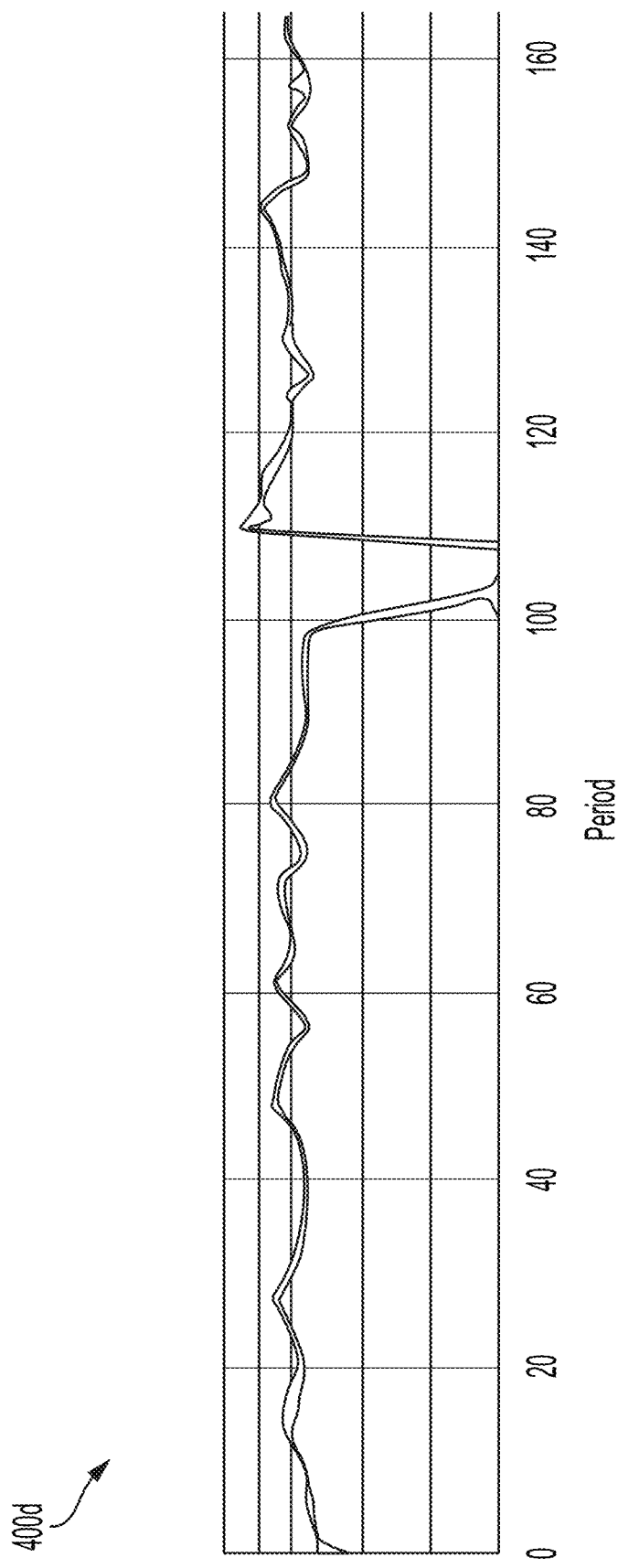
Figure 4E:
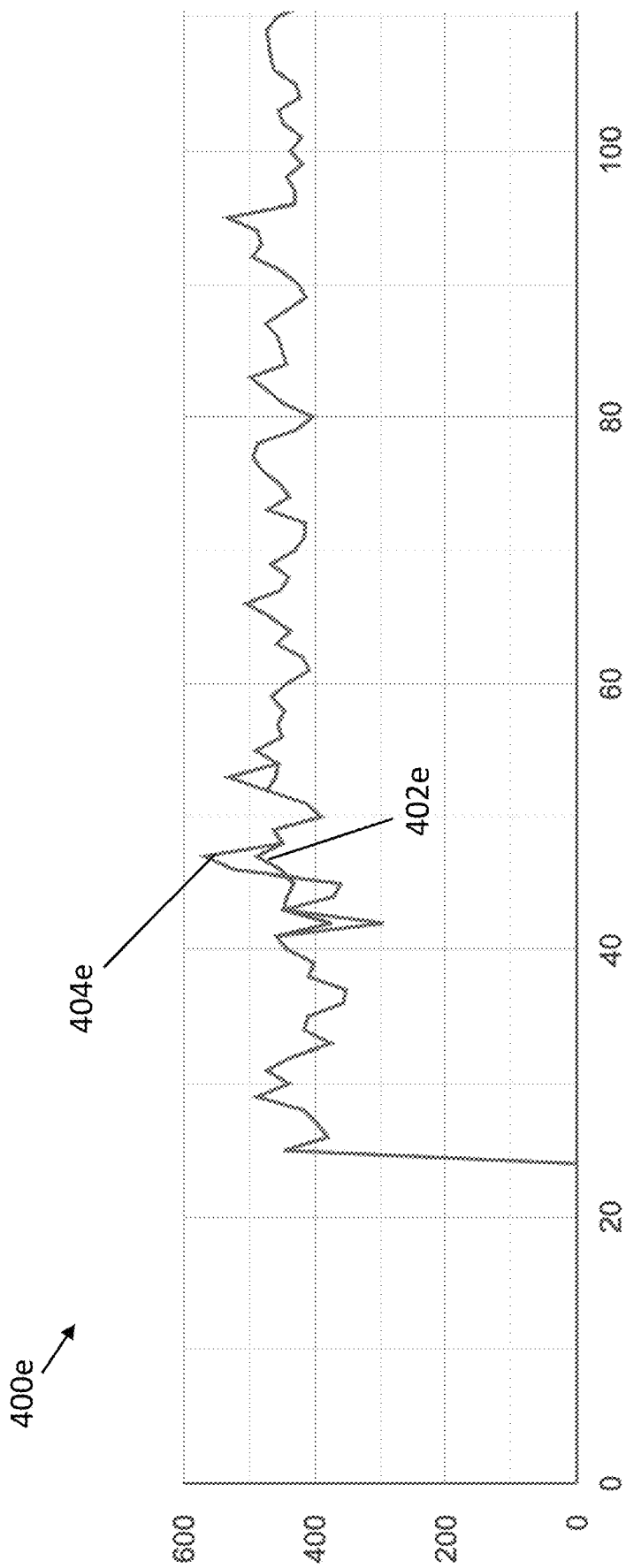

Steady resource usage, restart of client app servers, back to steady resource usage. See FIG. 4D with plot 400d. From a client perspective, client was getting a certain throughput of 1000 resource units per sec. Then client restarted 2 out of 3 application server nodes (resulting in a drop in throughput). As the allowed rate slowly declines (10%/5 sec) and given that app servers are brought back online relatively quickly, very little throttling is expected Sudden increase, then plateau. See FIG. 4E. In plot 400e of FIG. 4E, curve 402e shows unthrottled and curve 404e shows throttled. The value of 600 on the y-axis may be high. This may indicate that each tenant may have a "floor" resource usage that is always available. The engine may allow an absolute initial resource usage (based on system-wide thresholds). As usage is averaged, some oscillation is expected for a short period of time, then stabilized. This pattern may fit the "test environment" use case, where the cluster is only being used during part of the day.

Figure 4F:
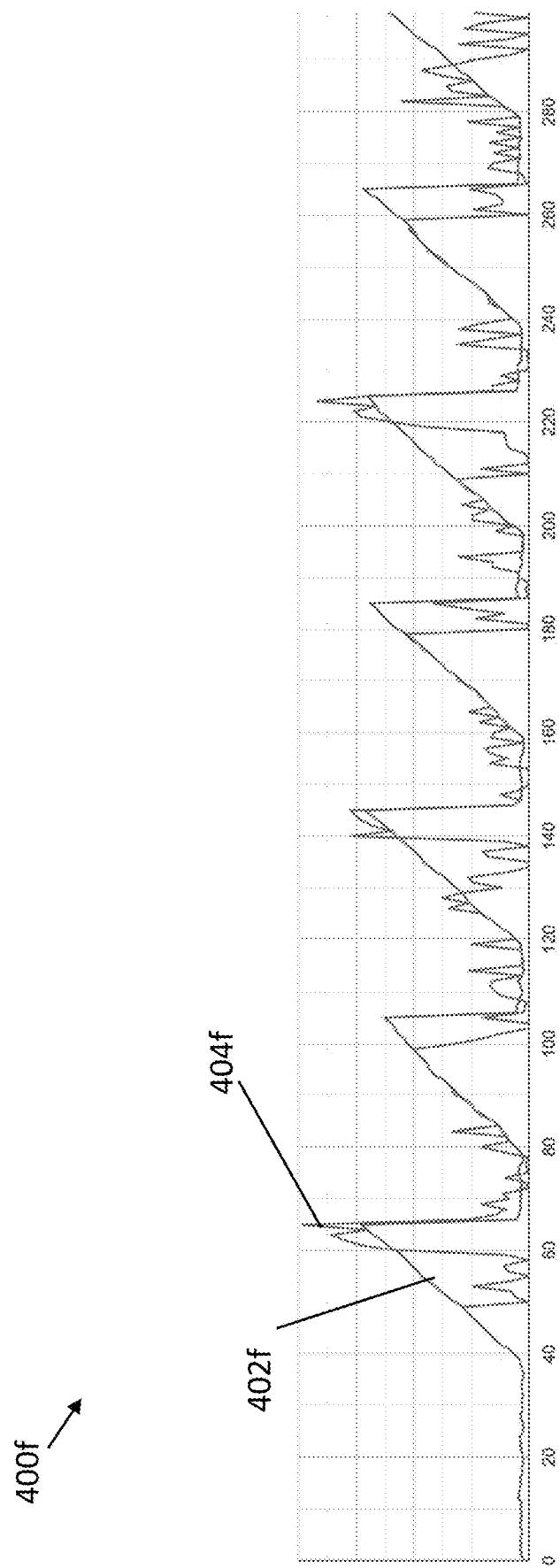

Repeated large spikes. See. FIG. 4F. In plot 400f of FIG. 4F, curve 402f shows unthrottled and curve 404f shows throttled. This type of workload may be highly susceptible to throttling.

Figure 4G:
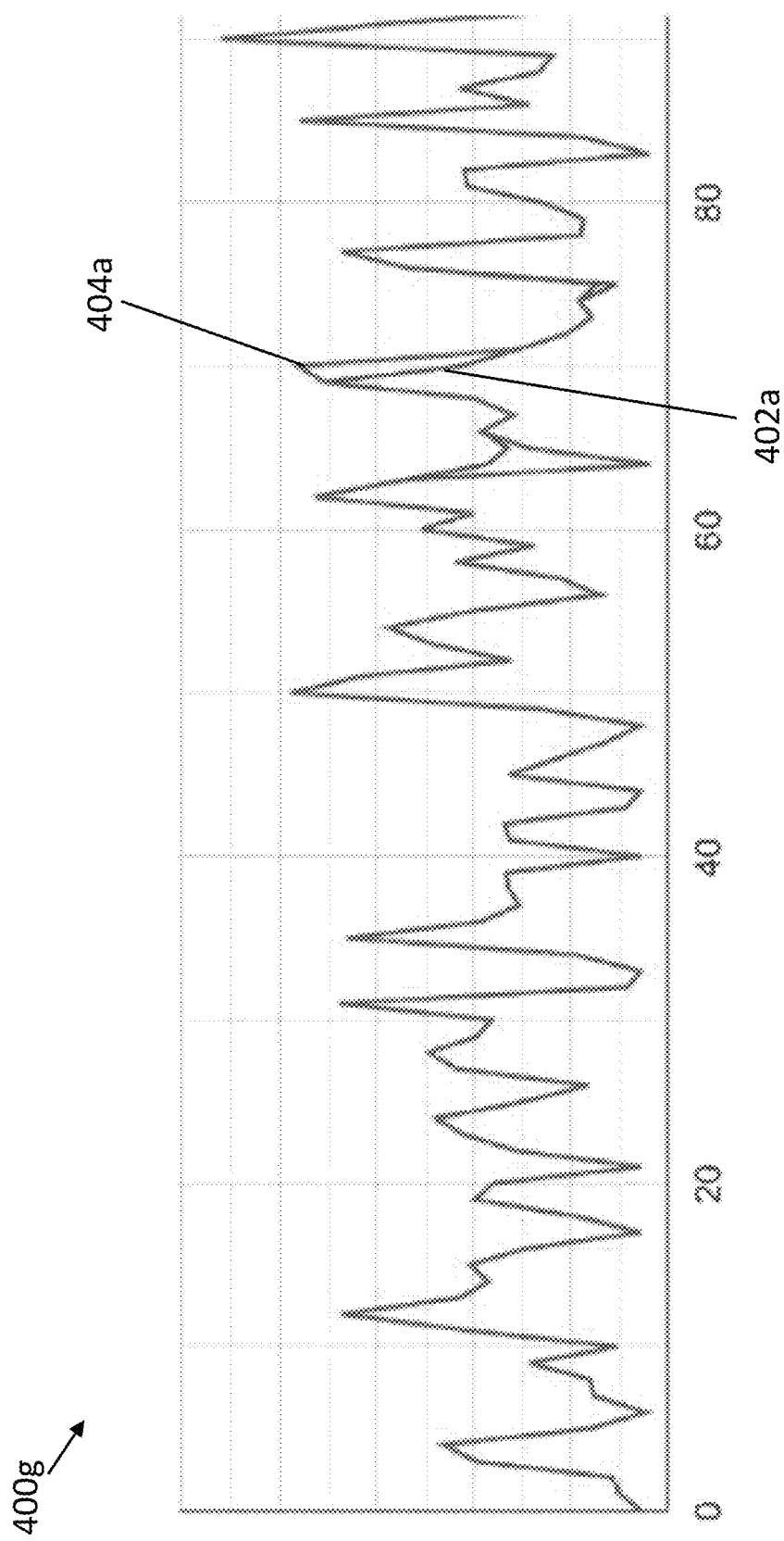

Short spikes may be averaged, so little throttling is expected Erratic. See FIG. 4G. In plot 400g of FIG. 4G, curve 402g shows unthrottled and curve 404g shows throttled. The engine may not throttle this workload if on average the usage stays roughly the same.

Figure 4H:
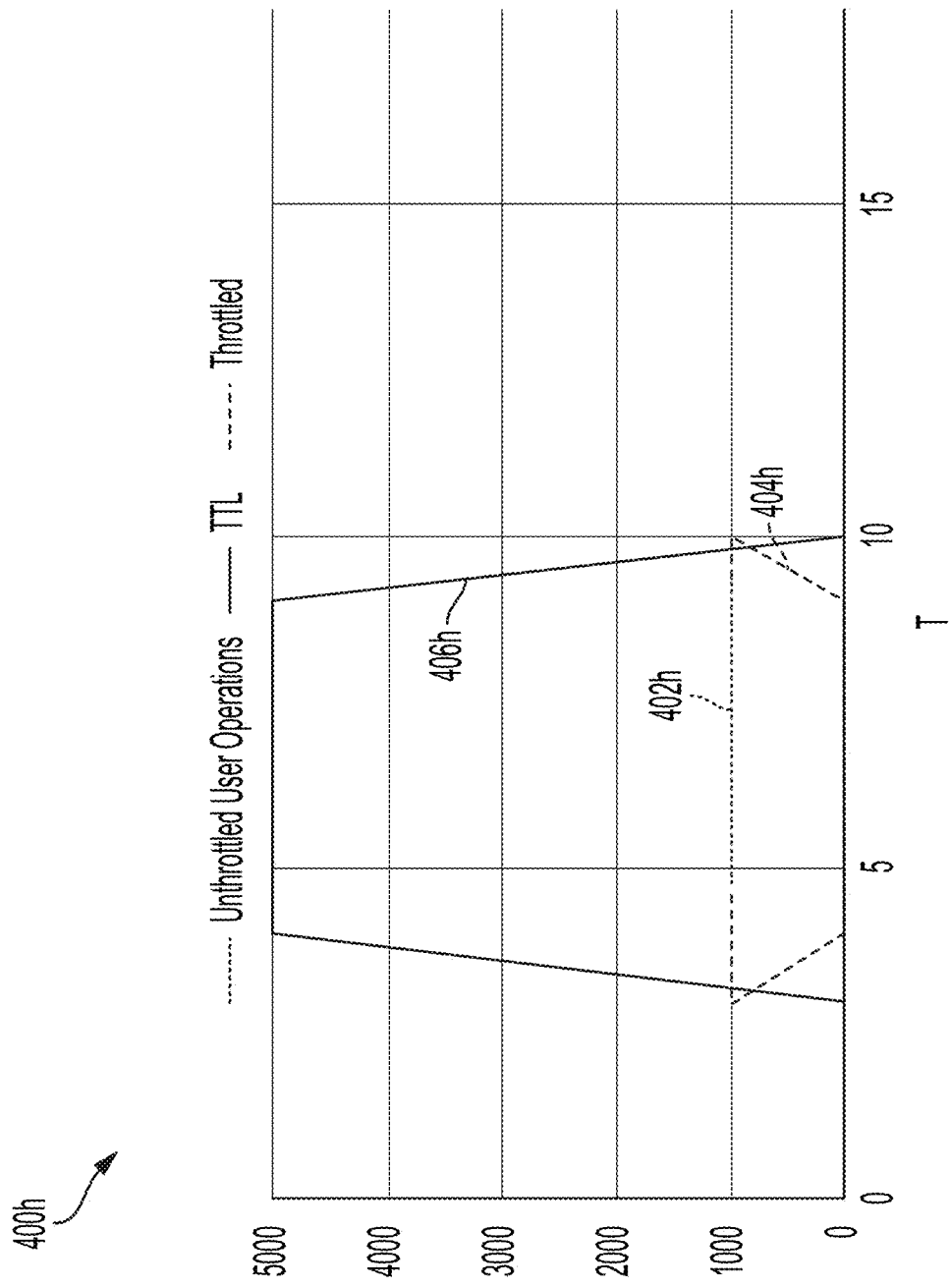

TTL indexes running in the background alongside user operations. See FIG. 4H. In plot 400h of FIG. 4H, curve 402h shows unthrottled, curve 404h shows throttled, and curve 406h shows TTL. Unthrottled user ops steady at 1000 resource units/sec. Since TTL are assumed to be unthrottled by the server and consume all available "credits" for the bucket, user operations may be highly throttled, resulting in oscillations during that time.

Client runs an index build. Since resource consumption may be accounted for when the operation ends, likely to observe a very large spike. As the system may not be able to average that spike out across an extended period, the tenant may be throttled in the subsequent period.

Auto-pilot index builds. No special case. Index builds initiated by the Cloud Auto-Indexing engine versus by end users. Meaning, the index build may be counted toward the tenant's resource consumption like any other index build, and accordingly impact both their QoS levels/throttling and their bill to create and maintain the index going forward. Acceptable because auto-indexing algorithm's aspects are aligned with customers' aspects, if there is auto-creation of an index, it may be because the index may be a net improvement to client resource consumption and performance. May provide client resource consumption and bill to decrease with the new index.

Additional Use Cases (not Directly Related to Client Workloads)

Atlas Proxy Restart

Proxy restarts may result in tenants being throttled using the minimum rate limits. A tenant with high ops/sec workload may take longer to get to previous values compared to ones with low ops/sec values. For example, under low MTM cluster-wide load, a tenant that was running at ~5K ops/sec may get back to those values after about a minute. Additionally, because the Atlas Proxy restarts are expected to be rolling, only one proxy may be coming up through this cold start at a time. Therefore performance may not dip below 66% of what tenants were receiving before.

This may be addressed by persisting the throttling values.

Mongod Restart

It is likely that a single mongod member restart may not have a significant impact on throttling due to the following: (1) The proxy has tenant-level stats in-memory, (2) While the mongod is down, the proxy may continue to update the tenant-level stats from the other mongod's that are still up.

Tenant activity may just move to the other nodes (writes to the new primary, secondary reads to the other secondary), (3) When mongod starts, the reported metrics are zeroed-out and detected as a "crash" by the proxy, which triggers using the previous value for the next minute The metrics per database may continue to accumulate until server restart. Dropped databases may not have their metrics cleared. The metrics are ephemeral and not recorded on disk, so a server restart may clear them. A special parameter to the retrieval command may also clear the metrics, in order to prevent the database list from growing forever.

MTM Cluster Scale-Up and Scale-Down

Throttling Engine

The throttling engine may use the MTM cluster-wide resource usage to determine how aggressive throttling may be (by determining the allowed growth to ops/sec rate) and tenant-level resource usage and % of throttled operations to determine whether tenants need to grow their usage.

New tenants may be allowed a minimum ops/sec rate.

A tenant that has negative growth needs (due to client app crash or simply a decline in their workload), may have their rate limit slowly decline (down to the minimum ops/sec value).

Throttling may be done by limiting ops/sec on the request path.

Throttling may not be done on the response path as back-pressure may lead to proxy memory ballooning as it may potentially hold up to 16 MB responses from the server before sending them through to the clients.

The ops/sec limit for the bucket may be derived from the observed resource usage growth and the ops/sec rate in the previous bucket.

The system may not be exempting internal users (e.g. mms-automation) from throttling at this point. This may differ on other embodiments.

The engine may emit throttling stats via AccountStats to be used by other mechanisms (such as Tenant Migrations). Details The following apply on proxies running in serverless mode (throttlelessMode=true—renamed to serverlessMode.

The proxy may track MTM cluster-wide resource usage and calculate 5-second averages, using the max value across the 3 replica set members to determine a MTM cluster-wide stress score and calculate the [allowed growth %] throttling factor for the current period.

The proxy may track tenant resource usage collection and get 5-second averages.

The dynamic rate limit may be calculated as follows:

The initial rate limit is set to [throttlingMinOpsSeclimit=50 by default]

[Resource Growth]=tenant [resourceUsageGrowthPct]
[Ops Throtted %]=tenant [operationsThrottlingPct]
[Effective Growth]=max([Resource Growth], [Ops Throtted %])
[Allowed Growth]=min([Effective Growth], [allowed growth %])

Allowed growth % is determined by the stress score
If [Allowed Growth]>0 AND [Ops Throttled %]>0:

ops/sec limit=[Allowed Growth]*[previous ops/sec limit]

Else:

ops/sec limit=max([throttlingDeclineRatio=0.9 by default]*[previous ops/sec limit], throttlingMinOpsSecLimit)

When a client operation is intercepted on InterceptClientToMongo, the proxy checks whether the ops/sec dynamic limit is breached and if so, may do the following:

The account stats ThrottledOps counter may be incremented.

The proxy session may sleep until the start of the next 1 second (see implementation on rate_limit.go:IsAllowed).

This is similar to how the shared tier ops/sec rate limiter works.

New tenants that do not have any baseline values may be allowed to use the [throttlingMinOpsSeclimit] rate.

Goroutine mapping:
Goroutine, Responsibilities

Stats Gathering: Calculating MTM cluster stats Calculating tenant-level stats Calculating throttling factors, Calculating tenant-level dynamic rate limits.

Operations Handling (session_proxy): Handling incoming requests, Sleeping if used (rate limit).

Resource Usage Tracking

MTM cluster-wide resource usage tracking

The proxy may invoke an API provided by InTel to get MTM cluster-wide resource usage stats across the replica set members.

This may be invoked every 5 seconds and may eagerly fetch the value on startup.

Data may be fetched every 5 seconds and may be averaged over the past 5 seconds.

The proxy may use the "worst-case" value for each resource. In other words, if one replica set member has high CPU usage, the proxy may view the entire MTM replica set as having high CPU usage.

The API may return a map[string]float64:
Key—resource name (e.g. cpu_usage)
The following resources may be provided by the API:
cpu_idle_usage_raw=Normalized System CPU idle time in seconds
disk-utilization-raw=Normalized 10-ticks The proxy may average over the past 5 seconds as follows:

cpu_usage avg %=100−100*[(current cpu_idle_usage_raw−previous cpu_idle_usage_raw)/interval (time elapsed from previous API call)]

disk utilization avg %=100*[(current disk_utilization_raw−previous disk_utilization_raw)/interval]

MTM cluster-wide stress score and throttling factors

The proxy may calculate a stress score [0-1] based on the MTM cluster-wide resource values.

The max stress value calculated from each of the resources may be used as the MTM cluster-wide stress score.

The sigmoid functions factors are provided so that:
The system gradually increases the stress level
The system approaches the maximum level as the CPU and disk utilization are near 75% CPU and Disk Utilization:

Stress(x)=1/(1+e^−(0.1x−5)).

Figure 5:
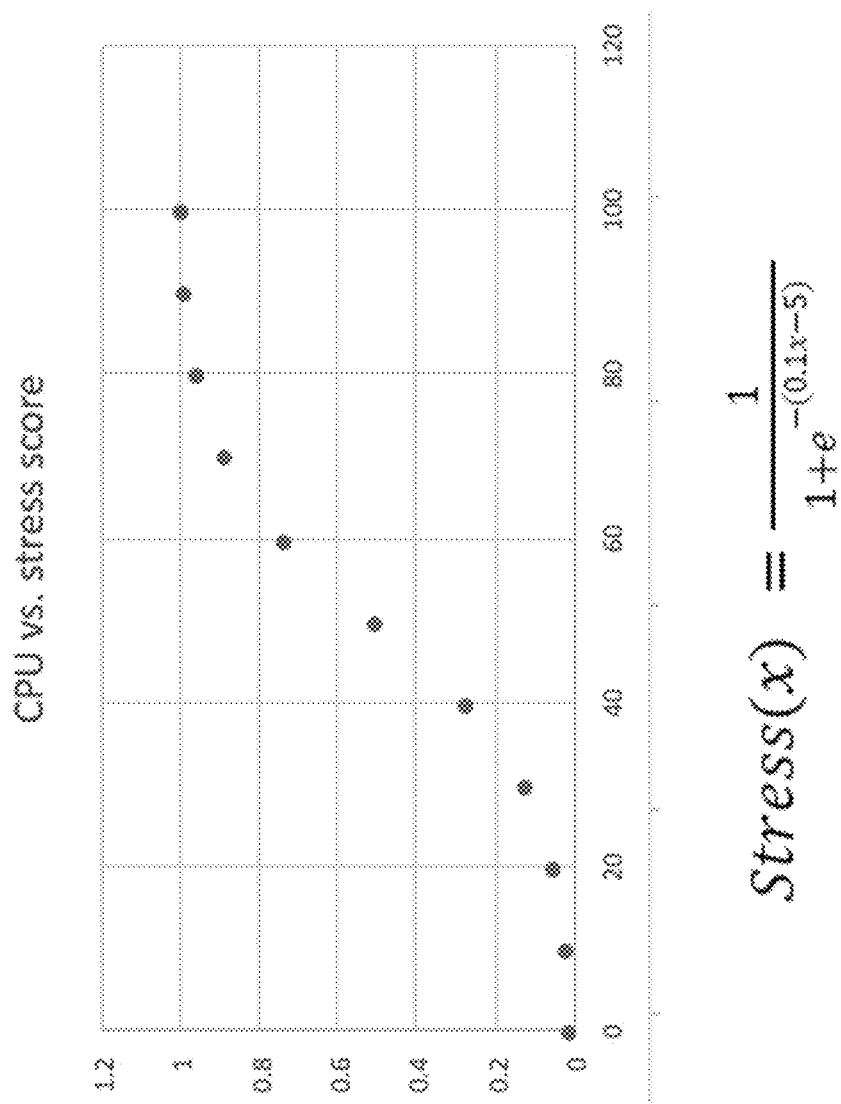
FIG. 5 shows an example of CPU and stress score.

See also FIG. 5.

X=cpu_usage OR disk_utilization

The system-wide stress score may dynamically determine the [allowed growth %] factors as follows:

allowed growth %=−maxGrowthPct*stressScore+maxGrowthPct maxGrowthPct is set by a throttlingMaxGrowthPct setting (default=S0)

The latest system-wide stress score and factors may be available for fetching via a thread-safe API (to be used by the throttling engine).

Tenant-level resource usage tracking

The proxy may invoke an API provided by InTel to get tenant-level resource usage stats The InTel API may return raw resource consumption counters for a given MTM host, aggregated (summed) across all of a tenant's databases. The automation team may:

Turn adjacent samples into rates by subtracting the counter values and dividing by the sample period.

Summing these computed rates across all 3 MTM hosts to get total consumption rate of the serverless instance for a given tenant.

This may be invoked every 5 seconds and may eagerly fetch the values on startup.

The tenant resource usage bucket size (i.e. 5 second) may be determined by a config file setting throttlingTenantBucketSizeSec (default=5).

The key currency to be used for tenant resource usage may be "document bytes read"+"document bytes written"

irrespective of whether the documents were in WT cache or not

The API may return a map[string]TenantStats, representing the resource usage from the past 5 seconds Key=DBPrefix (tenant ID)

Value (aggregate by tenant—not per each database):

documentBytes: "document bytes read"+"document bytes written"—sum across all 3 nodes totalOperations—sum across all 3 nodes totalThrottledOperations—sum across all 3 nodes The API may return values aggregated by tenant, so the proxy may to calculate the average rates on its own If the MTM has restarted, it may result in the raw values going backwards In which case, the latestRawVal may be updated, but the averages and growth values may not be The proxy may keep the last 3 values [throttlingTenantResourceUsageRetentionPeriods] per tenant (overall, not per MTM)

Based on the collected tenant-level resource usage, the following may be calculated following may be calculate:

[resource usage growth %]=$T$-1bucket value/$T$-2bucket value

[operations throttling %]=[ops/interval]+[throttled ops/interval]/[ops/interval] for $T$-1

After averages and growth factors are calculated, the proxy may keep the data on a thread-safe map keyed by the tenantId (DBPrefix) with the following structure:

{ latestDocumentBytesRaw: val, recentoocumentBytesAvgs: [val1, val2, val3], totalOperations: val, totalThrottledOperations: val, resourceUsageGrowthPct: val, operationsThrottlingPct: val

}

The proxy may expose a thread-safe API to get the tenant stats by the throttling engine.

Entries may be removed from the map when tenants are no longer part of this MTM (been migrated or otherwise).

Assumptions

New tenants may not be assigned to overloaded MTMs

An overloaded replica set may not be picked as the target recipient for migrations Schema Testing Simulation Program Simulates various types of workloads (spikes, flat, erratic, crash, periodic)

Applies the throttling model and allows to set knobs such as growth factor, MTM cluster-wide limits and bucket size.

Outputs throttled vs. unthrottled charts and per-client type throttling stats (% of ops throttled, average delay, etc.).

Synthetic workloads

Run the following workloads, using multiple concurrent clients when 20% of the clients comprise of 80% of the data on the MTM:

Stable workload of various CRUD ops

Erratic workload

Gradual periodic

Long infrequent spikes

Short frequent spikes

Sudden increase

Sudden drop

Gradual ever-increasing

Compare the following for proxy with throttling enabled and proxy with no throttling:

System-wide load over time

Latency and throughput per client type over time

"Hostile" conditions

Run the following synthetic workloads with throttling enabled:

Stable workload of various CRUD ops

Long infrequent spikes

Restart the proxies and verify it does not result in long oscillations

Restart the MTMs and verify it does not result in long oscillations

Key Metrics

Key metrics relating to this new feature/subsystem/etc.: metrics that are sent to Prometheus, but they may also include things that can be calculated from the data or Splunk logs.

Customer Metrics

Identify the metrics that measure the customer's experience (task completion count, number of items created, time to create a cluster, email open rate, etc.).

Health Metrics

Identify the metrics that measure the health of the system (latency, throughput, cache size, error rate, etc.).

The proxy may expose the following metrics:

Metric, Labels, Type mtmproxy_qos_throttling_ops_total, Counter, Incremented whenever an op is throttled mtmproxy_qos_throttling_system_raw, type=[cpu_usage, disk_utilization], Gauge, mtmproxy_qos_throttling_system_stress score, Gauge Monitoring How the system knows when something has gone wrong. Examples:

The proxy may log the following events at INFO level: (1)Tenant dynamic rate limit has updated—along with the following information: (a) MTM cluster-wide stress score and calculated resource stats (b) Tenant recent resource usage and growth stats.

The proxy may log the following events at DEBUG level: (1) After MTM cluster-wide resource usage is reconciled and stress score is calculated (along with raw and calculated resource values), (2) After tenant-level resource usage is calculated—output the map of tenant stats, (3) Throttling an operation.

Factors with the design (missing features, sub-optimal performance, etc.): (1) The QoS engine may get the operation stats after-the-fact (after they complete their run on mongo) which means that a long-running operation may still affect the entire system, (2) Throttling may result in some client operations timing out, however similarly to rate limits on the shared tier may not sleep for more than 1 second, which may still result in socket read timeout, but that may apply on extremely aggressive clients, so may not see this in practice, (3) Throttling clients with aggressive timeout/retry behavior may exacerbate the situation by inducing connection storms. (4) While there is a potential risk to memory inflation due to requests being throttled on the proxy, may not be mitigating it in any measure (a) This scenario is not prevented in the shared tier as well.

(1) Throttling during tenant migration (a) The proxy may get a single view of tenant resource from the donor and recipient MTMs, (b) The proxy may also get system-wide stats from the recipient MTM (either by fetching raw metrics and calculating stress score locally or by getting this via an API call to the recipient proxy), (c) If the operation is to be forwarded to a remote MTM, use the remote MTM's stress score to determine how to throttle, (2) Persisting throttling data to address proxy cold-start.

Design Alternatives
  Operations excluded from throttling
  Operations within a transaction
  Identified by having txnNumber and not having start-Transaction: true (risk outweighs benefit due to pinned objects).
    Non-CRUD operations (e.g. isMaster=hello, killCursors)
    DDL operations (e.g. createIndexes, dropIndexes) may be throttled.
  The shared tier does not exclude those, issues not observed with that on the shared tier.

Excluding Index Builds
  Since resource consumption may be accounted for when the operation ends, likely to observe a very large spike. As may not be able to average that spike out across an extended period, the tenant may be throttled in the subsequent period.
Implementation Details:
  Excluding index builds—if the relative growth is over 300% (determined by throttlingTenantlargeSpikePct, default=300).
  AND [totalIndexes] has increased, the proxy may store the previous period usage on this bucket and may return 0 growth.
  The index build resource usage may be reported by mongo when it completes, potentially resulting in a large spike.
  To exclude such operations from throttling, may pick a large enough value to avoid suppressing the throttling engine on "regular" workload increases.
  May collect index statistics across all tenants.
  Avoiding throttling cold restarts
  Proxy restarts be implemented in a manner that avoids cold-start throttling patterns. A proxy may persist to allow the tenants to resume their pre-restart resource usage levels.
  This addresses a rather short 15 seconds period in which tenants may not be throttled (while they may be throttled) and not cost-effective.
  Using application threads used for eviction as a signal for system load $$\text{Stress}(x)=1/(1+e^{-(10x-5)}).$$

X denotes the average threads used in eviction over the past 5 periods (25 seconds).

The sigmoid reaches stress score=1 as the average "application threads used in eviction" reaches 1. May not duplicate the signal from CPU/Disk Utilization.

Throttling Approach A.2: Throttling in Proxy—Heuristics based on workload analysis.
Concept:
  Proxy tracks tenant-level and system-wide resource usage.
  Proxy tracks operation shapes and historical resource usage per operation shape, thus being able to potentially predict how much resources may be used.
  The server may not report resources used per operation. May only be getting aggregated stats.
Throttling Approach B: Throttling in Server
Concept:
  Proxy tracks tenant-level and system-wide resource usage
  Proxy injects a "maxDocumentBytesPerSec" argument to the operations before sending over to mongo
  Mongo ensures these rates may not be surpassed
Pros:
  High resolution QoS control
  Mitigation of cases in which an abnormally expensive operation was performed (the proxy cannot really predict how much resources a certain operation may consume)
  Server's awareness of tenant usage may allow to take TTL indexes into account when throttling
  TTL indexes are allowed. The server-reported tenant resource consumption may take into account TTL indexes.
  The "WT ticketing" system may be substituted with a more sophisticated mechanism.
  When only one proxy is going to be collecting resource stats, the other proxies may be able to do throttling. The other proxies may be kept up-to-date with tenant-level stats.
  Each proxy may gather resource stats from the other remote proxies. In a phase, may optimize this by adding a caching layer
  System-wide resource usage is going to be a factor in (how aggressive) QoS (is going to be), may aggregate stats across all 3 mongods.
  For added context, the proxy presents itself as a mongos and may route requests to any of the mongods.
  Atlas auto-scaling may prevent oscillations (scale-down causes the cluster to go over scale-up thresholds).
  There are some buffers that may mitigate that:
  25% diff in resource usage between scale-up and scale-down.
  Scale down uses all nodes to be underutilized, scale-up may use only one of them May use Network Utilization—In/Out % to determine system-wide stress level.
  Not too many cases in which network maxed out but other resources underutilized.
Atlas Serverless MongoDB
  1. Serverless Applications (a Background on Serverless-Ness)
  1.1 The Serverless Application Model
  Infrastructure may be serverless when it is configured to automatically and dynamically match resources to workload demands.
  Serverless technology can take a variety of forms, but they often have the following attributes:
  Elastic scaling
  The ability to automatically scale up and down based on workload, including the ability to scale down to zero resources when there is no workload.
  Consumption-based pricing
  A pricing model may only charge for resources used to service the workload.

1.2 The Advantages of the Serverless Application Model

The serverless application model results in an abstraction that frees the developer from needing to think about servers (hence "serverless"). This model has the following benefits:

1. The user does not need to think about scaling up to meet increasing workloads
2. The user does not need to worry about paying for resources they are not using Serverless computing is a model that may dynamically uses only what it needs, and may only charges for what it uses.

2. Serverless Databases 2.1 Serverless Database Platforms

Serverless computing may be embodied as a database.

Serverless database platforms share many of the same characteristics of serverless application platforms:

Elastic scaling

The ability to automatically scale up and down based on workload, including the ability to scale down to zero compute resources when there is no workload. Unlike serverless application platforms, which may only manage compute, serverless database platforms have both a compute layer and a storage layer which can scale elastically.

Consumption-based pricing

A pricing model that may only charge for the data stored in the database and the resources used to service the database workload.

Compatibility with serverless applications

Can handle ephemeral connections efficiently

Can handle large numbers of connections that can change rapidly These attributes confer advantages similar to the serverless application model:

1. The user does not need to think about scaling up to meet increasing workloads or storage needs.
2. The User does not Need to Worry about Paying for Resources they are not Using.

2.2 Elastic Scaling

Serverless databases may scale both storage and compute automatically to service changing workload demands efficiently and effectively.

Storage

Scales as the data set grows.

May be a combination of EBS, local SSD storage, cloud storage (S3).

Compute

CPU and memory resources used to service client operations

Can be scaled vertically or horizontally These two resources may scale at least partially independently.

3. Serverless Database Pricing 3.1 Consumption-Based Pricing

One of the core features of serverless database platforms is consumption-based pricing. Two pricing models may be offered:

On-demand pricing where the user may only pay for what they consume. Example: $0.25 per million Read Requests.

Provisioned-capacity pricing where the user pays to provision a guaranteed set of resources or capacity. Some vendors additionally offer the ability to auto-scale the provisioned capacity. Example: reserving a predefined amount of CPU and RAM, or a certain workload throughput such as 1000 RUs/sec.

An amalgam of reserved CPU and RAM.

3.2 The Benefit of On-Demand Pricing

On-demand pricing has two benefits over traditional server-based pricing.

1. On-demand pricing is much more economical for sparse workloads than traditional server-based pricing.

Because the user may be charged only for the resources consumed for the operations they perform, they may pay significantly less for sparse workloads (e.g. a workload may go from costing $10/month to $0.01/month).

2. On-demand pricing is often expressed in terms that are easier for the developer to understand (e.g. Read Units and Write Units), and that tie more directly to the user's application than CPU and RAM.

3.3 The Reason for Provisioned-Capacity Pricing

Serverless platforms with on-demand pricing model often run into two challenges:

1. Once a workload becomes relatively steady, on-demand pricing becomes more expensive than a traditional server model, and sometimes much more expensive.
2. Serverless databases, often implemented in a multi-tenanted environment, can have trouble accommodating unpredictable workload spikes by tenants without throttling.

The provisioned-capacity model solves both of these problems by allowing the user to instruct the system to provision capacity for its workload. This pre-provisioned capacity gives the user certain guarantees about capacity and/or resources that result in more predictable performance and can provide headroom to accommodate scaling during sudden workload spikes.

As a result, it is sometimes the case that serverless database platforms support two modalities:

On-demand mode

The user may be only charged for the resources they consume based on their storage needs and workload.

If there is no workload, the user is still charged for storage.

Example: $0.25 Per Million Read Requests

Provisioned-capacity mode

The user is charged for pre-provisioned resources/capacity.

If there is no workload, they are still charged for the provisioned capacity.

Provisioned-capacity can take two forms: A throughput SLA. E.g. 100 RUs/sec.

An amalgam of compute resources (i.e. CPU, RAM)

Furthermore, many vendors have the notion of provisioned-capacity autoscaling. With this feature, users can specify that their provisioned capacity be automatically scaled if the system determines it is to be used by the workload.

3.5 Applicability of the Two Serverless Modalities

On-demand pricing may be beneficial for the following types of workloads:

Sparse (significant periods of no workload)

Cronjobs

IFTTT

Asynchronous tasks spawned by applications (e.g. sending a welcome email)

Infrequently used applications/websites

Development and testing database

Low-frequency analytics/reporting

May not handle unpredictable workload spikes and can accept being throttled if they occur.

Provisioned-capacity pricing may be beneficial for the following types of workloads:

Steady, heavy workloads, where it is usually more cost effective than on-demand.

Workloads that may accommodate unpredictable spikes that may otherwise be throttled in an on-demand environment.

Workloads that may not tolerate cold start latencies for workloads that have been idle.

Furthermore, each modality has a different price curve. On-demand pricing can scale to zero cost with no workload. Provisioned capacity may not, but it becomes cost-effective with heavier workloads.

Figure 6:
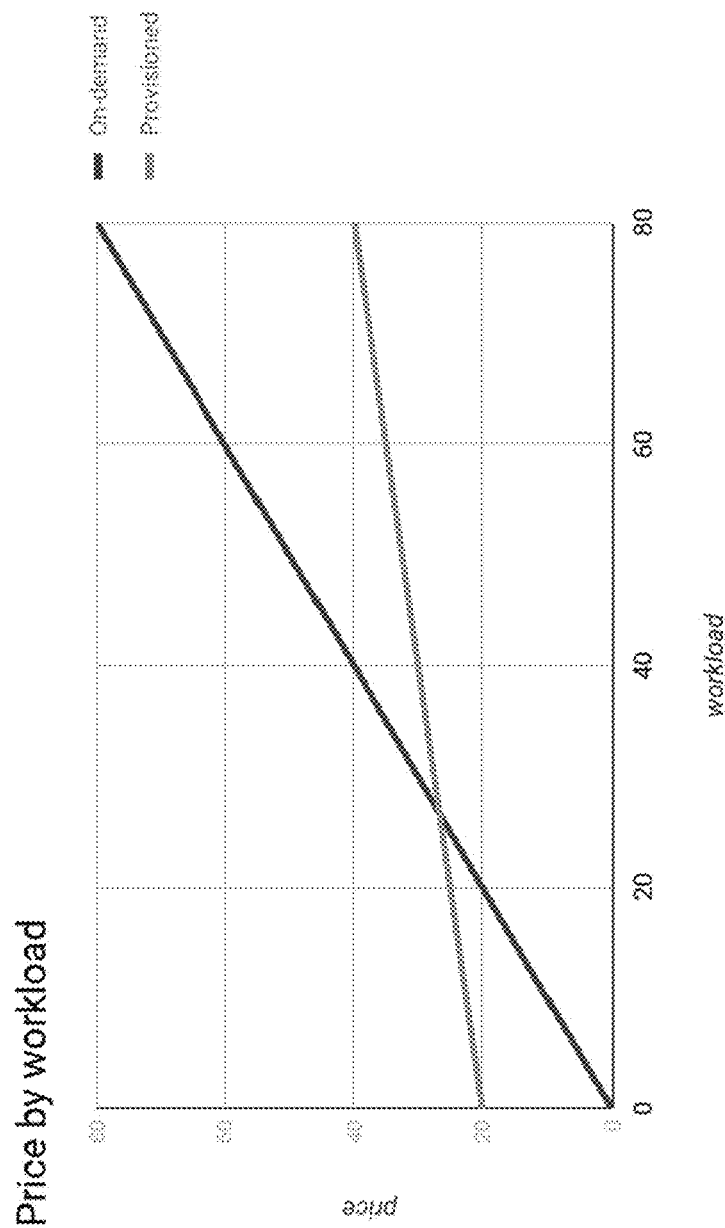
FIG. 6 shows an example of price and workload.

FIG. 6 shows an example of price and workload.

3.6 Relatability

When two models are present, it is valuable if they are relatable. A common journey for the user is to start with the on-demand model and later change to a provisioned-capacity model.

It is helpful if the on-demand pricing model informs the user about how they may provision capacity.

For example, if a user is using on-demand mode, and sees on their bill that their peak hour consumes at a rate that is equivalent to an average of 200 each sec, they may have a good idea how to set their provisioned capacity since the provisioned capacity pricing is expressed in per sec.

3.7 Predictable Pricing

Pricing is predictable if the price for a workload can be determined without running that workload.

An example of a predictable pricing model because they directly correlate with explicit read and write operations. However, are not a predictable model because the number of units for a request depends on how much CPU, memory, and other system resources are utilized to service that request.

While predictable, pricing model may not be easily predictable. It may be complex enough to expect most users do not try to predict their price via static analysis of their workload and their data. Expect that they instead simply run the workload.

3.9 Query Language as Related to Ease of Scaling and Pricing

There may be a relationship between ease of scaling and the expressiveness of the query language the database supports.

Key-value stores are easier to scale horizontally since records are retrieved by a single key (e.g. ID). In this case data sharding at large scales is relatively easy, and performance can be made very predictable. As such pricing models such as a throughput SLA are more easily achieved.

Databases that support expressive query languages such as SOL and MOL are harder to scale horizontally. As a result, workload and throughput-based pricing models are harder to achieve because the resource demands of database queries can vary significantly based on the complexity of the query.

5.4 Product Aspects

The aspects of serverless offering:

1. Creating a serverless deployment is as minimal of an experience. May not require the user to specify anything that may not be specified (e.g. storage amount, VM size, etc.).
2. Compute and storage have fine-grained elasticity. The user does not need to think about scaling up to meet increasing workloads or storage needs.
3. The user does not need to worry about paying for resources they are not using and can set limits on resources to ensure they do not overspend.
4. It can scale to data sizes up to 1 PB.
5. Supports tiered storage that allows cold data to age out to cloud storage (eg S3)
6. The pricing model, as presented to the user, is simple and easy to understand.
7. A pricing model may scale to large, steady workloads.
8. Headroom issues addressed by the provisioned capacity model, either by offering a provisioned capacity mode or by other means.
9. The database can support large and dynamic connection counts from ephemeral compute environments with low latency.
10. Maximize fault isolation between deployments.
11. Deployments can be configured to tolerate the outage of a single region.
12. Deployments can be globally distributed for local reads and writes where Regions can be chosen from any of the cloud providers supported.
14. Deployments can be made to utilize dedicated resources (e.g. VMs and storage) for customers who use it.
15. Deployments can be used for analytics workloads in ways that are isolated from other workloads on the same data.
16. Maintenance, migrations, and internal automation are transparent to clients and causes no driver errors with minimal change in latency.
17. The MongoDB API (wire protocol, query language, drivers API, and documentation) may be the same regardless of the deployment type (serverless, dedicated, other). If they do differ, differences may be minimal, cleanly separatable (e.g. a feature is simply not supported vs. the feature behaves differently), and may be isolated to administration APIs (vs application APIs).
18. Reduce wastage of compute and storage resources across the fleet in a way that improves efficiency.

5.6 Pricing Model

The serverless deployment type may include the on-demand model described in Section 3, with a workload-based pricing model similar to on-demand pricing, which consists of Read Units and Write Units that capture the amount of data read and written to the database.

This workload-based pricing model may be particularly attractive for sparse workloads (i.e. workloads that infrequently access the database). For example, a workload that accesses the database once a minute may have a monthly bill on the order of $0.05.

5.7 Provisioned-Capacity and Addressing Challenges of an On-Demand Model

As described in Section 3, there may be two issues with an on-demand model:

1. The on-demand model may get expensive with heavier workloads. Pricing for serverless deployment model may quickly become more expensive than Dedicated deployment model.
2. The on-demand model may be more likely to throttle users than they may be if they used a Dedicated plan. The provisioned-capacity model aims to solve this by allowing customers to provision capacity that serves as headroom during spikes, reducing the likelihood of being throttled.

WiredTiger Tiered Storage

The Tiered Storage initiative enhances the WiredTiger storage engine to support object storage in addition to local file storage. Provided is an overview of the changes to WiredTiger.

Object storage services, such as Amazon S3 or Azure BlobStore, provide highly reliable, network-accessible storage for write-once objects. These services are typically less expensive ($/GB) than comparable block-storage services such as Amazon EBS. Object storage services are internally replicated and provide high reliability and data integrity, reducing the need for applications to store multiple independent copies of their data. Unlike block storage, object storage is designed for concurrent access from multiple clients, providing an easy way to share data between clients.

These characteristics of object storage offer several benefits:

Lower cost: Object storage is cheaper than comparable block services per byte of stored data. Can realize additional savings by storing only a single copy of data in a replica set and allowing the nodes to share access to the same set of read-only objects.

Simplified data migration: It may be easier to copy datasets between nodes if the nodes can share access to a set of objects containing the data instead of physically copying all of the bytes. This may be useful for initial sync of new nodes, tenant migrations, and (re)sharding data between replica sets.

Lower overhead and lower cost backup: Because cloud objects are immutable, backup may not create an additional copy of client data. Instead it can retain the same objects used by the replica set. This may eliminate the cost of storing extra data copies and the overhead of making those copies.

The Tiered Storage Initiative extends WiredTiger to support object storage, and integrate that functionality with MongoDB, making Tiered Storage functionality available in platforms such as Atlas Serverless and Atlas Dedicated.

Object storage services have different features and capabilities compared to traditional file- or block-based storage. Of particular interest in the Tiered Storage design:

Objects are write-once. Once an object has been created it may not be modified or extended. Thus, an object may be created and populated in a single operation.

The latency to retrieve data from an object is higher and more variable than block storage.

Object storage services charge by both the amount of data stored and the number of operations performed. For example, S3 charges for each object read. Reading 1000 1 KB objects costs 1000× more than reading the same amount of data from a single 1 MB object.

Figure 7:
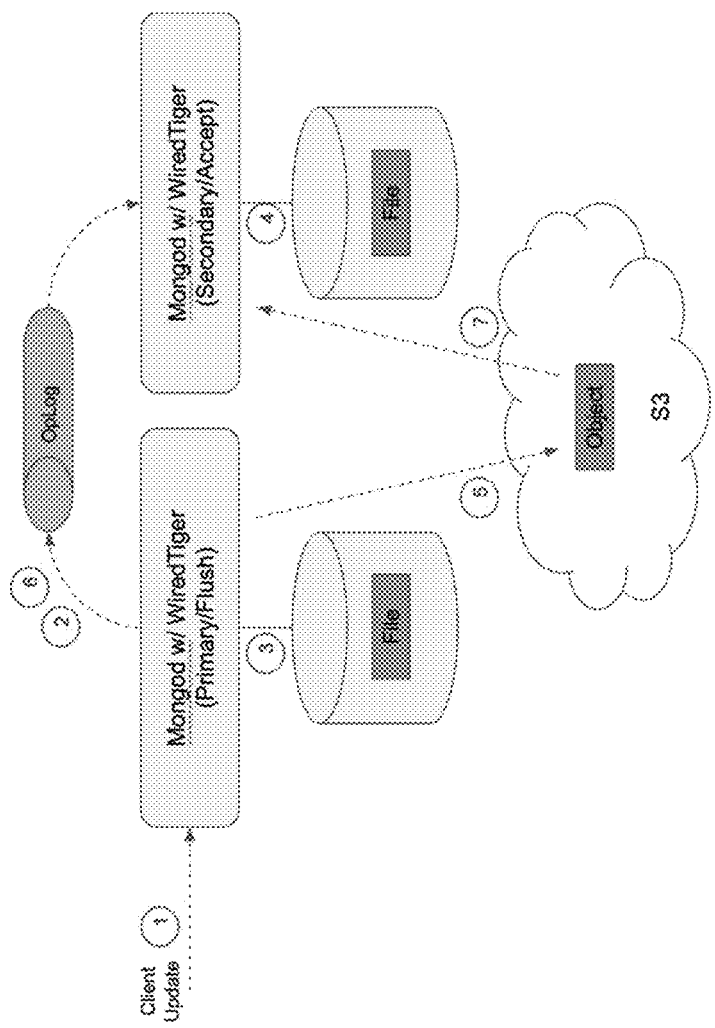
FIG. 7 shows Tiered Storage.

Tiered Storage extends the MongoDB replica set architecture. Client requests are processed, replicated, and persisted. With Tiered Storage, WiredTiger may periodically copy stable data to object storage. FIG. 7, illustrates the basic operation of Tiered Storage. For simplicity, this diagram only includes a single Secondary node. Other Secondaries may behave the same as the one shown here.

FIG. 7 shows Tiered Storage update processing. Dashed arrows indicate network transfers/copies.

The following steps show the progress of a client update from arrival at the Primary until it is stored in object storage and shared across the replica set.

1. A client update arrives at the Primary node.
2. The Secondary copies operations from the Primary by using network calls to read the Primary's OpLog.
3. The Primary persists the update to a WiredTiger file on its local storage.
4. The Secondary persists the update to a WiredTiger file on its local storage.

Up to this point, the processing is the same as what may be seen in a MongoDB replica set. The remaining steps extend this process to incorporate object storage.

5. The Primary periodically copies new stable records to object storage, creating a new object in the cloud.
6. The Primary informs the secondary about the new object via the OpLog.
7. The Secondary can access the records written to object storage by the Primary.

After the final step shown, the records copied to object storage may exist both in shared object storage and in local storage on each node. At this point the replicas may choose to delete those records from their local storage, freeing local storage space. Alternatively, they may retain these records as a local cache of the data that lives in object storage.

Implementing this functionality may use several additions and changes to WiredTiger:

A Union Table that may combine data from two or more separate WiredTiger tables and present it as a single table to MongoDB. WiredTiger may use this functionality to present a logical table to MongoDB that combines local data that has not been copied to object storage with data that has previously been copied to object storage.

A Tiered Table that may store a WiredTiger BTree in a set of storage objects.

New APIs to allow WiredTiger instances on separate replica set members to coordinate the sharing of a table in object storage.

Additional functionality to:

Garbage collect data from object storage

Cache data from object storage on local storage

Support zero-copy backups of data in object storage

In addition to these changes to WiredTiger, this initiative may update the MongoDB server to configure and use this new functionality.

In subsequent sections, provided is background information about WiredTiger, and description of the items above in more detail.

MongoDB stores each collection and index in a separate WiredTiger table. These tables are organized as key/value stores. Each table is stored as a BTree in a file in a local file system.

WiredTiger writes BTree blocks to files using no-overwrite allocation. In other words, when WiredTiger updates a block and writes it to the BTree file, WiredTiger writes the block to a free location in the file rather than overwriting and replacing the prior version of the block.

No-overwrite allocation is an important part of WiredTiger's checkpointing and durability mechanisms. It may also be useful for writing a BTree to write-once object storage.

Local storage refers to a file system managed by the host system. This may reside on locally attached storage, such as a hard drive or SSD, or it may reside on a network block storage, such as EBS.

Union Tables

Union tables may address a challenge of sharing a table across members of a replica set. As described with respect to FIG. 7, an update is first written to local storage on the primary and secondaries before it gets flushed to shared object storage. Tiered Storage may implement this using separate WiredTiger tables for local and shared storage. The primary may apply incoming client updates to a table on its local storage. At the same time secondaries may apply updates, received via the OpLog to a similar table on their local storage. This is what MongoDB does. To take advantage of object storage, one node may periodically copy records from its local table to the shared table in object storage. That node may then tell the other nodes about the new data in object storage.

This structure of separate tables is a straightforward way to implement the behavior described in FIG. 7. But above WiredTiger, MongoDB may not have to worry about having some records stored in a local table and other records stored in the shared table. Union Tables may provide this functionality. A Union Table is a virtual WiredTiger table that presents the union of the records in two (or more) regular WiredTiger tables as if those records were in a single table. For each shared table in a replica set, Tiered Storage may use a Union Table on each node combining the Active Table of recent updates on local storage with the shared table in object storage.

In more detail, a Union Table is an ordered set of member tables. Operations on a Union Table are performed on the members in order until successful or until the operation has failed on all of the member tables. Thus, to lookup a key in a Union Table, WiredTiger performs a lookup on its first member table. If it finds the key in the first table, it returns the corresponding value, otherwise it tries the lookup on its second member table, and so on. If no member contains the desired key, WiredTiger returns a NOTFOUND error.

New values may be written to the first member table. An update is performed logically as a lookup followed by an insert of the new value. Thus, an update can modify a record from any member table, but the resulting new value may be written to the first table.

WiredTiger deletes values from a Union Table by inserting a tombstone in the first member table. A subsequent lookup may find the tombstone and not search subsequent member tables.

To scan a Union Table starting from a given key, WiredTiger may create a cursor on each member table at the desired key. As the scan advances, WiredTiger may compare the current values from each member cursor to identify the next value that may be returned from the Union Table.

Tiered Storage may use Union Tables with just two members, the local table and the shared table. Union Tables may have other applications and may implement a general version that supports any number of members.

In addition to implementing the same API as other WiredTiger tables, Union Tables may also support internal (to WiredTiger) operations that copy records from one member table to another and that remove records from a particular member table. In both cases, the Union Table may copy or remove records based on timestamp.

Union Tables may provide the ability to replace the last member table while the Union Table is in use. This is how WiredTiger may propagate updates to the shared table across a replica set. One node may add data to the shared table and then send a pointer to the updated table to the other replica set members. These members may replace the older version of the shared table in their Union Table with the new version.

A cost to Union Tables is that negative queries (i.e., requests for non-existent keys) may search each member table. This is particularly costly when the final member resides on object storage. As an optimization, Union Tables may use an Approximate Membership Query (AMQ) structure, such as a Bloom filter, to quickly identify keys that do not exist in a particular member table.

Tiered Tables

Tiered Tables address the challenge of how to store a WiredTiger BTree in object storage. WiredTiger may store a BTree in a local file and updates that file with individual block writes as WiredTiger evicts or checkpoints dirty BTree pages from its in-memory cache.

At the BTree level, a Tiered Table functions the same as a regular WiredTiger tree. The difference is in how a Tiered Table reads and writes data on the underlying storage. Tiered Tables differ from regular tables in three ways.

First, a Tiered Table can span multiple files or objects. In a regular WiredTiger table, each block pointer in a BTree is a triplet consisting of <offset, size, checksum>. This triplet describes a block of data within a single file. To support multiple files, Tiered Tables may use an expanded address format that includes a fileID: <fileID, offset, size, checksum>. The fileID may be an index into a list of files and objects that make up the Tiered Table. This list may be stored as part of WiredTiger's metadata for the table.

Second, a Tiered Table may have only one writable file at a time. All of the other underlying files and objects may be read-only. As in a regular table, the writable file may use no-overwrite allocation. So WiredTiger may allocate, free, and reuse blocks in the writable file in the same way it does for regular tables.

Finally, WiredTiger may periodically switch to a new writable file for a Tiered Table. This may change the current writable file to be read-only and may create a new empty file as the writable file. Thus, a new Tiered Table may start with just a single file, which may be the writable file. Over time, WiredTiger may switch to new writable files, increasing the number of files belonging to the Tiered Table.

These three features make Tiered Tables a good fit for write-once object storage. WiredTiger may store a Tiered Table's writable file on local (read-write) storage, allowing it to be updated as used. When WiredTiger switches to a new writable file and the previous file becomes read-only. At this point WiredTiger can copy the previous file to the object storage.

Data Sharing in Replica Sets

After description of Union Tables and Tiered Tables, described is how WiredTiger may use these new capabilities to share data in object storage between nodes in a MongoDB replica set.

Figure 8:
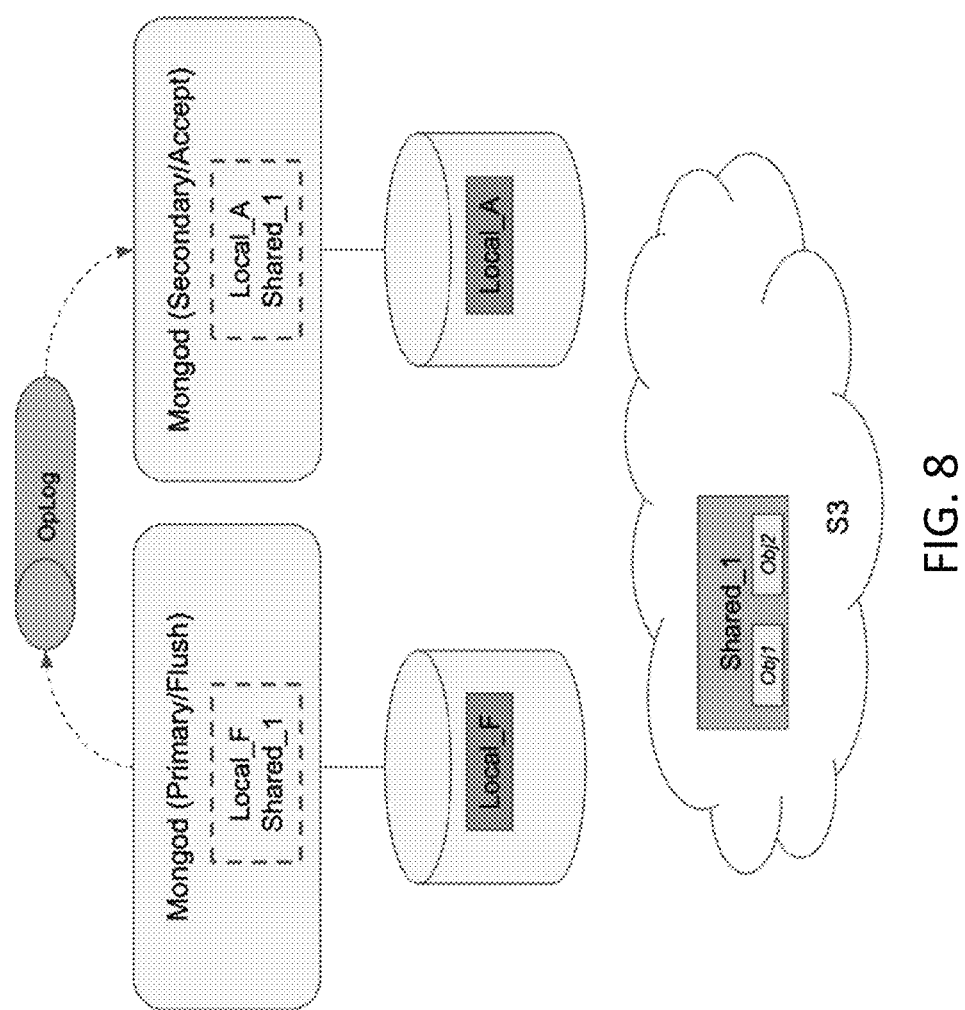
FIG. 8 shows a replicated table in a replica set.

FIG. 8 shows a single replicated table in a replica set. There may be only a single secondary in the figure to simplify the illustration. Other secondaries may mimic the one shown here. FIG. 8 shows a replicated file base case.

In this diagram, the replicated table on the primary (shown by the dashed box) consists of a Union of the tables Local_F and Shared_1. The corresponding version of the table on the secondary is a Union of Local_A and Shared_1. Local_F and Local_A reside in files on the local file systems of the primary and secondary nodes, respectively. Shared_1 is a Tiered Table used by both nodes and resides in the cloud, and it is made up of two S3 objects, Obj1 and Obj2.

As client updates are processed, the primary may write them to Local_F, via the primary's Union Table. The secondary may receive the updates from the primary via the OpLog and write them to Local_A via the secondary's Union Table.

Avoid replicated updates to accumulate indefinitely on local storage, may move this data to the Tiered Table in the cloud and make a single copy available to all nodes in the replica set. WiredTiger may iteratively move data from local storage to shared storage using the Flush-Accept cycle. The basic idea is that a single node, the Flush Node, copies data from its local table to the shared table. The Flush Node informs the other nodes, the Accept Nodes, about the new shared data and they update their Union Tables to use the new version of the shared table.

Figure 9:
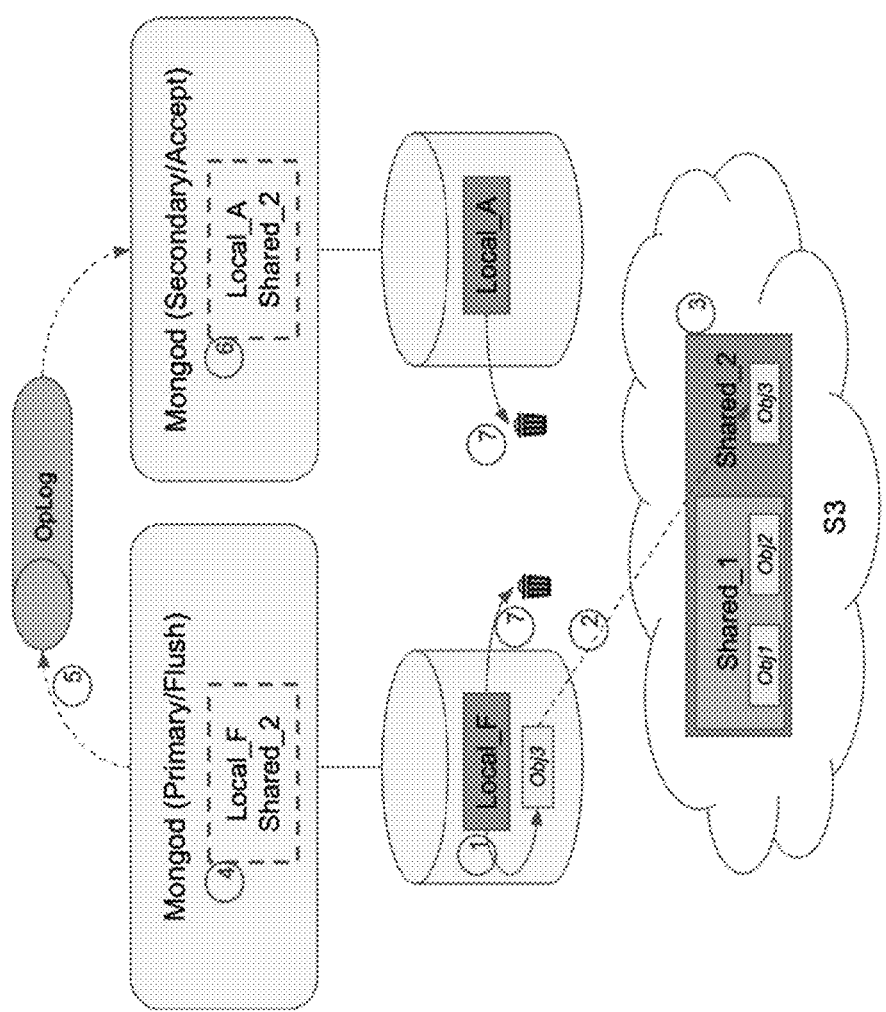
FIG. 9 shows a Flush-Accept cycle
Figure 10:
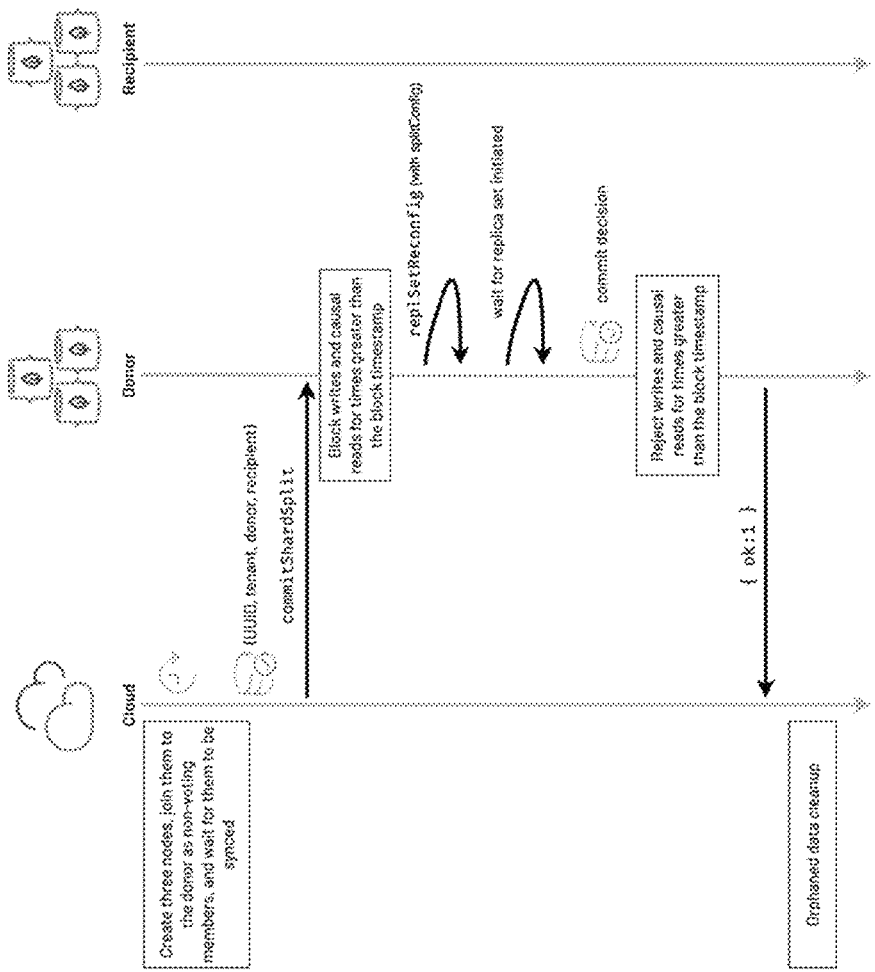
FIG. 10 shows a process flow for a shard split.
Figure 11:
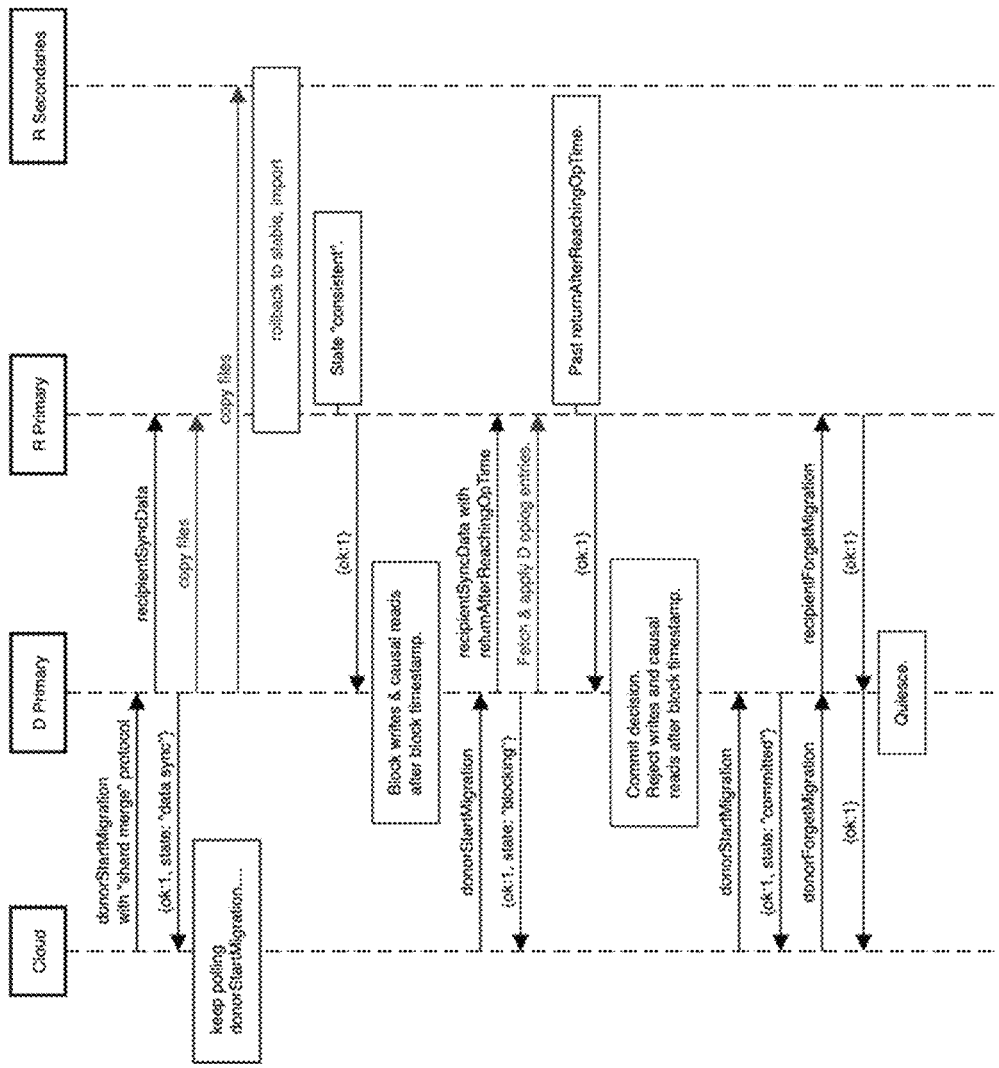
FIG. 11 shows a process flow for a shard merge.
Figure 12:
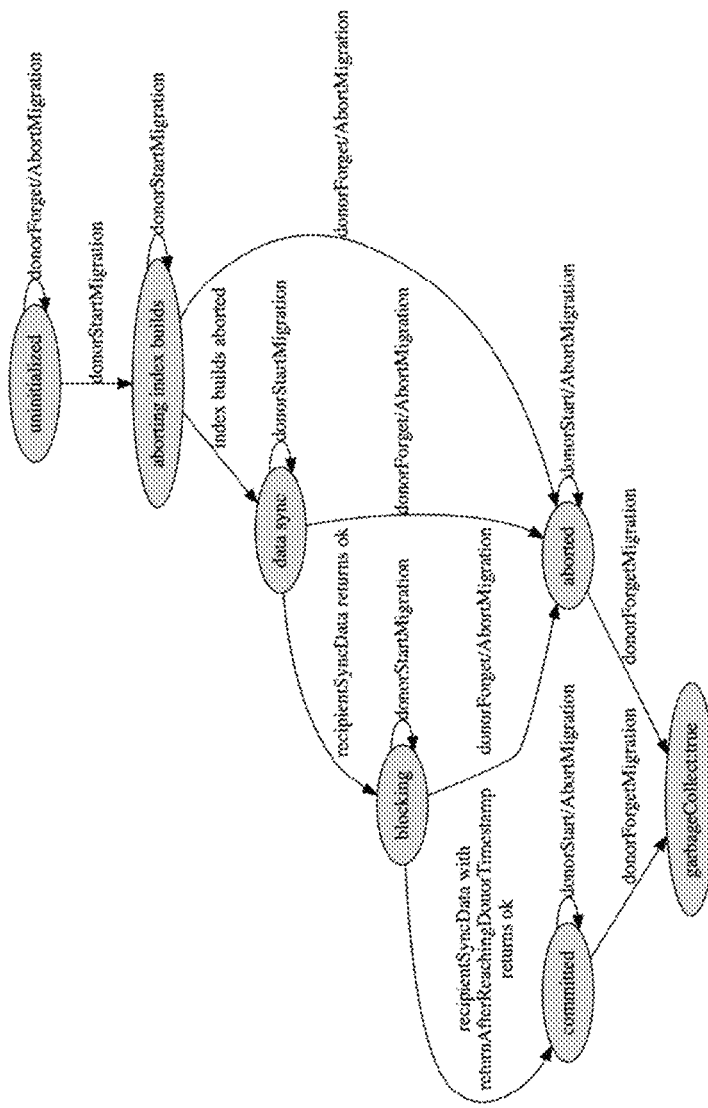
FIG. 12 shows a set of exemplary states for a shard merge.
Figure 13:
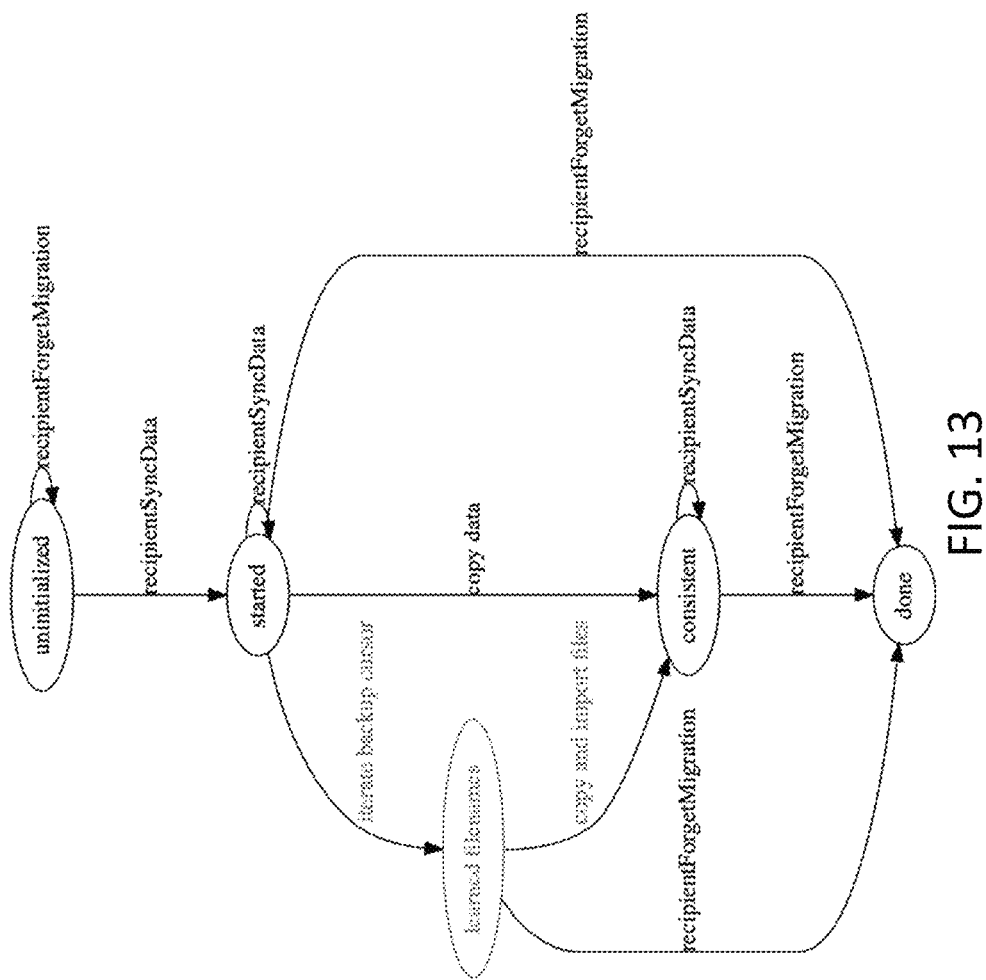
FIG. 13 shows another set exemplary states for a shard merge.

FIG. 9 illustrates this Flush-Accept cycle. The diagram shows the Primary as the Flush Node. It may be more efficient to have a Secondary act as the Flush Node.

The Flush-Accept cycle may comprise the following steps.

1. The Flush Node copies stable records from the first member of its Union Table (Local_F) to the next member of the Union Table (Shared_1). The Flush Node uses a flush timestamp to decide which records to copy. It copies all records created before the flush timestamp. The flush timestamp may be less than or equal to the stable timestamp. It is A flush timestamp may be selected by WiredTiger, specified via an API call, or defaults to the stable timestamp at the time the flush operation starts.

Shared_1 is a Tiered Table. So the records copied to this table are persisted to its writable file, shown in FIG. 9 as Obj3.

2. WiredTiger checkpoints the shared table. This flushes all of the records copied into the shared table to the table to Obj3. WiredTiger then copies Obj3 to the cloud as a new S3 object.

3. At this point there is effectively a new version of the shared table stored in S3. This new version, Shared 2, has the state of the shared table as of the checkpoint performed by the Flush Node, and it is made up of Obj1, Obj2, and Obj3. Other nodes in the replica set that do not know about Shared_2 can continue using Shared_1.

4. As a result of the Flush operation, the Union Table on the Flush node has Shared_2 as its second member. The Flush Node is the node that updated the shared table this does not use any actual work on the Flush Node. It is shown in the diagram to indicate that at this point the copied records are available to the Flush node in the cloud via the shared table.

5. The flush operation in WiredTiger returns an opaque cookie to the MongoDB server. This cookie may contain the metadata WiredTiger may share with other replicas so they can use the updated shared table. MongoDB may replicate the cookie to the other replicas via the OpLog. The replicas may pass this cookie to their local WiredTiger instance via a new API.

6. Update the Union Table on the Accept Node by replacing Shared_1 with Shared_2. The system may be able to make this switch while the Union Table is in use. There are two major points that are coordinated.

First, there may be cursors positioned using the old Union Table configuration. WiredTiger may transfer position information relative to the old version of the shared table to the new version. In other words, updating the Union Table may be transparent to a mongod performing next and prev operations on a cursor on the Union Table.

Second, there may be pages from Shared_1 in WiredTiger's in-memory cache that are unchanged in Shared_2. WiredTiger's cache is indexed accessed via BTree, and there may be no mechanism to share pages between BTrees. To avoid reloading such shared pages, Tiered Storage may leverage the block caching layer introduced to support NVRAM. All reads from a BTree may check this cache before reading from storage, allowing read-only pages to be shared across in-memory BTrees.

7. With the Flush and Accept completed, nodes can delete data from their local tables that is replicated by the new version of the shared table. I.e., they can delete the set of records that were flushed to the shared table by the Flush Node in step 1. This can be done lazily, similar to the way WiredTiger uses timestamps to prune old data from its history store file.

In the process described above, WiredTiger may not know whether it is running on a primary or secondary. Similarly, the roles of Flush Node and Accept Node can change on every iteration of the cycle described above. From WiredTiger's perspective it may simply receive and process an arbitrary sequence of Flush and Accept requests.

There is some coordination, but this may be handled by the MongoDB server, which is already managing roles within the replica set. A simple implementation may mimic the figures, above, with the Primary periodically invoking a Flush and then sending the results to the Secondaries. A flush, however, may be quite resource intensive, using extra I/O and duplicating data in the cache as it is copied between the members of the Union Table. Thus it may be preferable to perform Flushes on a secondary to avoid placing extra load on the Primary. In this model, the Primary may select a secondary and send it an RPC requesting a Flush. The secondary may perform the flush and return the cookie to the primary, which may forward the cookie to all replicas via the OpLog.

An added benefit of performing Flushes from a secondary is that Garbage Collection (see below) may happen on the Flush Node. So having a secondary act as Flush Node may also offload Garbage collection overhead from the Primary.

Storing read only objects in the cloud. May use them for backup without paying to copy and store another copy of them as backup. WiredTiger may implement a backup cursor that enumerates tables and the objects that back them. Because cloud objects are write-once, a backup application does not copy these objects.

1: May avoid paying to store dead data in objects. Track the amount of free space in each object (this may be approximate). When the amount of free space in an object is large, WiredTiger may copy the live blocks from that object to a new storage location, allowing the old object to be removed. This is similar to WiredTiger's existing compaction process, except that instead of copying data from near the end of a file may copy it from addresses that fall in the target object. Tiered Storage assumes a single node at a time updates shared Tiered Tables. So this means that whatever node is the Flush Node may also do this work.

2: With multiple nodes (and backups) using the same objects, how to determine when an object can safely be deleted. A service (external to WiredTiger) may perform object level garbage collection. It may take a set of WiredTiger metadata files (as may be generated by backup or by the Flush-Accept cycle) and parse them to generate a list of referenced objects. Any object that is not on that list and that was created before the oldest metadata file can be assumed to no longer be in use and may be removed. This process may include similar metadata for backups.

Reading individual blocks from the cloud may be much slower than local storage. May use local storage as a second tier cache (after the in-memory WiredTiger cache). May use the new block caching layer in WiredTiger. A quick but expensive implementation may copy all objects to local storage and service reads from those copies. This may be a faster way to get an initial Tiered Storage implementation working but it may be inefficient as a general solution since it may copy and cache data that may not be, including dead space in each object.

Shard Split

1. Cloud prepares for split 1.1. The control plane creates three new nodes, joins them as non-voting members to the donor, and waits for them to initially sync 2. Cloud initiates the split against the donor primary 2.1. The control plane durably persists a unique operation id, the list of tenant ids to split, the donor connection string, a unique replica set tag identifying recipient nodes, and the recipient replica set name.

2.2. A chosen donor proxy sends commitShardSplit to the donor primary with the migration id, list of tenant ids to split, recipient replica set tag, and recipient replica set name 2.2.1. If commitShardSplit returns a retryable error the process driving the split operation is expected to retry the operation against the newly elected primary 2.2.2. If commitShardSplit returns a non-retryable error this is similar to aborting the split, skip to step 5.2

3. Donor performs mitosis and commits the split 3.1. The donor durably chooses a "block timestamp" in the oplog. It begins blocking writes and causal reads after the block timestamp for tenants being donated, and waits for a majority of the recipient nodes to catch up 3.2. The donor calls replSetReconfig on itself with the split config 3.2.1. Recipient nodes observe that they are removed from the current replica set, and locally apply the recipient config. This config is irreversible, meaning that no other replica set can change this node's replica set name 3.3. The donor monitors the recipient to learn when the split is accepted by all recipient nodes 3.4. Once the recipient has accepted the split, the donor makes a commit decision durable on itself and then returns {ok: 1} for the commitShardSplit command. The donor begins rejecting all writes and causal reads greater than the block timestamp for tenants being donated 3.4.1. Blocked requests are rejected with a TenantMigrationCommitted error 3.5. The donor calls replSetReconfig on itself to remove the split config 4. Cloud acknowledges the migration's outcome by sending forgetShardSplit to the donor primary 5. Cloud cleans up the orphaned data 5.1. If the split committed 5.1.1. Cloud may immediately begin cleaning up recipient orphan data 5.1.2. Cloud waits for a grace period to allow clients to exhaust existing cursors on the donor, then deletes the databases from the donor for tenants that were donated 5.1.3. After the data is deleted from the donor, getMores against the donor may fail with QueryPlanKilled.

5.2. If the split aborted 5.2.1. Cloud terminates the recipient nodes, reconfigs the donor to remove the recipient nodes, and optionally schedules another split Original config: The config on the donor when it receives the commitShardSplit command.

Recipient config: The config for the recipient replica set.

Split config: A config based on the original config which excludes the recipient nodes, and includes a recipient config in a subdocument.

Commands/Parameters timeout: A new server parameter may be introduced which governs the maximum amount of time for a split operation.

commitShardSplit: The donor primary receives commitShardSplit from the process driving the split operation (e.g atlasproxy, control plane) and creates a durable state machine for the operation. At the beginning of the split operation expect three new nodes (the "recipient nodes") to have been created, synced, and joined to the donor. The commitShardSplit command has the following shape:

{
commitShardSplit: 1,
migrationId: <UUID>, // unique identifier for this operation tenantIds: Array<string>, // list of tenants to split recipientSetName: string, // the name of the recipient replica set recipientTagName: string // the replica set tag for recipient nodes
}

The donor primary may validate that the recipient nodes are non-voting and tagged with the replica set tag provided as a parameter to the command. Recipient nodes may be non-voting so that can use safe reconfig, which may only permits removing more than one node at a time if all the nodes being removed are non-voting. Tagging the nodes with a unique tag makes it easier to await replication state for just those nodes in a later step. If either of these validations fail, the commitShardSplit may be rejected.

In some embodiments, only one split operation may run on a donor at a time. The donor primary may reject a commitShardSplit command if there is an active split operation.

When called, this command may block on the donor primary until it observes the recipient accept the split or the operation times out. In the event of an election during the split operation, commitShardSplit may return a retryable error so that the process driving the split operation can retry the command against the new donor primary. If the split operation timed out then commitShardSplit may return a non-retryable error (probably ExceededTimeLimit) to indicate that the caller may reap the recipient nodes and clean up before trying a new split operation. The process driving split may continue calling commitShardSplit until it learns about the outcome of the operation.

abortShardSplit: The split operation may be aborted on the donor primary at any point until the primary has written a commit decision. The process driving the split can send an abortShardSplit command to abort the split operation, it has the following shape:

```
{
abortShardSplit: 1,
migrationId: <UUID>,    // unique identifier for this operation
}
```

The donor primary may validate that the operation exists, and may return an error if the operation has already been committed or aborted.

If there is an election while attempting to abort the split operation, the donor primary may return a retryable error to the caller. The process driving the split operation may retry the abortShardSplit command in this case.

forgetShardSplit: When the process driving the split operation has durably committed the learned outcome of the split and updated its routing tables, it may inform the server that it no longer learns of the outcome by sending forgetShardSplit. This is the shape of that command:

```
{
forgetShardSplit: 1,
migrationId: <UUID>,    // unique identifier for this operation
}
```

The donor primary may validate that the operation exists, and may return an error if there is no existing operation to forget. The process driving split may continue to run this operation until it receives a successful outcome, or an error indicating the operation is not found.

Blocking User Requests: The donor primary then starts blocking writes by reserving an opTime (the blockTimestamp) and then majority commits the "blocking" state and the blockTimestamp. may use the same machinery developed for multi-tenant migrations to block user requests.

The donor primary then waits for a majority of the recipient nodes to catch up to the blockTimestamp by using ReplicationCoordinatorImpl::awaitReplication with a write concern which waits for a majority of nodes with the recipientTagName to acknowledge they have written the blockTimestamp to their journal ({w: {<recipientTag- Name>: floor(n/2)+1}, j: true}, where n is the number of recipient nodes). Waiting for a simple majority is safe because the recipient may have had no previous primary when the split completes, ensuring that any elected primary node may have the blockTimestamp entry in its oplog. may also add an invariant that the blockTimestamp does not roll back on the recipient.

May add a new state before "blocking" where wait for recipient nodes to have low replication lag since catching up to the blockTimestamp may take longer than expected, or otherwise jeopardize the split operation.

Similar to multi-tenant migrations:

Index builds (on tenant's collections) are blocked for the entire tenant migration, even prior to the blockTimestamp.

Index builds which were in progress when the tenant migration started are aborted before the migration enters the blocking state.

Single phase index builds on empty collections are also blocked throughout tenant migration. An exception is that an index build which implicitly creates a collection is allowed.

Initiating the split: The donor primary prepares a "split config" which is a copy of the current config with recipient nodes removed, an increased term, and a new subdocument (splitConfig) which contains the recipient config. The recipient config is a copy of the current config with donor nodes removed, recipient nodes reindexed from zero, and a new set name and no term (a term may be applied explicitly by recipient nodes when applying the recipient config).

It then calls replSetReconfig on itself with the split config. After the replSetReconfig returns, assume that the split config is majority committed to the donor (per the safe reconfig protocol), thus do any additional work to durably commit the split config for future retries.

If an election occurs while applying the split config the ShardSplitDonorService may return a retryable error to the caller of commitShardSplit. The POS machinery may ensure the service is resumed on a new primary and that the replSetReconfig is re-run.

Accepting the split: Recipient nodes learn of the split config through heartbeats. They may only agree to change their replica set name when they observe the split config, which only members of the donor replica set may present to them. When a recipient node sees a split config it may initiate a local reconfig to install the recipient config. When applying the recipient configure locally may explicitly set the term to 0, this may always be the first config for the recipient set.

This config is irreversible once installed (which means writing the config to disk, see the safe config protocol overview for more details on "installation"), no future config may change the local set name. This prevents reconfigs on the donor from reversing the split on recipient nodes which have already accepted it.

Example Scenario 1. donor primary receives commitShardSplit
2. donor primary chooses a blockTimestamp
3. donor primary waits for a majority recipient nodes to be caught up to blockTimestamp
4. donor primary updates its local config document such that the recipient nodes are removed and there is a split-Config with the recipient nodes
5. one recipient node receives a heartbeat with the split config, and locally applies the recipient config
6. donor is deposed, and accepts the original config from a newly elected primary In this case the donor believes the node which applied the recipient config (in step 5) is part of the donor replica set again, and may begin sending heartbeats to rejoin the node. This is problematic because nodes which have been removed from a replica set may rejoin that replica set if it is reconfigured to reverse their removal, since the set name is the same. Ensuring the recipient node rejects these heartbeats may guarantee forward progress of the split operation, and makes the split protocol easier to reason about.

The donor primary monitors the recipient nodes using a ReplicaSetMonitor to learn when the split has been "accepted," by checking that all recipient nodes report the recipient set name in their hello response. Failing to observe that all recipient nodes report the updated set name means that some nodes may not learn of the recipient config.

Example Scenario 1. donor primary receives commitShardSplit
2. donor primary chooses a blockTimestamp
3. donor primary waits for a majority recipient nodes to be caught up to blockTimestamp
4. donor primary updates its local config document such that the recipient nodes are removed and there is a split-Config with the recipient nodes
5. commitShardSplit returns "committed"
6. donor clears splitConfig from local config so it can be split again in the future Here it is possible that some recipient nodes miss the heartbeat containing the split config, and thus may not learn about the split.

In another scenario may wait for only one recipient node to accept the split:

1. donor primary receives commitShardSplit
2. donor primary chooses a blockTimestamp
3. donor primary waits for a majority recipient nodes to be caught up to blockTimestamp
4. donor primary updates its local config document such that the recipient nodes are removed and there is a split-Config with the recipient nodes
5. donor primary waits for one recipient node to have accepted the split
6. commitShardSplit returns "committed"
7. donor clears splitConfig from local config so it can be split again in the future This also may not work because the other two recipient nodes may not hear of the recipient config. Recipient nodes cannot join each other to the recipient set because they may present the recipient config in their heartbeats, which may be rejected because it requests a set name change.

Committing the Split: The same as in multi-tenant migrations.

Aborting the split: The same as in multi-tenant migrations.

Cleanup: Once the split has completed the donor primary issues another replSetReconfig against itself to remove the split config. This allows the donor to be split again in the future.

Use the same process as multi-tenant migrations to mark state machine documents garbage collectable on receipt of the forgetShardSplit command.

Upgrade/Downgrade Requirements and Behaviors: Splits may not be permitted to continue while upgrading or downgrading the donor. The FCV op observer may abort all split operations on the donor when the FCV changes. Starting a new split operation if the FCV is upgrading, or is less than 5.2 may be explicitly not permitted.

Diagnosis/Debuggability: Similar to multi-tenant migrations, a currentOp entry is generated for each tenant donor service with the following shape:

```
{
  desc : "shard split" tenantIds: Array<string> recipientTagName : <string>
  migrationStart: <date> // optional blockTimestamp: <timestamp> // optional
  commitOrAbortOpTime: <optime> // optional abortReason: { // optional
    code: number, errmsg: string
  }
}
```

Design Alternatives

Executing the split outside of the server: may have split completely outside the server, which may provide Cloud with the tools to execute a split: (1) support splitConfig during a replSetReconfig, (2) provide a way for Cloud to await a replication state (for example, through a writeConcern). Have performance requirements of 100 ms or under for the split operation. If Cloud drives this process roundtrip times of messages may add unnecessary latency to the operation. In a sharded deployment tenant access blocking may be outside of the server.

Shard Merge

Downstream Visible Behavioral Changes

Terms

D: the Donor shard.

R: the Recipient shard.

MT Migrations: the existing Multitenant Migrations protocol.

ShardMergeFCV: the feature compatibility version in which enable Shard Merge. startApplyingOpTime: the optime of the oldest D oplog entry R may apply. startFetchingOpTime: the optime of the oldest D oplog entry R may fetch, ≤startApplyingOpTime. Calculated as in MT Migrations to include the oldest transaction entries R may use.

RTS: rollback to stable.

Algorithm Overview

Cloud calls donorStartMigration on the D primary with protocol: "shard merge".

The D primary calls the recipientSyncData command on the R primary.

The R primary opens a backup cursor on the D primary and receives a list of files to copy. The R primary saves this list to a temporary replicated collection. It sets startApplyingOpTime to the checkpointTimestamp returned by the cursor.

The R primary calculates startFetchingOpTime as in MT Migrations.

The R primary starts fetching D oplog entries into a temporary buffer, from startFetchingOpTime forward.

Each R node copies the files from the D primary into a temp directory. This includes the D primary's history file.

The R primary closes the backup cursor.

Each R node:

Creates a temp WT instance (aka a "WT connection").

Uses D's history file to execute RTS on each D file, resulting in a consistent snapshot of D's data at startApplyingOpTime.

Extracts each donated collection's metadata.

Shuts down the WT instance.

Moves the D files from its temp directory to its dbpath.

Imports the D files. The D oplog and system collections are excluded.

The R primary replies "ok" to the first recipientSyncData command.

The R primary starts applying D oplog entries from startApplyingOpTime forward.

The D primary blocks writes. It calls recipientSyncData on the R primary again, with the returnAfterReachingDonorTimestamp argument.

The R primary fetches and applies D's final entries, waits for majority replication.

The R primary replies "ok" to recipientSyncData, and the D primary commits the merge.

Begin Implementing Merge

Update the MT Migrations code to also implement Shard Merge. The server may choose the new protocol depending on a new command parameter (see Enabling Shard Merge) and permit empty tenantId. Shard Merge may be enabled by default, then delete MT Migrations by removing all the if-then branches that implement the old protocol; meanwhile the two may coexist in one code base.

Many aspects of the Shard Merge process may be the same as in MT Migrations.

Enabling Shard Merge

Provide an optional "protocol" parameter to donorStartMigration, its value may be "multitenant migrations" (the default) or "shard merge". deprecate and remove the parameter.

The "shard merge" protocol is guarded by a new feature flag called "featureFlagShardMerge", which may have the standard lifecycle.

State Machines

MT Migrations donor and recipient state machines adapted for use with both protocols. continue using MT Migrations' algorithm for garbage collecting state machines. (After a successful merge, D may usually shut down before it GCs its state machine, but keep the GC logic enabled to handle aborted merges and for the later Smerge project.) For both the D and R state machines:

Add a "protocol" field with a string value of either "multitenant migrations" or "shard merge". choose a protocol based on whether shard merge is enabled (see above), then persist this choice in the state machine and use the state machine to determine the protocol in later steps.

Permit tenantId=" ".

Commands

The sections below describe changes to each migration command. Summary of MT Migrations logic for context; with differences prefixed with "If Shard Merge is enabled" or "if protocol is 'shard merge'".

donorStartMigration

The D primary receives the donorStartMigration command from Cloud. Add a "protocol" parameter which can be "multitenant migrations" (the default) or "shard merge". D returns an error if the caller attempts to start a shard merge concurrent with any other migration.

Create a D state machine in "uninitialized" state, same as MT Migrations. If Shard Merge is enabled, set the state machine's protocol to "shard merge", otherwise to "multitenant migrations".

Transition to "aborting index builds" state and abort all migrating tenants' index builds (same as MT Migrations, but for all tenants instead of one). Building an index may block until the merge ends, then they are aborted if the merge succeeded, or started if the merge failed, see Indexes.

Whenever D calls recipientSyncData, if Shard Merge is enabled set recipientSyncData's "protocol" parameter to "shard merge".

D's TenantMigrationDonorService may follow the same steps as in MT Migrations. When it transitions to state "committed", if Shard Merge is enabled, then D has no tenants; it quiesces until it is terminated. Cloud may keep D alive for a quiesce period consistent with. The D commit logic in MT Migrations is intended to allow D to keep serving non-donated tenants, so this logic has features not used for Shard Merge.

recipientSyncData

As in MT Migrations, the R primary receives recipientSyncData from the D primary. The recipientSyncData parameters are the same as in MT Migrations, except:

If Shard Merge is enabled, accept a new parameter "protocol".

If Shard Merge is enabled, no majorityAppliedDonorOpTime field in the reply.

If protocol is "shard merge" error if there is a D state machine, or an R state machine for a merge with a different id, or an R or D state machine for any multitenant migrations.

If there is no merge in progress and protocol is "shard merge": Error if FCV<ShardMergeFCV.

Create an R state machine in state "uninitialized" with protocol "shard merge".

Transition to "started".

Return "ok".

Handle returnAfterReachingDonorTimestamp as in MT Migrations. Once R is in state "consistent", it may still abort the merge due to an error in fetching/applying D oplog entries. But it may not abort the merge for any other reason. Thus, once D enters "blocking" state and stops producing new entries, and R replies "ok" to recipientSyncData with returnAfterReachingDonorTimestamp, R may fetch/apply no more entries and it cannot abort the merge. Therefore it is safe for D to commit.

Blocking Reads and Writes

In MT Migrations, for each migrating tenant there is one TenantMigrationDonorAccessBlocker instance on D and one TenantMigrationRecipientAccessBlocker instance on R. These classes block unsafe operations on a migrating tenant's data. When a migration's state document is garbage-collected after 15 minutes, the blocker is deleted: by then expect routing tables to be updated so unsafe reads no longer use blocking.

For Shard Merge, D may have one TenantMigrationDonorAccessBlocker that prevents unsafe reads/writes for all migrating tenants. update currentOp and serverStatus output to match, see Diagnosis/Debuggability.

R may continue to have a TenantMigrationRecipientAccessBlocker per tenant. This is used because a shard can participate as an R in several merges within 15 minutes, thus it uses TenantMigrationRecipientAccessBlockers with different merge timestamps active at once.

use shard versioning instead of a mongod access blocker class, once replaced the Atlas proxy with mongoq and introduced config shards.

SLOs and timeouts for maintenance operations, may not block user writes or transactions for more than maxBlockWrites (1 second).

See TenantMigrationRecipientAccessBlocker.

Indexes

In MT Migrations, when a migration starts, D aborts any index builds that are in progress on the migrating tenant's collections. Subsequent D index builds on the tenant's collections are blocked. If the migration aborts, restart the index builds. If the migration succeeds, abort the builds with TenantMigrationCommitted, which tells the proxy to retry the build on R. Users' index builds thus succeed despite migrations. keep this behavior in Shard Merge.

Auth

Same as in MT Migrations, Cloud may issue ephemeral x.509 certificates for D and R to authenticate with each other for Shard Merge. They are passed to D in donorStartMigration.

recipientVoteImportedFiles command

R nodes report to the R primary that they have finished importing collections by calling this command:

```
{
recipientVoteImportedFiles: 1, migrationId: migrationId, from: caller's host:port success: bool,
reason: optional string // failure reason if !success
}
```

The R primary tracks incoming votes and checks "migrationId" matches the current shard merge. It stops waiting once all nodes succeed (including itself), or any fail, or it times out.

This command's implementation may be very similar to the enterprise command voteCommitImportCollection, in the Live Import project.

State machines

D state machine

No change from MT Migrations:

Once the D state machine has been in "garbageCollect: true" state for a certain time, it is deleted (conceptually, it returns to "uninitialized").

R state machine

Add a "learned filenames" state to the R state machine.

New transitions (compared to MT Migrations) are shown in green:

Copying data files

The R primary creates a backup cursor on the D primary. The backup cursor provides a list of WiredTiger (WT) file names and file sizes. WT continues to write to the files on D as R is copying them, but as long as the backup cursor is alive, WT promises not to change bytes that are important to the backup. See backup cursor.

The R primary creates a replicated collection named donatedFiles.migrationId and stores all results from the backup cursor as documents there, then sets its state to "learned filenames". It keeps the backup cursor alive with a getMore request every 5 minutes (the timeout is 10 minutes). If getMore fails with a network error, the R primary retries it quickly to avoid the timeout. Try to share backup cursor getMore logic with File Copy Based Initial Sync.)

The R primary and secondaries may have OpObservers which observe donatedFiles.migrationId. Before copying the first file, create a temporary directory on the R node for copied files. (Move them to R's dbpath, see Rollback to stable.) For each (fileName, fileSize) inserted in donatedFiles.migrationId, copy the first fileSize bytes into a file named fileName in the temp directory. Use an aggregation pipeline to fetch bytes from D, as in File Copy Based Initial Sync. Shard Merge may share code with File Copy Based Initial Sync's BackupFileCloner or not, depending on the implementation timeline and how similar the use cases are. R secondaries may not block replication while copying.

When a secondary observes the state change to "learned filenames", it knows the state document's "fileCount" field is final.

Importing Data Files

Namespace Conflicts

Tenant collection namespaces may be prefixed with tenantId, thus there may be no conflicts with existing namespaces on R. Garbage from aborted merges may be cleaned up before R participates in another merge, so there may be no orphan tenant collections on R.

Rollback to Stable

To get a consistent and majority-committed snapshot of D's data, perform "rollback to stable" (RTS) on D files in an isolated, temporary WT connection before moving them into R's dbpath and importing them for real.

This is the RTS process: Each R node creates a new read-only temporary WT instance for its local temp directory. When the R node calls wiredtiger_open( ), WT performs startup recovery: it reads the WiredTiger.backup file, creates wiredtiger.wt and wiredtiger.turtle, executes RTS, and creates a checkpoint. The temporary WT instance contains a consistent snapshot of all D's collections and its_mdb_catalog at startApplyingOpTime.

Read Metadata

For each collection in the temporary WT instance's_mdb_catalog:

Decide whether to import the collection. Include all tenant collections. Exclude D's oplog (use the MT Migrations mechanism for migrating D oplog entries). Exclude D's config.transactions (see Transactions). Exclude system collections. If the collection may not be imported, continue to the next one.

Record metadata for the collection. Use an in-memory data structure, since do not use durability and do not expect metadata to overflow RAM. See the enterprise command "exportCollection" for inspiration.

Get MongoDB metadata from the temporary instance's _mdb_catalog table.

Get WiredTiger metadata from its wiredtiger.wt table.

Get numRecords and dataSize from its sizeStorer.wt table.

Move Files from the Temporary Directory

Each R node closes its temporary WT instance and moves the copied files into its dbpath.

It excludes WiredTiger.wt, WiredTiger.turtle, _mdb_catalog.wt, and the history store. It deletes the temporary directory.

Timestamp Rules for Import

Currently, WT uses for any imported table:

Oldest Timestamp Rule: imported table's checkpoint timestamp≤R's oldest timestamp Otherwise, a client may read at some timestamp T such that the oldest timestamp<T<the imported table's checkpoint timestamp. This read may be allowed because it is after the oldest timestamp, but WT may not have the history to serve that read. The Oldest Timestamp Rule prevents this contradictory scenario.

Merge may sometimes violate the Oldest Timestamp Rule since D's and R's timestamps are not coordinated. add a WT option to enforce a laxer rule instead:

Stable Timestamp Rule: imported table's checkpoint timestamp≤R's stable timestamp Merge may use the new WT option to enable the Stable Timestamp Rule instead of the Oldest Timestamp Rule when it imports D tables. The contradictory scenario above is prevented by the TenantMigrationRecipientAccessBlocker.

Merge can obey the Stable Timestamp Rule as follows: Before the R primary imports any files, if its stable timestamp is <startApplyingOpTime (which is the backup cursor's checkpoint timestamp), it advances its clock past startApplyingOpTime, writes a no-op oplog entry, and waits for its majority timestamp to reach startApplyingOpTime. The stable timestamp can briefly lag the majority timestamp, see Actually importing.

Actually Importing

For each imported user collection, each R node infers the tenantId from the database name and installs a tenant access blocker if none is yet created for this tenantId (see TenantMigrationRecipientAccessBlocker).

Each R node runs DurableCatalogImpl::importCollection( ).may not use the enterprise "importCollection" command since do not use its replication logic. However, can use it for inspiration, along with this gist. Although advanced the majority timestamp (see Timestamp rules for import), the stable timestamp can briefly lag the majority timestamp, causing a WT_ROLLBACK error when try to import. Retry until the stable timestamp catches up, or exceed some timeout.

After importing all collections, each node calls recipientVoteImportedFiles on the primary. (The primary calls recipientVoteImportedFiles on itself.) Once all R nodes finish importing or there is an error, the R primary stops calling getMore on the backup cursor and kills it with "killCursors". If all nodes successfully imported, the R primary transitions to state "consistent", otherwise it aborts the merge.

Majority Reads of Donated Data

Majority reads of donated data on R may not work immediately after the migration commits. A key in donated data on R may have a value at a timestamp that was later than R's stable timestamp S. D may have pushed the value as of S to D's history file, which R cannot read from. Shard Merge handles majority reads thus:

R rolls back D's data to startApplyingOpTime.

R applies D entries between startApplyingOpTime and returnAfterReachingDonorTimestamp, creating entries in R's history.

D calls recipientSyncData with returnAfterReachingDonorTimestamp

≥startApplyingOpTime.

R waits until it has majority committed an oplog entry with a timestamp

≥returnAfterReachingDonorTimestamp.

D commits the migration.

Client writes and reads of donated data are routed to R.

Thus any client read of donated data with readConcern: {level: "majority" } that is served by the R primary may choose a read timestamp≥returnAfterReachingDonorTimestamp. The R primary can serve such reads from imported data files at first. Once R has accepted writes to donated data, it may push older values to R's history files. Thus R has enough history to serve majority reads on donated data, and so do a majority of R secondaries. Lagging R secondaries block majority reads of donor data until they are sufficiently caught up.

TenantMigrationRecipientAccessBlocker

In MT Migrations, the R primary creates an instance of this class per migrating tenant that it is receiving. R secondaries create access blockers as they replicate state changes. The access blocker prevents unsafe reads from stale R secondaries, and prevents reads at timestamps before the migration.

For Shard Merge, each R node creates a TenantMigrationRecipientAccessBlocker for each new tenantId discovered while importing. See Copying data files and Create a TenantMigrationRecipientAccessBlocker per tenant.

Snapshot Reads

A "snapshot read" is a series of non-transaction reads issued with the same past timestamp. Clients implement snapshot reads by passing readConcern: {level "snapshot", atClusterTime: T} to the server for some past timestamp T.

A snapshot read may span a migration. E.g., in Python:
Each read using this session reads data from the same point in time.
 with client.start_session(snapshot=True) as session:
 # Query D.
 order=orders.find_one({"sku": "abc123" }, session=session)
 # A migration occurs. Next query goes to R.
 inventory=inventory.find_one({"sku": "abc123" }, session=session)

In MT Migrations, do not copy WT history along with tenant data, so migration-spanning snapshot reads fail. (This is enforced by TenantMigrationRecipientAccessBlocker, see MT Migrations.) For Serverless, may not copy WT history, so snapshot reads may not work across Shard Merge either. The TenantMigrationRecipientAccessBlocker may reject such reads with "SnapshotTooOld" if the readConcern's "atClusterTime" predates the merge. Access blockers may remain for at least minSnapshotHistoryWindowInSeconds.

Snapshot reads that do not span migrations may succeed if they take less than minSnapshotHistoryWindowInSeconds, which is set to 5 minutes.

See Timestamp rules for import for more details. May support snapshot reads, see Merging history.

directoryPerDb and directoryForIndexes

Serverless does not use directoryPerDb or directoryForIndexes. Since these are not used in Serverless, these are not supported with Shard Merge. Translating paths between shards that have different settings is needless complexity. The donorStartMigration and recipientSyncData commands may fail with an error if protocol is "shard merge" and directoryPerDb or directoryForIndexes is enabled.

Fetching D Oplog Entries

After the R primary opens a backup cursor and determines startApplyingOpTime, it starts fetching D oplog entries. As in MT Migrations, it fetches older entries as used for transactions and retryable writes, and stores them in a replicated buffer collection.

In MT Migrations, the R primary uses an aggregation to filter oplog entries at or after startFetchingOpTime for the migrating tenant. For Shard Merge, it fetches all entries at or after startFetchingOpTime.

Applying D Oplog Entries

As in MT Migrations, R begins applying D oplog entries once it has copied all data. In MT Migrations, R acquires an inconsistent copy of D data, similar to initial sync, thus it applies D entries using ApplicationMode::kInitialSync. In Shard Merge, R acquires a consistent copy, so it uses ApplicationMode::kSecondary.

As in MT Migrations, the R primary writes one or two synthesized oplog entries for each D entry, to work around the incomparability of R and D optimes and support retryable writes. (See Retryable Writes and Merging history.) For retryable writes, the R primary updates each migrated transaction to point to its new oplog chain in R's oplog. may update this logic to handle tenant transaction collections.

Interaction with Other Features

Transactions

May only consider non-prepared transactions in Serverless.

Transactions are supported in Shard Merge the same as in MT Migrations; an explanation follows.

Transactions committed on D before startApplyingOpTime may be included in the tenant transactions collections that R copies from D (see Copying data files).

Transactions committed on D between startApplyingOpTime and the start of the critical section may be committed on R: When R applies new D oplog entries (see Applying D oplog entries), it may automatically mark a D transaction committed when it applies the transaction's terminal applyOps. R has all the entries for a large-format transaction because it set startFetchingOpTime to include the oldest open transaction on R.

Transactions that are in progress on D when it enters the critical section may be aborted with a retryable error. Clients may retry them on R. Uncommitted, non-prepared transactions do not write a document to the transactions collection, so they may not be migrated. This is correct; may not continue D transactions on R, since clients may retry them.

Migrated transactions are cleaned up after ~30 minutes along with all other old transactions, see Periodic cleanup of the session catalog and transactions table.

Committing the Merge

As in MT Migrations, D chooses when to commit the merge. R does not have an explicit commit step. If the merge succeeds, R starts receiving requests for the migrated tenants.

Eventually it receives recipientForgetMigration and marks its state machine garbage-collectable.

Retryable findAndModify

Retryable findAndModify can store images in the oplog (the old method) or image_collection (the new method), depending on a server parameter storeFindAndModifyImagesInSideCollection (see "Reduce Oplog Entry Size For Retryable findAndModify"). Serverless may use this method. The existing MT Migrations migrates images from D's image_collection to R's oplog. When implementing tenant config collections can easily migrate images from D's tenant image_collections to R's tenant image_collections instead, and keep them out of the oplog.

Aborting the Merge

As in MT Migrations, Cloud is responsible for dropping imported D databases from R if the migration aborts. Cloud may automatically drop imported tenant config databases using the algorithm: it calls listDatabases with a filter for the prefix "tenantId_" and drops all the matching databases.

For Shard Merge, Cloud is additionally responsible for deleting:

The temporary directory created while Copying data files, if it still exists.

All files in the dbpath that are named in donatedFiles.migrationId which have not been imported yet. (Those which have been imported may be deleted when Cloud drops all DBs whose names begin with "tenantId_", as in MT Migrations.)

The donatedFiles.migrationId collection.

Cloud may use an algorithm such as:

do all the existing MT Migrations cleanup for each R node:
  delete the directory at dbpath/donatedFiles.migrationId/
  for each file in config.donatedFiles.migrationId collection: for each R node:
    delete file from dbpath if it exists
  on R primary, drop config.donatedFiles.migrationId collection Collection Stats Collection and database statistics are exposed by the "dbStats" and "count" commands. They are stored in two ways:

dataSize, objects (aka numRecords, used by "count" command): The sizeStorer.wt table.

storageSize, freeStorageSize, indexSize, indexFreeStorageSize: WT metadata.

Both kinds of information are copied from D via a temporary WiredTiger instance, see Read metadata. The sizeStorer.wt table is synced from in-memory stats every 60 seconds, so the copied info may be stale; R may eventually update it. Eventual consistency may be used.

Initial Sync

Initial sync concurrent with Shard Merge may not be supported. The D primary may not be a sync source because both Shard Merge and File Copy Based Initial Sync open a backup cursor, but there can be only one backup cursor per mongod. A D secondary may be a sync source, but initial sync may not choose a secondary sync source if the replica set is a D. An R node may not be a sync source, because during Shard Merge it is inconsistent in ways initial sync may not handle.

Cloud may not schedule concurrent maintenance operations.

Restarts and Failovers

Primaries: When a node steps up or down, if it has an R Shard Merge state machine it aborts the merge.

Secondaries: If a secondary S restarts and discovers it has an R Shard Merge state machine, it does not restart copying or importing files. This reduces complex recovery tasks.

There are two ways:

1. S has not finished copying and importing files. The R primary waits for all secondaries to finish copying or importing, so Shard Merge may eventually time out and fail.

2. S finished importing. The remainder of its job is to replicate entries from the R primary via ordinary replication, so Shard Merge may succeed.

Ban tenantId with "Shard Merge" Protocol

Merge may copy all tenants from D, but when begin implementation the recipientSyncData command may still use a tenantId. Once Shard Merge is sufficiently implemented, update recipientSyncData to ban tenantId when "protocol" is "shard merge", and update the D logic to omit tenantId from recipientSyncData when "protocol" is "shard merge".

Summary of Changes for Cloud

Compared to MT Migrations, Shard Merge makes the following changes:

A shard can be either a donor or a recipient in only one migration; no concurrency.

Shard merge is disabled until 30 minutes after setFCV (ShardMergeFCV).

Shard merge is not reconfig-safe, do not reconfig the D or R replica set during a migration.

Upgrade/Downgrade Requirements and Behaviors

A feature flag called "featureFlagShardMerge" which follows the standard lifecycle.

Cloud may not initiate Shard Merge between shards with different FCVs. During Shard Merge it may not change any shard member's binary version, nor call setFCV on either shard.

The donorStartMigration and recipientSyncData commands may accept protocol: "shard merge" only if featureFlagShardMerge is enabled and FCV≥ShardMergeFCV.

See the upgrade/downgrade section of MT Migrations.

Diagnosis/Debuggability

Updated MT Migrations serverStatus and currentOp metrics (see diagnosis/debuggability in MT Migrations) for TenantMigrationDonorAccessBlocker to omit tenantId if Shard Merge is enabled. The MT Migrations serverStatus format is like this, if the server is donating "tenantId1" and receiving "tenantId2":

```
tenantMigrationAccessBlocker: { tenantId1: {
donor: {
... stats ...
}
},
tenantId2: {
recipient: {
... stats ...
}
}
}
```

Donor and recipient access blockers are mixed together there. For Shard Merge, there may be only one donor access blocker. So if there is a donor access blocker for Shard Merge, the serverStatus reply may look like:

```
tenantMigrationAccessBlocker: { donor: {
... stats ...
}
}
```

Renamed "instanceId" to "migrationId" in currentOp (drive-by improvement to naming consistency).

Design Rationales

Resume Index Builds on R

Merge has an advantage over MT Migrations: In Shard Merge, R members acquire consistent snapshots of D members' files. This means that an index build that was in progress on D can be completed on R. May use a mechanism for transferring metadata about the index build's progress from D to R so it can be resumed properly, and then committed on R once R members finish building. rejected this as overly complex; the existing MT Migrations mechanism may be used (see Indexes).

May abort Shard Merge if any index build is in progress when Shard Merge begins, or if a user initiates an index build before Shard Merge enters the "blocking" state. This may allow more user index builds to succeed without retrying.

Omit majorityAppliedDonorOpTime from recipientSyncDataData reply

In MT Migrations, R's reply to recipientSyncData includes a majorityAppliedDonorOpTime field. omit this from recipientSyncDataData's reply.

May not be used. The donor may use this as an indicator to decide when to enter the blocking state. For example, if the majorityAppliedDonorOpTime is far behind the latest optime the donor has, the donor may delay entering the critical section and wait longer until the recipient catch up even more to reduce the length of critical section.

Permit tenantId=" "

MT Migrations commands and state machines use a tenantId to record which tenant is migrating. Once "Shard Merge" is done, R may copy all tenants' data, so tenantId can be omitted from the donorStartMerge and recipientSyncData command parameters.

Make tenantId an optional field of MT Migrations state machines in this project, simpler code to treat tenantId " " (the empty string) as null in state machines. tenantId may be an optional command parameter, but still used until Shard Merge is done. In R and D state machines, tenantId is conceptually an optional field, but in fact use instead of boost::none.

No Virtual Oplog Interface

A merge algorithm that may be considered an internal "virtual oplog interface", a C++ class that may make the main oplog plus imported oplogs appear like a single oplog when used from other parts of the mongod codebase. However, may use change collections for retryable writes instead of the oplog, may not import oplogs at all.

A TenantMigrationRecipientAccessBlocker Per Tenant

For efficiency, may use one blocker on R for all migrating tenants: either update TenantMigrationRecipientAccessBlocker to handle a mutable list of tenantIds, or use a blocker class that does so.

Do not Block Replication while Copying Files

As the R primary learns names of files it may copy from D, it inserts them into a donatedFiles.migrationId collection. An OpObserver copies a donor file whenever its filename is inserted into this collection. For reasonable collection sizes, copying takes tens of seconds. If this copying were synchronous on secondaries, it may block oplog application, affecting R's existing tenants.

Therefore, R secondaries may copy D files asynchronously, out of line with oplog application.

Retryable Writes

Retryable writes use the transactions table and oplog to check if a write has already been executed, and to construct a reply. This uses migration of specific oplog entries before startApplyingOpTime using a very complex aggregation, and to write one or two synthesized oplog entries on R for every D entry.

Simplified logic in Serverless may use oplog entries from change collections instead. Change collections may be implemented in PM-2341. Shard Merge may work thus:

R imports change collections like any other tenant config collection, so R has a snapshot of D's change collections at startApplyingOpTime.

R applies D oplog entries as in earlier designs. As a side effect, it automatically creates change collection entries on R between startApplyingOpTime and returnAfterReachingDonorTimestamp.

Thus can avoid migrating any entries from D's oplog before startApplyingOpTime, and avoid writing synthesized entries. This may make Shard Merge faster, simpler, and easier to maintain.

Merging History (See Snapshot Reads.)

WT may support multiple WT history stores: each WT table may have its own history file, so can merge D's history files into R. Changes to Shard Merge: When R opens a backup cursor, the cursor may also include per-collection history files, which copy onto R.

Relax the Timestamp Rules for Import.

WT may provide an official API for importing a file with its history and doing RTS all in one step; migrating to the official API. In that case may not use a temporary directory for copied files, and may not do RTS in a separate WT instance.

Use readConcern Snapshot Across Migrations.

Relaxed TenantMigrationRecipientAccessBlocker rules to permit snapshot reads.

WT may provide an official API for importing a file with its history and doing RTS all in one step; migrating to the official API. In that case may not use a temporary directory for copied files, and may not do RTS in a separate WT instance.

When the R primary applies a D oplog entry E, it may use its own clock as the durable timestamp but E.ts as the commit timestamp. R's entry in its oplog may have a new "commitTs" field, like:

{ts: durable ts, commitTs: E.ts}

R secondaries may apply such an entry using commitTs as the commit timestamp. Thus an R write may be replicated on D with the same commit timestamp, and any snapshot read at some timestamp may have the same result on R or D.

When a client performs an update on D during Shard Merge, resulting in an entry E in D's oplog.

R fetches E and applies it at its original D commit timestamp.

This write causes a new entry to be appended to R's oplog, with "ts" in local time and "commitTs" set to the D commit timestamp.

R also inserts the new entry into a tenant change collection (awaiting PM-2341 design). R secondaries replicate this insert.

D Entries' Optimes

R's timestamps obey this inequality (the same as any replica set node): oldest≤stable≤durable≤clusterTime There is no relationship between D entries' commit timestamps and R's oldest/stable/durable/clusterTime timestamps. Use D commit timestamps when apply D entries on R. may handle all cases as follows:

D Commit Timestamp<R's Oldest Timestamp

WT may expose the roundup_timestamps option to MongoDB. This option may round up commit timestamps to the R oldest timestamp. This means that multiple writes for a document can have the same commit timestamp; the latest write in the oplog wins, as desired. Using commit timestamps like this may make R reads inconsistent at timestamps<R's oldest timestamp, but those reads are prohibited.

D Commit Timestamp<R's Stable Timestamp

When R applies a D oplog entry, it may use a commit timestamp<R's stable timestamp. This violates WT's rule that all commit timestamps are >the stable timestamp. May be addressed in two ways:

1. Use R's clusterTime as the durable timestamp for writes when applying a D entry. Use the entry's original timestamp as its commit timestamp. See TransactionParticipant::Participant::commitPreparedTransaction.

2. Relax WT's rules (PM-2580) so it allows any commit timestamp for all writes, as it does for prepared transactions. WT may keep the current rule by default and use MongoDB to disable it when applying D entries.

R's stable timestamp≤D commit timestamp≤R's clusterTime

There is no problem with this range of D optimes.

D commit timestamp>R's clusterTime

Whenever a D oplog entry's commit timestamp>R's clusterTime, R advances its clusterTime before applying it.
Implementation
  TenantMigrationRecipientService
  R's MT Migrations logic is encoded mainly in a long series of steps in TenantMigrationRecipientService::Instance::run, executed by the R primary. The following subsections describe steps that update for Shard Merge, in order of their runtime execution.
    _getStartOpTimesFromDonor( )
    In MT Migrations, the R primary sets startApplyingOpTime to D's majority committed optime. It sets startFetchingOpTime to the optime of the oldest prepared transaction for any tenant on D. Shard Merge may not support prepared transactions, and it may not use the oplog for retryable writes.

Skip the steps above for Shard Merge. Instead, open a backup cursor on the D primary. Store the backup cursor's R-side information, it may be used in _startCloner. Set startApplyingOpTime to the checkpointTimestamp returned by the backup cursor. Advance R's stable and oldest timestamps to at least startApplyingOpTime (see Timestamp rules for import). Set the state doc's startFetchingOpTime to startApplyingOpTime.

The order of operations in _getStartOpTimesFromDonor may be complex for MT Migrations, may create a separate function for Shard Merge to avoid additional complexity.
startTenantAllDatabaseCloner( ) (rename to _startCloner)
In MT Migrations, R creates a TenantAllDatabaseCloner instance and starts it up. This cloner logically copies all tenant data using the MongoDB wire protocol.

For Shard Merge, a class ShardMergeCloner may physically copy all tenant data files from D. See Copying data files. ShardMergeCloner may share the TenantBaseCloner base class with TenantAllDatabaseCloner. determine the class hierarchy at implementation time. R determines from "protocol" which cloner class to instantiate.

Renamed _startTenantAllDatabaseCloner to _startCloner to be more generic.
  _fetchCommittedTransactionsBeforeStartOpTime( )
  In MT Migrations, R runs an aggregation on D's transactions collection to find the migrating tenant's committed transactions. For each of them, it starts and commits a transaction on R.

For Shard Merge, skip this step. copy all D's transactions collections instead, see Transactions.
  _cleanupOnDataSyncCompletion( )

No change from MT Migrations. This function shuts down migration threads and resolves promises. It does not do orphan cleanup; Cloud handles that for MT Migrations and Shard Merge. (mongod may handle this):
Rollback to Stable Implementation
  Optimizations
  Do not Copy all D Files
  When Copying data files, filter out D files that may not be imported. The donor oplog in particular may be large, and may not copy it. The filenames do not indicate MongoDB namespaces, they are just named like "collection-*" and "index-*", but the backup cursor results do include a namespace, e.g.:

{ filename: "/data/db/collection-14-2089747635917140722.wt", fileSize: 20480, used true, ns: "local.oplog.rs", uuid: "1a93d61f-691a-4732-8df7-df5806c92b62" }

When not copying all files, then the WT import step fails with an error. Use a WT configuration flag that permits a partial import.
Parallelize Copying Files
  When Copying data files, R nodes may copy many files at once from the D primary. It may also write single files with multiple threads, by writing chunks asynchronously while also receiving in parallel.
Parallelize Importing Files
  Same, but it seems less likely to be integral than copying files.
Copy Files from D Secondaries
  May spread load by copying from D secondaries. May not since Shard Merge is used when D is underutilized.
May not Use MongoDB Wire Protocol for File Copy
  File Copy Based Initial Sync copies file data via the MongoDB wire protocol. This works on the networks where customers deploy MongoDB, since already require that all replicas can exchange wire protocol messages. Serverless may use more efficient options.

R nodes may ssh into D nodes and copy files directly with a command like "ssh hostname:port head—bytes=fileSize", but that may use nodes have ssh access to each other, which may provide a security hole and configuration complexity. Alternatively, Cloud may be responsible for copying files, while the R primary keeps the backup cursor alive.
Minimize Catchup Phase
  SLOs and timeouts for maintenance operations, the critical section may be shorter than maxBlockWrites (1 second). The main task during the critical section is applying the final D oplog entries on R.

As implemented in MT Migrations, recipientSyncData (without returnAfterReachingDonorTimestamp) replies "ok" as soon as R is "consistent"; i.e. when R has applied enough oplog entries. D then blocks writes and enters the critical section, which lasts until R has caught up.

In Shard Merge, recipientSyncData may reply "ok" as soon as it has imported all files, but this risks a long critical section. Instead, R may wait until it has mostly caught up before it replies "ok"; it may monitor its progress by comparing D entry optimes to D's clusterTime whenever it fetches a batch of D oplog entries. may introduce a new "catch up" state after "consistent".

If R's catchup is still too slow, may:
  Fetch D entries with readConcern "local" to avoid lag. MT Migrations uses readConcern "majority" for rollback safety, but since Shard Merge aborts on rollback it may be safe to change the readConcern to "local".

Start fetching D entries into a temporary buffer concurrent with copying and importing files, then append/apply them before returning "ok". Thus R may be more caught up when it replies "ok" than in other designs. It may also avoid D storing a long oplog.

May not merge nodes that are busy enough to cause a long critical section.

Backup and Restore for Tiered Storage

Downstream Visible Behavioral Changes

Changes to the WiredTiger backup cursor usage. One aspect is to allow backup cursor operations to continue working unchanged. Functionality may use the extended interface usage.

The design may return a value with the backup cursor. WiredTiger can put used and relevant information in the value. WiredTiger backup cursors may only return information in the key and may not use the value at all. Backup applications running on tiered systems may look at the value to know information about the file/table/object returned. However, on all-local systems, the information returned in the value can be ignored as all information in the value may be to say the file is local. Therefore, all-local applications and systems may continue to work in a similar manner.

This section describes the components of both a full backup and (block-based) incremental backup. The same basic operations for WiredTiger backup still apply. In order to use incremental backup the user may first perform a full backup. Then, each incremental backup may specify a source identifier, src_id, this_id, for incremental purposes.

As in WiredTiger, the design provides a backup cursor that returns information about all content that is relevant to earlier iterations of backup. The backup application may make copies of this data for use if it restores the backup. For local files, it may be important to physically copy the data since the files are mutable and WiredTiger may only guarantee a consistent view of file data while the backup cursor is open. In contrast, data on object storage services, such as AWS S3, may be immutable. These objects may, therefore, be copied logically. This may be achieved by reference counting objects cooperatively between WiredTiger and a backup application. This may save the time and cost of copying large amounts of data and may be highly desirable. The design may be agnostic to whether the backup application performs physical or logical copying of objects used by tiered storage. Logical copying may be possible in Serverless deployments of tiered storage and that WiredTiger may participate in any associated protocol for managing shared objects.

In order to have fast backup, MongoDB may tier all customer tables and indexes.

For local files, the backup cursor may return similar information as conventionally. That is, the cursor's key is the file name to copy. For tiered objects, such as table:mytable, may return sufficient information for an application to find and copy each object. As such, for tiered objects, the key may be a fully formed object name. The extension libraries that manage access to object storage may provide WiredTiger with a fully qualified name for a tiered object. If a backup file is indicated to be a tiered object the user can expect some name it can use to retrieve it.

WiredTiger API Changes

As mentioned above, the tiered storage extension is expanded to include a function to call that returns some kind of fully qualified name for an object. This new storage source API extension method may be storage_source->object_name( ). It may take an object name string and a pointer to a return string. The caller may be responsible for freeing the memory of the returned string memory.

The incremental configuration support for tiered storage is expanded. There may be an option to return all tiered object names or just new ones since the last incremental. This change may simplify object management during incremental backup. This configuration may be incremental=(tiered_objects=all|new).

The backup cursor, which may returns keys without values, may also return a value that may indicate to the application what kind of data the key represents as well as information about how to access it. The value_format may be qS. It may return a (q) type that indicates if the key is a local file or shared object and for shared objects whether it is new. The types are WT_BACKUP_LOCAL, WT_BACKUP_TIERED and WT_BACKUP_TIERED_NEW.

The (S) portion of the value may be a JSON string containing information for the user. May return any information the caller may use that have to access the data. The application may use this JSON information to know what action to take for that key. The action may be different, to a different destination, depending on whether the key is local or shared. For local files, the action may be to copy the file to another local disk-based destination, e.g., via cp or rsync. For shared files, the action may be to "copy" to another bucket or reference the object returned in some way, e.g., via curl. Since different keys reside in different locations and may end up in different destination locations use the value to distinguish what data exists where and how to access it. The application may perform a physical copy. Because objects may be immutable, the application may copy them logically instead, for example by reference counting shared objects.

WiredTiger implications

Similar design considerations that apply to backup also apply in the tiered case. Namely, once a backup cursor is opened, any files or objects that exist at the time of open may be configured in a similar form until the backup cursor is closed even if they are not part of the backup list. This requirement may affect tiered storage as follows:

Any flush_tier call that pushes a local object to shared storage, i.e. it may normally move the currently writable object on local storage file:mytable-0002.wtobj to bucket/pfxmytable-0002.wtobj in shared storage and then create the new writable local object file:mytable-0003.wtobj may guarantee that the local version of mytable-0002.wtobj continues to exist on the local disk. Like the checkpoint call, may allow flush_tier to proceed while the backup cursor is open. Therefore that object may exist in both locations for the duration of the backup cursor.

Once the backup cursor is closed (or on a restart) a flush tier operation may also clean up older file:mytable-0002.wtobj entries and files that remain from the time the backup cursor was open.

Any garbage collection thread or API may not remove any shared objects while a backup cursor is open.

Another effect for incremental backup with tiered storage may provide a simplification. Since shared objects are read-only the only thing WiredTiger may track between incremental backups is object creation. When any shared object is returned as the key from a backup cursor, may not open a duplicate incremental backup cursor on that key. It may not be modified. Any tiered object (as indicated by the new value returned) may be copied and backup_cursor->next called to move on. Since there is no incremental type information for tiered objects, WiredTiger may return EINVAL if the application tries to open a duplicate incremental cursor on a tiered key name.

Incremental Metadata

Block-based incremental backup stores information about file modifications in the metadata on checkpoint. This behavior may not be different for local files.

May store incremental backup ID information in the metadata on each shared object's metadata when it is created. Similar to local files getting updated on checkpoint when their metadata is already getting modified anyway, tiered object metadata may only get updated on flush tier operations which manipulate and create objects. May only update object metadata once when that object is getting created or otherwise modified.

For example, when creating an object during flush_tier the metadata may contain the currently valid backup IDs:

object:mytable-0001.wtobj
<object information>,backup_info=(ID1,ID2)

On the next incremental backup, when the caller may only want new tiered objects via incremental= (tiered_object=new), when gathering files and walking the metadata, only objects whose ID list contains the src_id identifier may be included in the list. Any object's metadata that does not contain src_id can be skipped from this incremental backup as it may have been part of an earlier full backup or earlier source identifier.

Metadata content may vary. At a minimum, may use the identifier strings. Other information may be used or convenient for each identifier, similar to the block modification information store for local files.

An incremental backup may always specify an existing src_id. This object may be copied if, say, ID2 is used as the source id. Then the next incremental using, say, ID3 as a source may know this object was created before ID3 existed and therefore a previous incremental or full backup already copied this object. A new full backup may always, by default, return all objects and files.

When an object is created, a new metadata component may be stored on the object:mytable-000#.wtobj entry to indicate the incremental identifiers that exist at the time of creating this object entry. This information may be an indication to incremental backup that this object has been created since that identifier went into effect and this object may be included in the list for backup when using any stored identifier as a src_id. Any future backups that find an object without the specific identifier can skip that object.

Incremental Schema Actions

The tiered design may retains the similar file-level behavior as current block-based incremental backup but with additional possibilities for tiered objects. The design may use existing and new behavior expectations. It may also reiterate the usage expectations for existing local storage file changes between incremental backups, and then add in new possibilities for tiered objects.

File name list management used for block-based incremental backup may be a burden on the application that does not change in this design. This list management may detect drops and continues to be used. May help this with the incremental=(tiered_object=all|new) configuration. The common case is that expect there may be thousands of tiered objects and far fewer new tiered objects. It may not be desirable to return the ever-growing, complete list of already-copied, non-changing tiered objects on every incremental. However the complete list of tiered objects may be the only way to detect dropped objects (either from the table being dropped or tiered storage garbage collection).

Anticipated usage may be that the application may typically use tiered_object=new to only get new objects but then may have a periodic management run where it uses tiered_object=all to get them all and detect what objects are no longer used. One way the user may determine when to run a period management run may be to use statistics. Look at how many tables have been dropped since the last management run and also add in how many object references have been removed via garbage collection.

An Existing Local Table is Modified Between Backups

This scenario may be similar. The primary backup cursor returns name.wt as the key. (And in the design, the value may say WT_BACKUP_LOCAL.) The duplicate incremental cursor is opened with file=name.wt. The incremental cursor is walked, returning offset/length/type information in its key for name.wt.

An Existing Local Table is not Modified Between Backups

This scenario may be similar. The primary backup cursor returns name.wt as the key. (And in the design, the value may say WT_BACKUP_LOCAL.) The duplicate incremental cursor is opened with file=name.wt. The incremental cursor is walked, and WiredTiger returns WT_NOTFOUND on the first incr_cursor->next call for the incremental cursor indicating there are no modifications.

An Existing Local Table is Dropped Between Backups

This scenario may be similar. The name may simply not be returned by the backup cursor. It is up to the application to notice a name that was previously returned is no longer returned indicating that the file no longer exists.

A New Local Table is Created Between Backups

This scenario may be similar. The primary backup cursor returns name.wt as the key. (And in the new design, the value may say WT_BACKUP_LOCAL.) The duplicate incremental cursor is opened with file=name.wt. The incremental cursor is walked, returning offset/length/type covering the entire file for name.wt.

A New Tiered Table or Object is Created Between Backups

The primary backup cursor returns the qualified name as the key and the value may say WT_BACKUP_TIERED_NEW. There may not be incremental information for shared objects since they may not change after creation. It is an error to open a duplicate incremental cursor. The application may just copy the tiered object to the destination bucket.

The common path may be that during one backup the name returned may be the local writable portion of the object and on the next incremental backup, that object is no longer local and is returned as a tiered object name. The application is expected to remove the old local version of the object and copy the new tiered version of the object.

A Tiered Table is Dropped Between Backups

This case may provide additional complexity compared to the local file case. When a tiered table is dropped, no entries for its name may be returned. Already copied shared objects may not get returned by the incremental backup cursor. This indication may only be detected with tiered_object=all.

This case is also related to object garbage collection. It may be very similar when individual tiered objects are garbage collected and removed. The application may have to do the same sort of detection for one or a few objects for a table no longer existing versus all objects for a table no longer exist.

A Tiered Object is Deleted Between Backups

In the local case, return an entry for every local file that exists in the metadata. With the shared bucket expect that objects can number in the many thousands and a reason for the incremental backup for tiered storage is to avoid returning objects that have already been returned and copied. Existing, but already backed up, objects may not be returned again when tiered_object=new is configured. When configured with tiered_object=all then the application may notice the absence of the object name and remove the object.

Detection of deleted tiered objects can be observed in the same way as local files by returning an entry for every tiered object that exists in the metadata. This expansive list of objects may only generated when tiered_object=all is configured. With this setting the application can detect the difference between an already copied object and a new one necessary for this incremental backup by the value type. A new object may have the WT_BACKUP_TIERED NEW type and an older object may have the WT_BACKUP_TIERED type.

Code Change Summary

There are several areas of change for this design.

The first change is to provide the backup value setting. A value_format type may be used. Then the backup cursor code, where it sets the key, may create and set the value. Tests, using the key, may run and pass, unchanged and with no memory leaks from the value, etc. The top level code starting point is cursor/cur_backup.c:_curbackup_next.

The second change is to introduction of metadata changes used for objects to record what backup identifiers are live at the time of the flush_tier call when the object is created. The top level code starting point is tiered/tiered_handle.c: tiered_create_object.

Another change is to modification of the code that generates the backup list to identify and process objects necessary for this backup as that code iterates through the metadata.

Tiered-Only Backup

This design works on a whole-database level, and includes local files not only local-only tables but also WiredTigerLog files and the live, writable local objects. A backup that is desired for shared storage only is viable and may be a subset of the functionality described above.

Some API modifications may be used to specify a tiered-only setting. That setting may direct WiredTiger to create a WiredTiger.backup and cursor list that only includes tiered objects.

The content returned by the backup cursor may be similar, limited to values that indicate a shared object.

Incremental backup may work in a similar manner. A likely result is that the metadata information may expand to indicate what type of backup the identifier applies to, either whole database or tiered only.

Restore

Like backup, restore may be similar to WiredTiger implementation. The backup application may place the files and objects from a backup in corresponding locations on the system performing the restore. This means that local files, including the backup metadata file, may be placed in a directory on the local machine. Similarly objects may be placed in a storage bucket. In both cases, files and objects may have the same names or earlier systems.

If the backup application has made logical copies of the objects (e.g., by reference counting them), restore may be able to use them in situ, avoiding the overhead copying large amounts of data to prepare for the restore.

Just as WiredTiger allows a restore in a different directory path than the one used by the source system, WiredTiger may also allow restore to use objects in a different bucket. This may not be necessary when reference counting objects, but it may provide more general functionality.

A simple backup application can copy file data to a backup directory. In this scenario, the same restriction applies to tiered backup that applies to current backup. Namely that full and incremental backups can be done to a destination repeatedly as long as the destination database has not been opened and recovery run. Once recovery has run in a backup directory, the user can no longer backup to that database directory.

A backup caller may want a fully qualified name. The caller may want other information when the backup cursor returns a tiered object.

JSON information may be returned by the backup cursor. As stated above, it may be sufficient for the backup application to copy the objects (either physically or logically). There may be other attributes that may be useful as well. For example, object size, a checksum, something else. May return the storage source name (e.g. s3) and bucket separately, as these relate to strings that are passed in during the WT_SESSION::create call.

Block-Based Incremental May not Work with LSM Trees.

Serverless may support cross-region or cross-cloud configurations and such configurations may share a single set of tiered objects between the dispersed replica set members or whether object sharing may be restricted to co-located nodes. This design may provide the infrastructure used for backup. Each node in a replica set may have access to a complete set of data, either in shared or exclusive objects. Performing a backup on a node may provide the information used to copy its view of the replica set's data.

Design Alternatives and Design Rationales

To simplify object management during incremental backups, report not only new objects, but also newly deleted objects. However, this may use the metadata for every deleted object that occurred after an incremental backup to be saved. If there is a long time interval between incremental backups, this may represent a complexity to carry in the metadata table.

Figure 2:
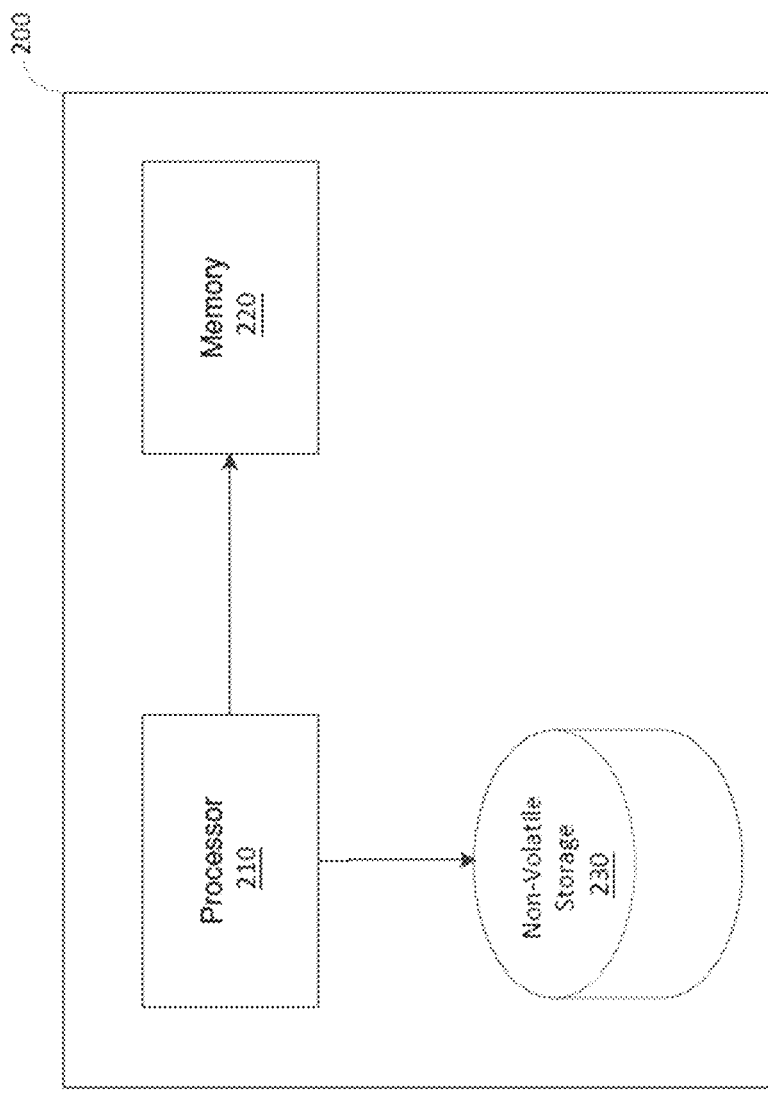
FIG. 2 is an example block diagram of a special purpose computer system that can be improved over conventional implementation based on implementation and/or execution the functions discussed herein.

Modifications and variations of the discussed embodiments will be apparent to those of ordinary skill in the art and all such modifications and variations are included within the scope of the appended claims. An illustrative implementation of a computer system 200 that may be used in connection with any of the embodiments of the disclosure provided herein is shown in FIG. 2. The computer system 200 may include one or more processors 210 and one or more articles of manufacture that comprise non-transitory computer-readable storage media (e.g., memory 220 and one or more non-volatile storage media 230). The processor 210 may control writing data to and reading data from the memory 220 and the non-volatile storage device 230 in any suitable manner. To perform any of the functionality described herein, the processor 210 may execute one or more processor-executable instructions stored in one or more non-transitory computer-readable storage media (e.g., the memory 220), which may serve as non-transitory computer-readable storage media storing processor-executable instructions for execution by the processor 210.

The terms "program" or "software" are used herein in a generic sense to refer to any type of computer code or set of processor-executable instructions that can be employed to program a computer or other processor to implement various aspects of embodiments as discussed above. Additionally, it should be appreciated that according to one aspect, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Also, various inventive concepts may be embodied as one or more processes, of which examples (e.g., the processes described with reference to figures and functions above, the various system components, analysis algorithms, processing algorithms, etc.) have been provided. The acts performed as part of each process may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, and/or ordinary meanings of the defined terms. As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/of" should be construed in the same fashion, i.e., "one or more" of the elements so conjoined. Other elements may optionally be present other than the elements specifically identified by the "and/of" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure.

Accordingly, the foregoing description is by way of example only, and is not intended as limiting. The techniques are limited only as defined by the following claims and the equivalents thereto.

What is claimed is:

1. A scalable cloud distributed database system for hosting data of multiple database tenants, the system comprising:
　at least one cloud based resource, the at least one cloud based resource including processor and memory;
　a database subsystem executing on the at least one cloud based resource, wherein the database subsystem comprises:
　　a first replica set configured to store first data associated with a first tenant and second data associated with a second tenant, the first replica set including a first primary node hosting a first primary database instance of a first database and two first secondary nodes hosting copies of data of the first primary database instance,
　　the first primary node being configured to:
　　　accept, from client systems, database write operations associated with the first tenant and the second tenant; and
　　　responsive to accepting the database write operations from client systems, propagate the database write operations to the two first secondary nodes;
　　the two first secondary nodes being configured to:
　　　replicate operations from the first primary node;
　　　accept, from client systems, database read operations associated with the first tenant and the second tenant; and
　　　responsive to accepting the database read operations, provide results to client systems from the copies of the data of the first primary database instance hosted by the two first secondary nodes;

wherein the database subsystem is configured to:
select, from among data of tenants stored using the first replica set, one of the first data associated with the first tenant or the second data associated with the second tenant to migrate from the first replica set to a second replica set; and
migrate the selected one of first data associated with the first tenant or the second data associated with the second tenant from the first replica set to the second replica set, the second replica set including a second primary node hosting a second primary database instance of a second database and two second secondary nodes hosting copies of data of the second primary database instance.

2. The system of claim 1 wherein the database subsystem is further configured to, while migrating the first data associated with the first tenant from the first replica set to the second replica set, throttle at least one of database write operations or database read operations associated with at least one of the first tenant or the second tenant.

3. The system of claim 1 wherein:
migrating the first data associated with the first tenant or the second data associated with the second tenant from the first replica set to a second replica set comprises migrating the first data associated with the first tenant from the first replica set to the second replica set; and
the database subsystem is further configured to, while migrating the first data associated with the first tenant from the first replica set to the second replica set, throttle at least one of database write operations or database read operations associated with the second tenant.

4. The system of claim 1 wherein the database subsystem is further configured to:
measure at least one of database write operations or database read operations associated with the first tenant to obtain first usage information;
measure at least one of database write operations or database read operations associated with the second tenant to obtain second usage information;
compare the first usage information to the second usage information to obtain a comparison result comprising an indication that the second tenant has higher usage than the first tenant;
based on the comparison result, select the first data associated with the first tenant or the second data associated with the second tenant to migrate from the first replica set to the second replica set.

5. The system of claim 4, wherein selecting, from among data of tenants stored using the first replica set, one of the first data associated with the first tenant or the second data associated with the second tenant to migrate from the first replica set to the second replica set comprises:
based on the indication that the second tenant has higher usage than the first tenant, selecting the first data associated with the first tenant to migrate from the first replica set to the second replica set.

6. The system of claim 1, wherein storing the first data associated with the first tenant comprises:
storing a first portion the first data associated with the first tenant in a first storage tier; and
storing a second portion of the first data associated with the first tenant in a second storage tier,
wherein the first storage tier has a faster read and/or write speed than the second storage tier.

7. The system of claim 6, wherein migrating the first data associated with the first tenant or the second data associated with the second tenant from the first replica set to the second replica set comprises:
copying to the second replica set, the first portion the first data associated with the first tenant stored in the first storage tier; and
pointing the second replica set to the second portion of the first data associated with the first tenant stored in the second storage tier.

8. The system of claim 1, wherein migrating the first data associated with the first tenant or the second data associated with the second tenant from the first replica set to the second replica set comprises copying to the second replica set, a plurality of files, each file of the plurality of files containing a document and a history of updates associated with the document.

9. The system of claim 1, wherein the database subsystem is further configured to trigger generation of a bill for the first tenant based on usage by the first tenant, wherein the usage by the first tenant comprises at least one of a volume of the first data of the first tenant or a measure of write operations and read operations associated with the first tenant.

10. The system of claim 1, wherein the database subsystem is further configured to:
measure at least one of database write operations or database read operations accepted by the first replica set to obtain usage information;
compare the usage information with a usage threshold to obtain a comparison result indicating that the usage information is greater than the usage threshold;
based on the comparison result, split the first data associated with the first tenant between two replica sets, the splitting comprising:
retaining a first portion of the first data associated with the first tenant at the first replica set; and
transferring a second portion of the first data associated with the first tenant from the first replica set to a third replica set.

11. The system of claim 1, wherein the database subsystem is further configured to:
measure at least one of database write operations or database read operations accepted by the first replica set to obtain usage information;
compare the usage information with a usage threshold to obtain a comparison result indicating that the usage information is lower than the usage threshold;
based on the comparison result, merge the first data associated with the first tenant with third data associated with a third tenant, the merging comprising:
retaining the first data associated with the first tenant at the first replica set; and
transferring the third data associated with the third tenant from a third replica set to the first replica set.

12. A computer implemented method for providing a scalable cloud distributed database system for hosting data of multiple database tenants, the method comprising:
executing a database subsystem on at least one cloud based resource, the at least one cloud based resource including a processor and memory, the database subsystem comprising a first replica set configured to store first data associated with a first tenant and second data associated with a second tenant, the first replica set including a first primary node hosting a first primary database instance of a first database and two first secondary nodes hosting copies of data of the first primary database instance;

accepting, by the first primary node, from client systems, database write operations associated with the first tenant and the second tenant;

responsive to accepting the database write operations from client systems, propagating, by the first primary node, the database write operations to two first secondary nodes;

replicating, by the two first secondary nodes, operations from the first primary node;

accepting, by the two first secondary nodes, from client systems, database read operations associated with the first tenant and the second tenant;

responsive to accepting the database read operations, providing, by the two first secondary nodes, results to client systems from the copies of the data of the first primary database instance hosted by the two first secondary nodes; and selecting, from among data of tenants stored using the first replica set, one of the first data associated with the first tenant or the second data associated with the second tenant to migrate from the first replica set to a second replica set; and migrating the selected one of the first data associated with the first tenant or the second data associated with the second tenant from the first replica set to the second replica set, the second replica set including a second primary node hosting a second primary database instance of a second database and two second secondary nodes hosting copies of data of the second primary database instance.

13. The method of claim 12 further comprising while migrating the first data associated with the first tenant from the first replica set to the second replica set, throttling at least one of database write operations or database read operations associated with at least one of the first tenant or the second tenant.

14. The method of claim 12 wherein:
migrating the first data associated with the first tenant or the second data associated with the second tenant from the first replica set to the second replica set comprises migrating the first data associated with the first tenant from the first replica set to the second replica set; and
the method further comprises, while migrating the first data associated with the first tenant from the first replica set to the second replica set, throttling at least one of database write operations or database read operations associated with the second tenant.

15. The method of claim 12, further comprising:
measuring at least one of database write operations or database read operations associated with the first tenant to obtain first usage information;
measuring at least one of database write operations or database read operations associated with the second tenant to obtain second usage information;
comparing the first usage information to the second usage information to obtain a comparison result comprising an indication that the second tenant has higher usage than the first tenant;
based on the comparison result, selecting the first data associated with the first tenant or the second data associated with the second tenant to migrate from the first replica set to the second replica set,
wherein selecting, from among data of tenants stored using the first replica set, one of the first data associated with the first tenant or the second data associated with the second tenant to migrate from the first replica set to the second replica set comprises:
based on the indication that the second tenant has higher usage than the first tenant, selecting the first data associated with the first tenant to migrate from the first replica set to the second replica set.

16. The method of claim 12, wherein storing the first data associated with the first tenant comprises:
storing a first portion the first data associated with the first tenant in a first storage tier; and
storing a second portion of the first data associated with the first tenant in a second storage tier,
wherein the first storage tier has a faster read and/or write speed than the second storage tier,
wherein migrating the first data associated with the first tenant or the second data associated with the second tenant from the first replica set to the second replica set comprises:
copying to the second replica set, the first portion the first data associated with the first tenant stored in the first storage tier; and
pointing the second replica set to the second portion of the first data associated with the first tenant stored in the second storage tier.

17. The method of claim 12, wherein migrating the first data associated with the first tenant or the second data associated with the second tenant from the first replica set to the second replica set comprises copying to the second replica set, a plurality of files, each file of the plurality of files containing a document and a history of updates associated with the document.

18. The method of claim 12, further comprising triggering generation of a bill for the first tenant based on usage by the first tenant, wherein the usage by the first tenant comprises at least one of a volume of the first data of the first tenant or a measure of write operations and read operations associated with the first tenant.

19. The method of claim 12, further comprising:
measuring at least one of database write operations or database read operations accepted by the first replica set to obtain usage information;
comparing the usage information with a usage threshold to obtain a comparison result indicating that the usage information is greater than the usage threshold;
based on the comparison result, splitting the first data associated with the first tenant between two replica sets, the splitting comprising:
retaining a first portion of the first data associated with the first tenant at the first replica set; and
transferring a second portion of the first data associated with the first tenant from the first replica set to a third replica set.

20. The method of claim 12, further comprising:
measuring at least one of database write operations or database read operations accepted by the first replica set to obtain usage information;
comparing the usage information with a usage threshold to obtain a comparison result indicating that the usage information is lower than the usage threshold;
based on the comparison result, merging the first data associated with the first tenant with third data associated with a third tenant, the merging comprising:
retaining the first data associated with the first tenant at the first replica set; and transferring the third data associated with the third tenant from a third replica set to the first replica set.

\* \* \* \* \*